(12) United States Patent
Yanagisawa et al.

(10) Patent No.: US 6,437,490 B1
(45) Date of Patent: Aug. 20, 2002

(54) VIBRATION GYROSCOPE

(75) Inventors: Tohru Yanagisawa; Izumi Yamamoto; Naoki Fujii, all of Saitama (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/445,594

(22) PCT Filed: Jun. 12, 1998

(86) PCT No.: PCT/JP98/02598

§ 371 (c)(1),
(2), (4) Date: Mar. 22, 2000

(87) PCT Pub. No.: WO98/57124

PCT Pub. Date: Dec. 17, 1998

(30) Foreign Application Priority Data

Jun. 13, 1997 (JP) .............................................. 9-156784
Oct. 28, 1997 (JP) .............................................. 9-295320

(51) Int. Cl.[7] .............................................. H01L 41/04
(52) U.S. Cl. ..................................................... 310/370
(58) Field of Search ................................ 310/321, 370

(56) References Cited

U.S. PATENT DOCUMENTS

| | | | | |
|---|---|---|---|---|
| 4,007,432 A | * | 2/1977 | Nakamura ................... 333/200 |
| 4,742,260 A | * | 5/1988 | Shimizu et al. ............. 310/323 |
| 5,001,940 A | * | 3/1991 | Ogawa ....................... 74/5.6 D |
| 5,597,955 A | * | 1/1997 | Leger et al. ............. 73/504.16 |
| 5,847,487 A | * | 12/1998 | Maeno ........................ 310/321 |
| 6,044,706 A | * | 4/2000 | Roh ........................ 73/504.12 |
| 6,281,619 B1 | * | 8/2001 | Yanagisawa et al. ....... 310/370 |

FOREIGN PATENT DOCUMENTS

| | | | |
|---|---|---|---|
| JP | 4-324311 A | | 11/1992 |
| JP | 6-258083 A | | 9/1994 |
| JP | 10-54724 A | | 2/1998 |
| JP | 11-051659 | * | 2/1999 |
| JP | 11-132769 | * | 5/1999 |
| JP | 11-311519 | * | 11/1999 |
| JP | 11-344342 | * | 12/1999 |

* cited by examiner

Primary Examiner—Nestor Ramirez
Assistant Examiner—Peter Medley

(57) ABSTRACT

The present invention provides a vibration gyro having good detection sensitivity and good detection accuracy and which comprises four beams provided on a base portion and which are made substantially stationary, for any type of vibration used. Since the vibration stimulus and detection make use of the same vibration mode, and the beams is so configured that output signals output from the beams cancel noise output generated by externally applied vibration, it is possible that matching of the excitation to obtain a large output signal and the resonant frequency for detection can be achieved without placing great expectations on machining and assembly precision, and without affecting adversely to the performance thereof depending upon a supporting method.

22 Claims, 24 Drawing Sheets

VIBRATION GYROSCOPE

This application is the national phase under 35 U.S.C. §371 of PCT International Application No. PCT/JP98/02598 which has an International filing date of Jun. 12, 1998, which designated the United States of America.

FIELD OF THE INVENTION

The present invention relates to a vibration gyro that detects angular velocity.

BACKGROUND TECHNOLOGY

A variety of vibration gyros, having tuning forks or tines of various shapes have been devised.

While mechanical type rotating gyros have been used as inertial navigation devices in aircraft and ships, the large size of these gyros made it difficult to use them in compact electronic equipment and transportation machinery.

In recent years, however, progress has been made in research in the development of practical compact vibration gyroscopes, in which a piezo-electric vibrating element is caused to vibrate an angular velocity current that is generated by the vibration caused by Coriolis force received because of the rotation of the vibrating element being detected by another piezo-electric element provided in the vibrating element, and such gyros are used car navigation systems and as detector for shaking in video cameras.

A vibration gyro of the past using a piezo-electric device is described below with reference to drawings. FIG. 29 is a perspective view showing a tuning fork type vibration gyro of the past.

This tuning fork type vibration gyro of the past is described below, with reference to FIG. 29. A resonator 71 made of a constant-resiliency metal such as Elinvar has a compound tuning fork structure. That is, the resonator 71 has joined onto the top part of the first beams 72 and 73 the second beams 74 and 75.

The piezo-electric element or the piezo-electric material driving section and drive electrode 76 are attached to the second beam 73.

While it is not shown in the drawing, in the same manner another similar driving section and drive electrode are attached to the first beam 72.

The piezo-electric element or the piezo-electric material driving section and drive electrode 77 are attached to the second beam 75.

While it is not shown in the drawing, in the same manner another similar driving section and drive electrode are attached to the first beam 74.

In this structure, the direction in which a beam extends is taken as the Z-axis direction.

The action of the above-noted structure will be described. As a result of an AC voltage that is applied to the drive electrode 76, the first beams 72 and 73 exhibit a first bending vibration which displaces them to the left and to the right. In the description which follows, this will be called "intraplane vibration," since it is normally customary to consider the vibration of a tuning fork in a single plane to be the ideal case.

In response to this intraplane vibration, the second beams 74 and 75 that are joined to the first beams 72 and 73 exhibit intraplane vibration. If the overall tuning fork is caused to rotate about the Z axis at an angular velocity of ω, a Coriolis force Fc acts in a direction that is perpendicular to the intraplane vibration.

This Coriolis force Fc can be expressed by the following relationship.

$$Fc = M \cdot \omega \cdot V$$

In the above relationship, M is the mass of the first beams 72 and 73, or of the second beams 74 and 75, and V is the velocity of the vibration.

In accordance with the Coriolis force Fc, a second bending vibration is excited which has a displacement in directions that are perpendicular to the intraplane vibration.

This will be called hereinafter extraplanar vibration. By detecting the AC voltage that is generated by this extraplanar vibration using the detection electrode 77, it is possible to calculate and know the angular velocity ω.

However, a vibration gyro of the past had the following problem. In general when supporting a vibrating element, to minimize the effect of the support on the vibration, support is made at a node at which the vibrating element does not move when vibrating.

In the case of the tuning fork having the configuration shown in FIG. 29, the intraplanar vibration node is at the furcated part, and while this part almost exhibits no movement, with extraplanar vibration excited by Coriolis force, there is no part that does not move due to vibration. Therefore, regardless of the location and method of support, there support will affect the vibrating element.

In general a tuning fork is supported near the center of the furcated part, and in contrast to intraplanar vibration of the vibrating element 71, which changes hardly at all whether supported at this location or not, with extraplanar vibration there is a change in the resonant frequency which can be as much as several percent.

Therefore, the resonant frequency for extraplanar vibration can change several percent, depending upon the method of support.

Extraplanar vibration is excited by Coriolis force with a frequency of the intraplanar vibration, the excitation efficiency being dependent upon the extraplanar vibration resonant frequency.

If there is distance between the intraplanar vibration resonant frequency and the extraplanar vibration resonant frequency, it is not possible cause sufficient excitation in the extraplanar vibration mode, and if there are large changes in the extraplanar vibration resonant frequency caused by a slight change in the support, the excitation efficiency will change greatly, making highly accurate detection impossible, this problem hindering a sufficient application of vibration gyros of the tuning fork type.

Because a vibration gyro detects a Coriolis force that acts in a direction that is perpendicular to the excitation direction, an element having a shape that is symmetrical about a center of a plane that is perpendicular to rotation direction to be detected is used, and at present a beam type is most commonly used.

However, such a beam-type element is difficult to support and difficult to support without affecting the vibrating element, and makes it impossible to completely prevent leakage of vibration to the outside. Easy-to-supports examples devised in the past include a four-beam tuning fork and a multiple beam tuning fork.

For example, there is the four-beam tuning fork vibration gyro disclosed in the Japanese Unexamined Patent Publication (KOKAI)No. 6-258083.

This four-beam tuning fork has a center symmetry within a plane that is perpendicular to the rotation direction to be detected, the same as with a single-beam type, and has a further feature of not vibrating at the bottom surface of its base part, thereby enabling complete isolation of the vibration with the outside.

In the four-beam tuning fork type vibration gyro disclosed in the Japanese Unexamined Patent Publication (KOKAI) No. 6-258083, of the 6 existing primary vibration modes of the four-beam tuning fork, vibration modes for which the drive and Coriolis force are perpendicular are selected, primary couplings between these modes being used to detect the Coriolis force, thereby achieving a vibration gyro that has almost no vibration at its base part.

The 6 primary vibration modes of a four-beam tuning fork having good symmetry are described below, with reference to the drawings.

FIG. 1 to FIG. 3 show front views of a general four-beam tuning fork, in which hatching is used to show the fixed condition of the bottom surface of the base part thereof.

The sizes of the various parts of this four-beam tuning fork are a total length of 4.8 mm, a base part length of 1.92 mm, a beam length of 2.88 mm, a base part width of 1.2 mm, a beam width of 0.48 mm and a groove width of 0.24 mm.

FIG. 17 through FIG. 22 are cross-section view showing this four-beam tuning fork as seen from the ends of the beams, the 6 primary vibration modes that each of these beams of the four-beam tuning fork has, the sequence of the drawings being that of increasing frequency as calculated using finite element analysis and verified later by experiment. The last torsional mode was not verifiable by experiment, however.

FIG. 23 through FIG. 28 show cross-section views of the beams of the four-beam tuning fork as seen from the ends of the beams, in the same manner, with the overall width of the tuning fork reduced by 1% but the thickness remaining the same.

In contrast to FIG. 17 through FIG. 22, the cross-sections of the beams are rectangular, the sequence of the drawings in this case as well being that of increasing frequency as calculated using finite element analysis and verified later by experiment. The last torsional mode was not verifiable by experiment, however, in this case as well.

First, the vibration modes for the case in which the cross-sections of the beams are square will be described, using FIG. 17 through FIG. 22.

In FIG. 17, the arrows indicate the swing direction of the beam at some instant, the mode having these swing directions being referred to as mode 1, the centers of the four beams swinging so as to describe a non-square rectangle, the characteristic vibration frequency being 38.730 kHz.

In FIG. 18, the arrows in the drawing indicate the swing directions of the beams at some given instant in time, and the vibration mode with these swing directions will be called vibration mode 2, the centers of the four beams swinging so as to maintain a square shape, the characteristic vibration frequency being 38.841 kHz.

In FIG. 19, the arrows in the drawing indicate the swing of the four beams at some instant in time, this vibration mode being called vibration mode 3, in which the centers of the four beams swing so as to form a diamond shape, the characteristic vibration frequency being 39.160 kHz.

In FIG. 20, the arrows indicate the swing of the four beams at some instant in time, this vibration mode being called vibration mode 4, in which the centers of the four beams swing in mutually parallel directions, the characteristic vibration frequency of which is 39.483 kHz.

In FIG. 21, the arrows indicate the swing of the four beams at some instant in time, this vibration mode being called vibration mode 5, in which the centers of the four beams swing in mutually parallel directions, the characteristic vibration frequency of which is 39.483 kHz.

In FIG. 22, the arrows indicate the swing of the four beams at some instant in time, this vibration mode being called vibration mode 6, in which the centers of the four beams swing so as to be twisted, the characteristic vibration frequency being 40.150 kHz. The reason mode 6 could not be verified by experiment was the extreme vibration of the semi-fixed base part.

Next, the vibration modes for the case in which the cross-sections of the beams are rectangular will be described, using FIG. 23 through FIG. 28.

In FIG. 23, the arrows indicate the swing of the beams at some instant in time, this vibration mode being called mode 1, in which the centers of the four beams swing in mutually parallel directions, the characteristic vibration frequency being 36.617 kHz.

In FIG. 24, the arrows indicate the swing of the beams at some instant in time, this vibration mode being called mode 2, in which the centers of the four beams swing in directions that are mutually parallel, the characteristic vibration frequency being 36.939 kHz.

In FIG. 25, the arrows indicate the swing of the beams at some instant in time, this vibration mode being called mode 3, in which the centers of the four beams swing so as to form a diamond shape, the characteristic vibration frequency being 37.099 kHz.

In FIG. 26, the arrows indicate the swing of the beams at some instant in time, this vibration mode being called mode 4, in which the centers of the four beams swing in mutually parallel directions, the characteristic vibration frequency being 37.266 kHz.

In FIG. 27, the arrows indicate the swing of the beams at some instant in time, this vibration mode being called mode 5, in which the centers of the four beams swing in mutually parallel directions, the characteristic vibration frequency being 37.608 kHz.

In FIG. 28, the arrows indicate the swing of the beams at some instant in time, this vibration mode being called mode 6, in which the centers of the four beams swing so that the four-beam tuning fork is twisted, the characteristic vibration frequency being 38.101 kHz.

In this case as well, the reason that mode 6 could not be verified by experiment was the extreme vibration of the semi-fixed base part.

By way of description of the action of the above-noted configuration, in the case of the four-beam tuning fork vibration gyro disclosed in the Japanese Unexamined Patent Publication (KOKAI) No. 6-258083, of the six primary vibration modes of the four-beam tuning fork based on the vibration modes for the case of a rectangular shape, vibration modes for driving and detection vibration modes for which the Coriolis force is perpendicular to the driving modes are selected, the configuration being made such as to support these driving and detection modes.

In the first embodiment, the vibration mode 4 for a rectangular shape that is shown in FIG. 26 is taken as the driving vibration mode, and the vibration mode 5 for a rectangular shape that is shown in FIG. 27 is taken as the detection vibration mode. (Although it is not clearly indicated, it is not usual to select a mode with the lower characteristic vibration frequency as the detection vibration mode.)

In the second embodiment, the vibration mode 3 for a rectangular shape that is shown in FIG. 25 is taken as the driving vibration mode, and the vibration mode 1 for a square shape that is shown in FIG. 17, and which does not exist in the case of the rectangular shape, is taken as the detection vibration mode, and a configuration for implementing this driving and detection is indicated.

In the third embodiment, a method is indicated for detecting the vibration mode 1 for a rectangular shape that is shown in FIG. 23 and the vibration mode 2 for a rectangular shape that is shown in FIG. 24, which are caused from the first-order coupling of the vibration mode 3 for a rectangular shape as shown in FIG. 25 and the vibration mode 1 for square shape excited by the Coriolis force shown in FIG. 17, and a configuration for implementing this driving and detection is indicated.

However, the following problems exist with the four-beam tuning fork that is disclosed in the Japanese Unexamined Patent Publication (KOKAI) No. 6-258083. First, in the first embodiment, with the vibration mode 4 for a rectangular shape that is shown in FIG. 26 and the vibration mode 5 for a rectangular shape that is shown in FIG. 27, because of the difference between the characteristic vibration frequencies, it is not possible to achieve a large detection sensitivity due to the lack of sufficient excitation of vibration mode 5 by vibration mode 4.

With regard to this point, while the Japanese Unexamined Patent Publication (KOKAI) No. 6-258083 has language to the effect of using symmetry, that is, of using a square shape, in actuality there is no vibration mode such as vibration mode 4 and vibration mode 5 for a rectangular shape that are shown in FIG. 26 and FIG. 27 for the case of a square, and the vibration mode such as vibration mode 4 and vibration mode 5 appear for a square, as shown in FIG. 20 and FIG. 21.

Experimentally, if the difference in the characteristic vibration frequency for the two directions approaches approximately 100,000 ppm, coupling already cause the rectangular vibration mode 4 and vibration mode 5 shown in FIG. 26 and FIG. 27 to cease to exist.

Therefore, the first embodiment which is disclosed in the Japanese Unexamined Patent Publication (KOKAI) No. 6-258083 is either implemented using a non-resonant four-beam tuning fork in which the frequency difference is greater than 100,000 ppm or by a resonant type which, even without Coriolis force, detects Coriolis force with an extremely high output being generated.

In the case of a non-resonant type, because the Coriolis force detection sensitivity will be poor, this will result in a worsened S/N ratio for Coriolis force detection, and in the case of a resonant type it is necessary to detect a Coriolis force from an output that is much larger than the output that is caused by the Coriolis force, this forcing the measurement to be performed with an extremely wide dynamic range, which is disadvantageous from the standpoint of achieving a high S/N ratio. Additionally, while there is a proposal of a mechanism to limit the output by using a closed loop, this does not change the S/N ratio.

Turning next to the remaining embodiments that are disclosed in the Japanese Unexamined Patent Publication (KOKAI) No. 6-253083, the rectangular vibration mode 5 shown in FIG. 25 is used for driving, and the rectangular vibration mode 1 or mode 2 shown in FIG. 23 and FIG. 24, respectively, or the square vibration mode 1 which is shown in FIG. 17 and which is generated from the coupling therebetween is used for detection.

In the case of a rectangular shape, if the vibration mode 6, for which detection is not possible, shown in FIG. 28, is eliminated, the vibration mode 3 which is shown in FIG. 25 is the only mode which coincides with the square.

There is a clear difference in characteristic vibration frequency between this and the vibration mode for detection. With regard to this frequency difference, if one considers the vibration modes which are intrinsically different, even if it is possible to perform adjustment so that the characteristic vibration frequencies coincide, this would affect the overall symmetry of the tuning fork, thereby increasing the vibration noise, making it impossible to achieve a high Coriolis force detection S/N ratio.

Accordingly, it is an object of the present invention to provide a vibration gyro which solves the above-noted problems, this vibration gyro having good detection sensitivity and good detection accuracy.

DISCLOSURE OF THE INVENTION

To solve the foregoing object, a vibration gyro according to the present invention basically employs the technical structure that is described below.

Namely, a vibration gyro according to the present invention is made of a resilient material, comprising four beams and a base part that is integrally formed with the beams, wherein the four beams are disposed at equal distances and at uniform angular spacing with respect to the center part of the base part; a first part of the beams comprising at least a part of the beams selected from the beams, which are caused to make self-excitation resulting in a first vibration along a first direction that is not within a plane that includes the center lines of the selected two mutually adjacent beams and the first vibration being separable into a first bending vibration and a second bending vibration; a second part of the beams comprising at least a part of the beams selected from the beams and including at least one beam belonging to the first part of the beams, which are caused to make self-excitation resulting in a second vibration along a second direction different from the first direction and which is not within a plane that includes the center lines of the selected two mutually adjacent beams and the second vibration being separable into a first bending vibration and a second bending vibration; at least one electrode selected from a group of a drive electrode and a detection electrode each being made of piezo-electric element is provided on a side surface of each of the beams; and a voltage that is generated by bending vibration on at least a part of the beams is measured.

It is preferred that the vibration gyro according to the present invention be structured so that a piezo-electric drive electrode and a piezoelectric detection electrode are provided on all side surfaces of the beams, and a voltage generated by bending vibration from all the beams is measured.

Further, the vibration gyro according to the present invention may be structured so that the second vibration is caused by Coriolis force caused by rotation of the vibration gyro.

Because the vibration gyro according to the present invention employs the above-described structure, by arranging the four beams in a quad-divided square having good symmetry, the base part is substantially stationary for either employed vibration, without using vibration that is affected at the support part, such as by extraplanar vibration in the tuning fork type, and an angle can be detected with good accuracy without performance being affected by the method of support. Matching of the excitation to obtain a large output signal and the resonant frequency for detection can be achieved without placing great expectations on machining and assembly precision, and because a large output signal in the resonant detection direction is obtained with the structure, and a structure which can cancel output other than Coriolis force is obtained, and so noise is small and a high S/N can be achieved.

Additionally, because the beams for acceleration and detection are separate, DC drift due to phase shifting caused by vibration is substantially nil.

DESCRIPTION OF THE PREFERRED EMBODIMENTS

The specific structure of a vibration gyro according to the present invention is described below, with reference being made to the relevant accompanying drawings.

Figure 1:
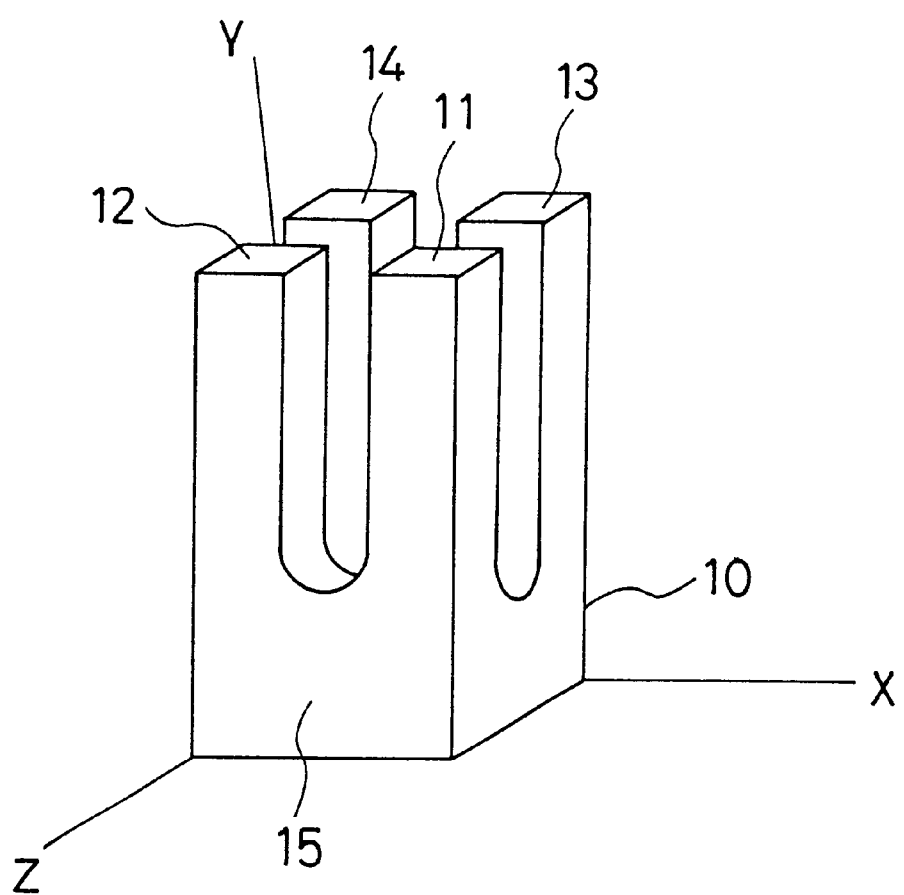
FIG. 1 is a perspective view that shows an outer view of a fourbeam tuning fork vibration gyro according to the present invention.

FIG. 1 is a drawing illustrating the structure of a first embodiment according to the present invention, in which drawing the vibrating gyro comprising four beams, electrodes, and a base part, wherein the beams are made of a material that exhibits resilience, the shape of the beams being a rectangular prism, respectively, the beams having a driving section and a detecting section that are formed on a side surface thereof, the driving section and detecting section being made up of piezo-electric elements, the base being made of a material that exhibits resilience, the shape of the base being a rectangular prism, the four beams being disposed in mutually parallel fashion on the base and arranged in a quad-divided square, wherein self-excited oscillation is caused using the piezo-electric elements of the first and second beams, a first bending vibration being caused to occur, and simultaneously with this, self-excited oscillation is caused using the piezo-electric elements of the second and fourth beams, a second bending vibration being generated which has a vibration frequency that coincides with the first bending vibration in a direction that is perpendicular to the first bending vibration, a third bending vibration being generated as a vibration that is synthesized from the first bending vibration and the second bending vibration, a voltage that results from a fifth bending vibration that is a component of a fourth bending vibration in the direction of the first bending vibration and the fourth bending vibration being a vibration in a direction that is perpendicular to the third bending vibration that is excited by a Coriolis force caused by rotation of the gyro, being detected by means of the electrodes of the fourth and third beams, and a voltage that results from a sixth bending vibration that is a component of the fourth bending vibration in the direction of the second bending vibration is detected by the electrodes of the first and third beams.

In a vibration gyro according to the present embodiment, the oscillator circuit for generating the third bending vibration and the oscillator circuit for generating the fourth bending vibration are not disposed separately, but are preferably a single oscillator circuit.

Further, in a vibration gyro according to the present embodiment, the piezo-electric elements of the third beam performing the first bending vibration and the piezo-electric elements of the fourth beam vibration are preferably mutually electrically connected.

In a vibration gyro according to the present embodiment, for example, the piezo-electric elements of the first beam performing the second bending vibration and the piezo-electric elements of the third beam vibration are mutually electrically connected.

Additionally, the vibration gyro according to the present embodiment may be provided with a lock-in amplifier to detect voltage output which the fifth bending signal causes to be generated at the piezo-electric element affixed to the third beam, taking as a reference signal the voltage output which the bending vibration synthesized from the first bending vibration and the fifth bending vibration causes to be generated at the piezo-electric element affixed to the third beam.

Further, in the present embodiment, the vibration gyro is provided with a lock-in amplifier to detect voltage output which the sixth bending signal causes to be generated at the piezo-electric element affixed to the third beam, taking as a reference signal the voltage output which the bending vibration synthesized from the second bending vibration and the sixth bending vibration causes to be generated at the piezo-electric element affixed to the third beam.

It is sufficient for the vibration gyro according to the present embodiment to be provided with a lock-in amplifier to detect voltage output which the fifth bending signal causes to be generated at the piezo-electric element affixed to the third beam, taking as a reference signal the voltage output which the bending vibration synthesized from the second bending vibration and the sixth bending vibration causes to be generated at the piezo-electric element affixed to the third beam or to be provided with a lock-in amplifier to detect voltage output which the sixth bending signal causes to be generated at the piezo-electric element affixed to the third beam, taking as a reference signal the voltage output which the bending vibration synthesized from the first bending vibration and the fifth bending vibration causes to be generated at the piezo-electric element affixed to the third beam.

The vibration gyro according to the present embodiment is provided with a differential amplifier circuit to add output from a first lock-in amplifier to detect voltage output which the fifth bending vibration causes to be generated at the piezo-electric element affixed to the third beam and output from a second lock-in amplifier to detect voltage output which the sixth bending vibration causes to be generated at the piezo-electric element affixed to the third beam.

The vibration gyro may also be provided with a differential amplifier circuit to add output from a first lock-in amplifier to detect voltage output which the fifth bending vibration causes to be generated at the piezo-electric element affixed to the third beam and output from a second lock-in amplifier to detect voltage output which the sixth bending vibration causes to be generated at the piezo-electric element affixed to the third beam.

Embodiments of a vibrating gyro according to the present invention are described in detail below, with reference being made to the relevant accompanying drawings.

In the vibration gyro according to the present invention described below, an example of a case wherein the beams of the tuning fork have a cross-sectional rectangular-prism shape is employed, and the description centers on examples wherein the beam portions of rectangular-prism shape are arranged uniformly in a quad-divided square on a single base part, but the cross-sectional configuration of each of the beam portions of the tuning fork according to the present invention is not restricted to a specific configuration but may be a circular, elliptical, polygonal, or other configuration, and moreover, the disposed locations of the beams arranged on the base part is not restricted to a quad-divide square but may employ any configuration wherein they are arranged equidistantly and mutually uniformly with respect to the center of the base.

Figure 2:
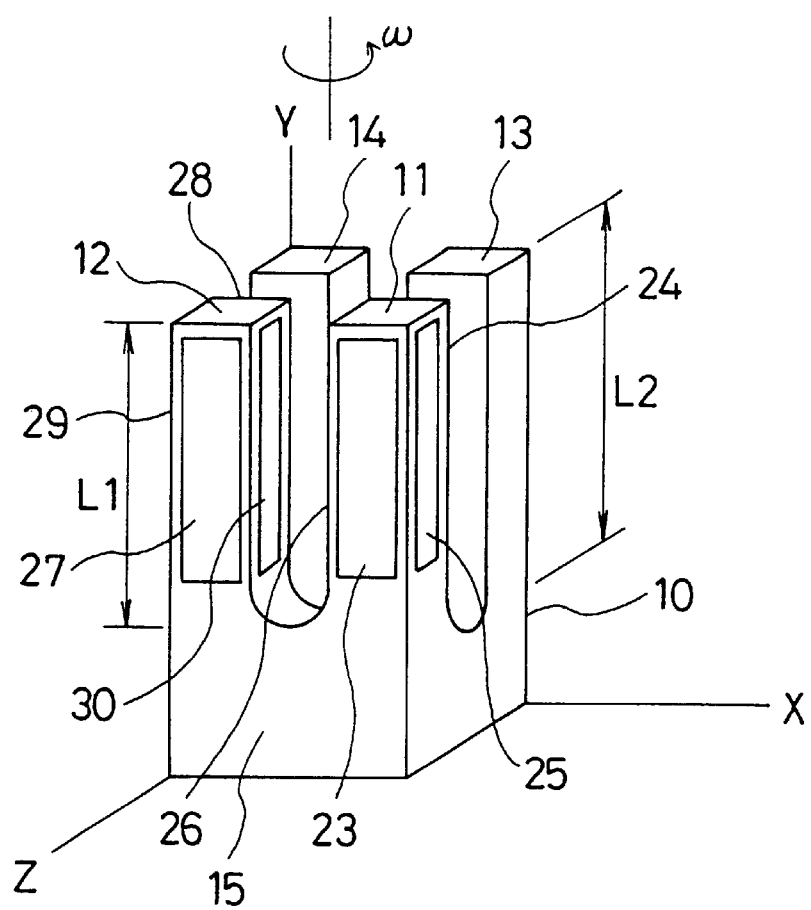
FIG. 2 is a perspective view that shows the locations of electrodes of four-beam tuning fork vibration gyro according to the present invention.
Figure 3:
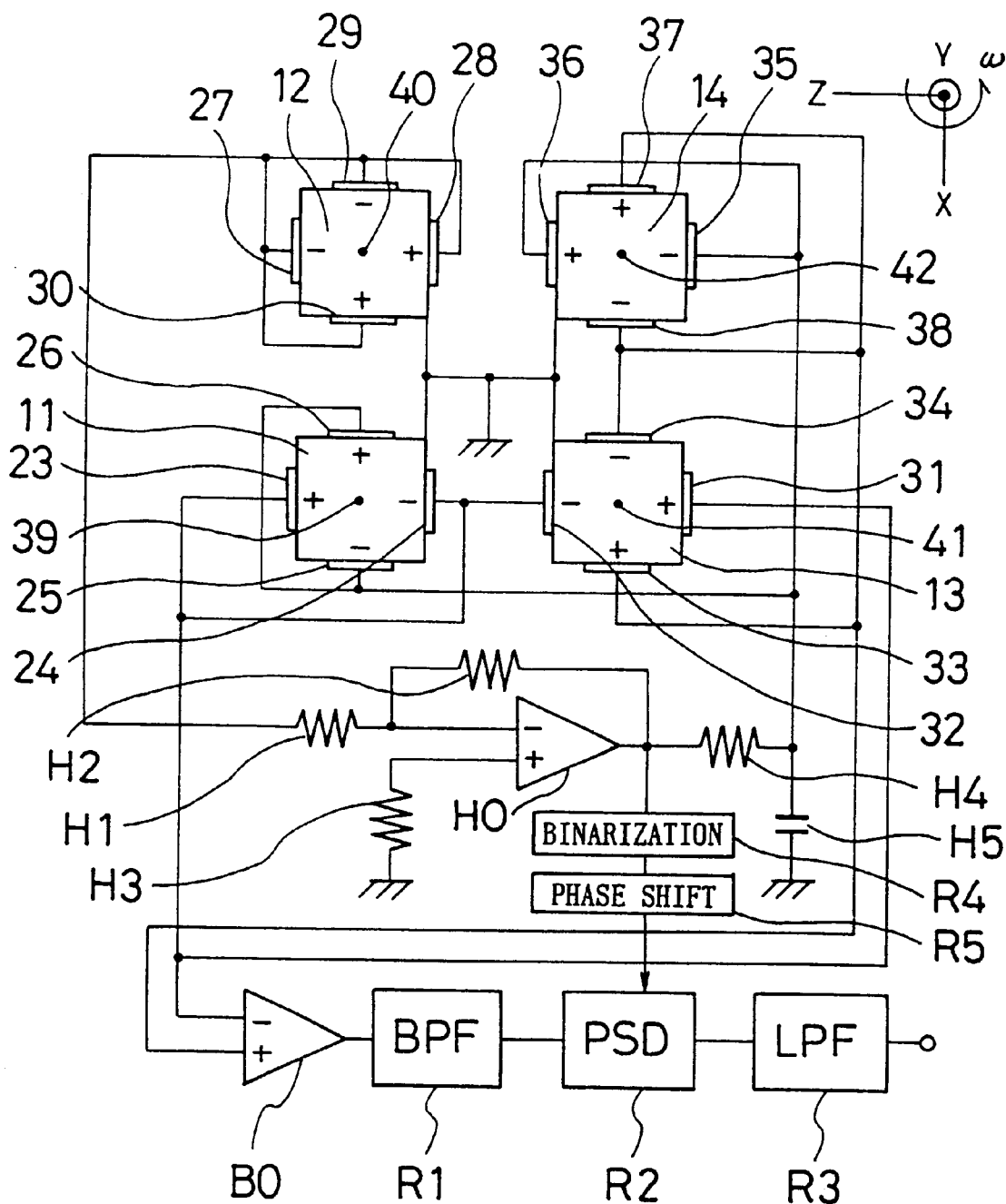
FIG. 3 is a drawing which shows a cross-section view of electrode structure in the Y-axis direction of a vibration gyro which is a first embodiment according to the present invention as viewed from the ends and a schematic wiring diagram thereof.
Figure 4:
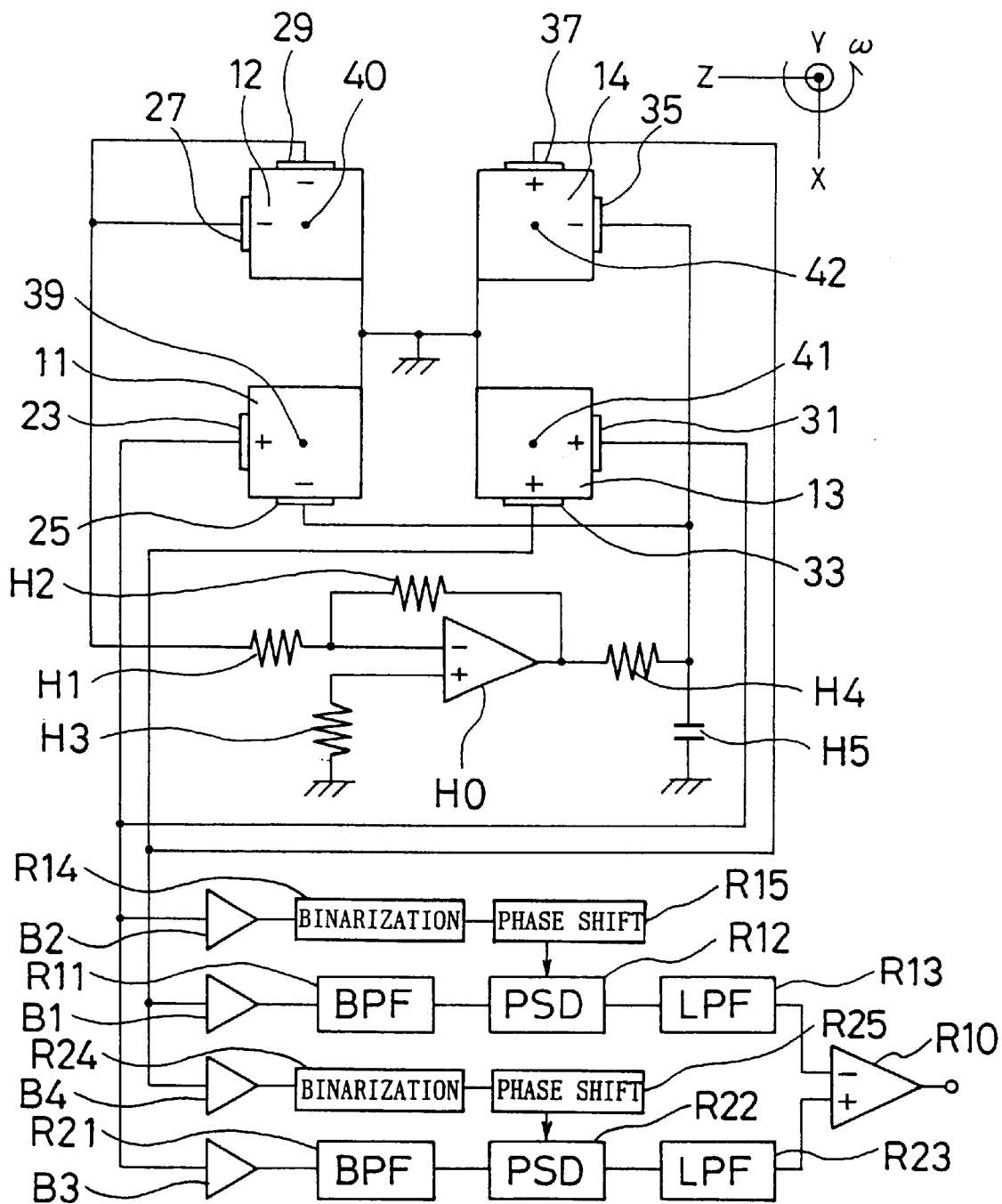
FIG. 4 is a drawing which shows a cross-section view of electrode structure in the Y-axis direction of a vibration gyro which is a second embodiment according to the present invention as viewed from the ends and a schematic wiring diagram thereof.
Figure 5:
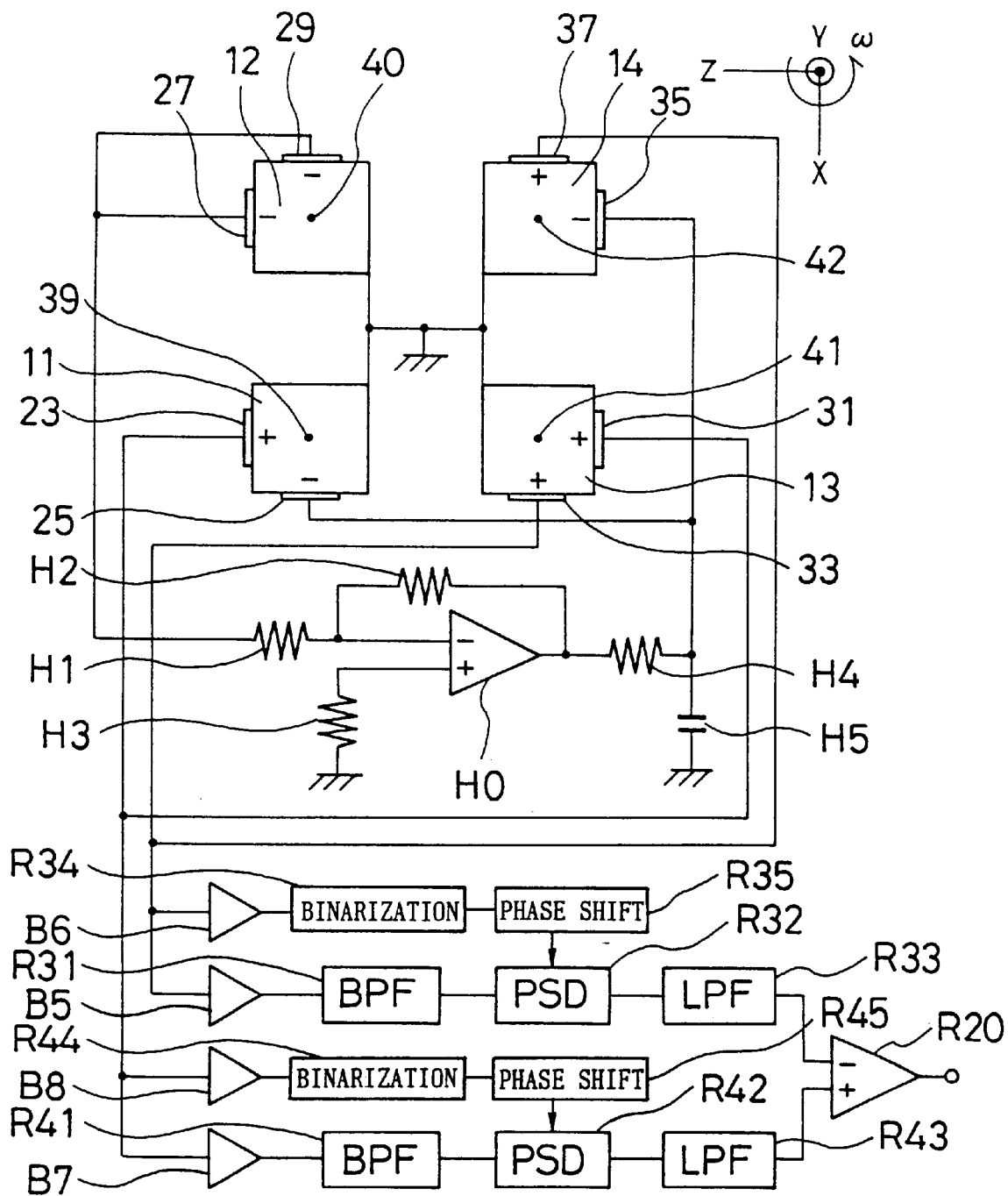
FIG. 5 is a drawing which shows a cross-section view of electrode structure in the Y-axis direction of a vibration gyro which is a second embodiment according to the present invention as viewed from the ends and a schematic wiring diagram thereof.
Figure 6:
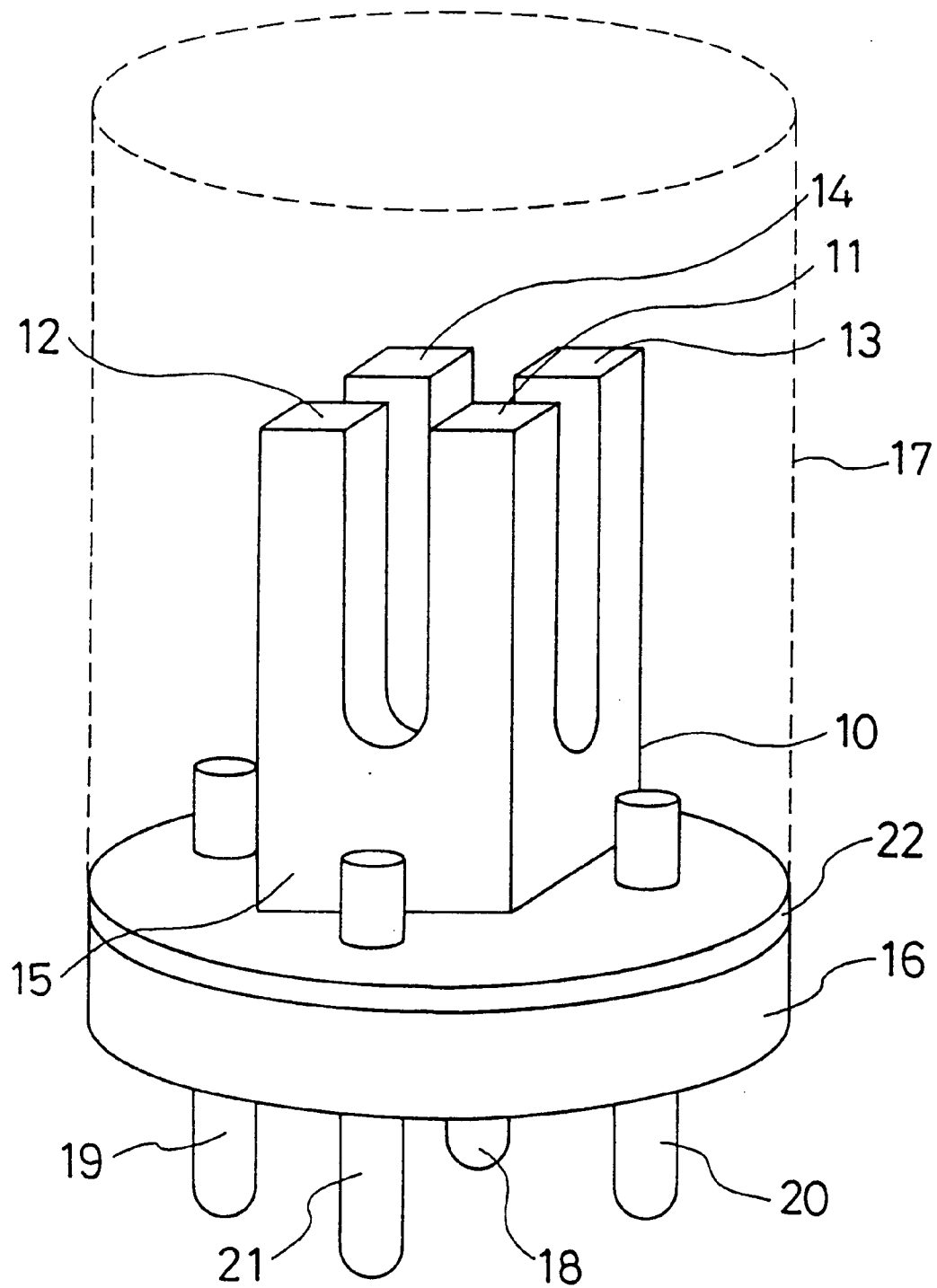
FIG. 6 is a drawing that shows an outer view of a vibration element enclosed in a cylindrical tube of a four-beam tuning fork vibration gyro which is a mode of embodiment of the present invention.
Figure 9:
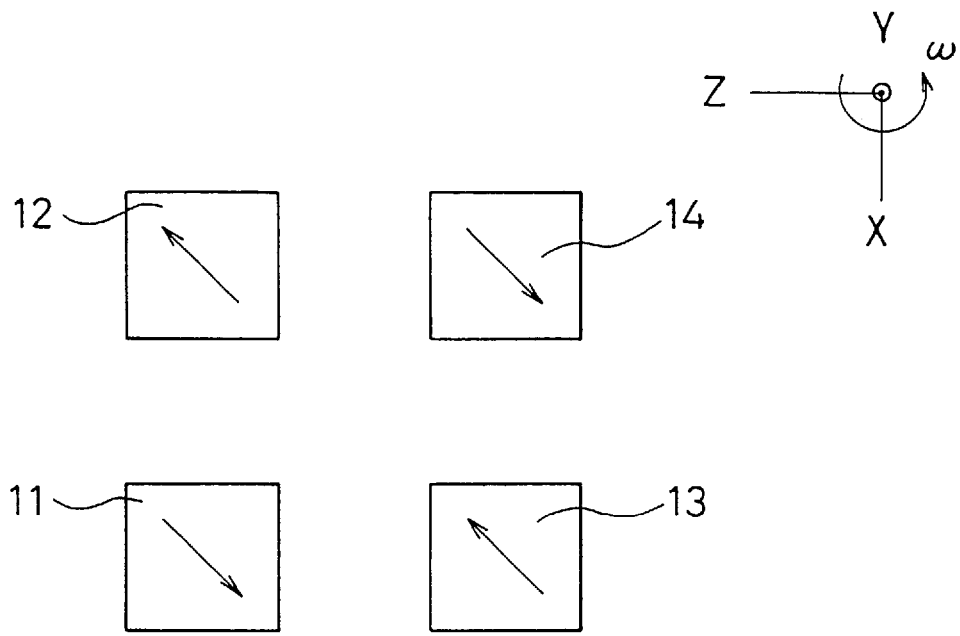
FIG. 9 is a drawing which illustrates the operation of a four-beam tuning fork vibrating gyro that is an embodiment of the present invention, and which schematically shows the cross-sections of the beams in the Y-axis direction as seen from the ends thereof.
Figure 10:
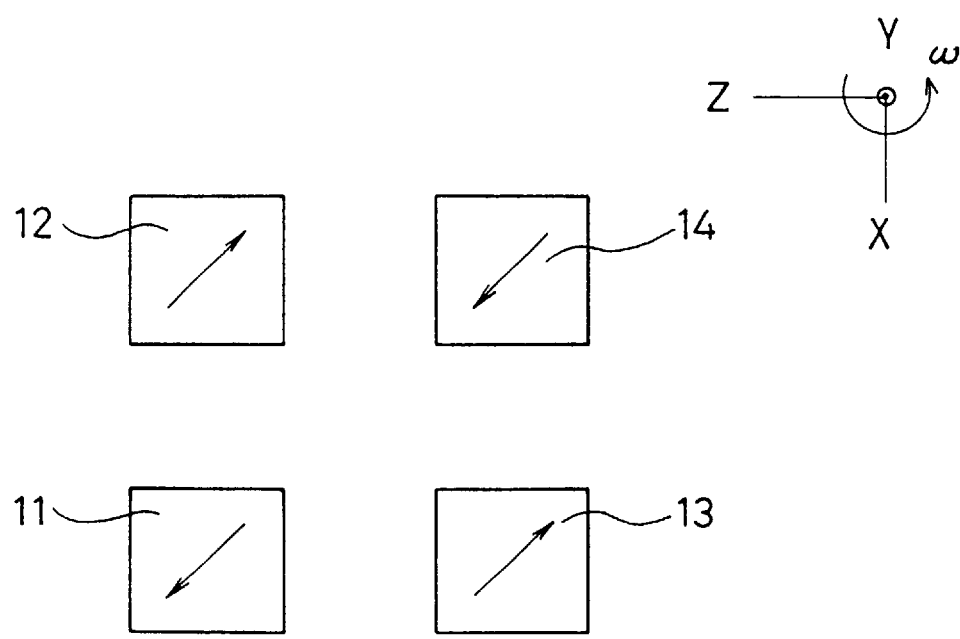
FIG. 10 is a drawing which illustrates the operation of a four-beam tuning fork vibrating gyro that is an embodiment of the present invention, and which schematically shows the cross-sections of the beams in the Y-axis direction as seen from the ends thereof.
Figure 11:
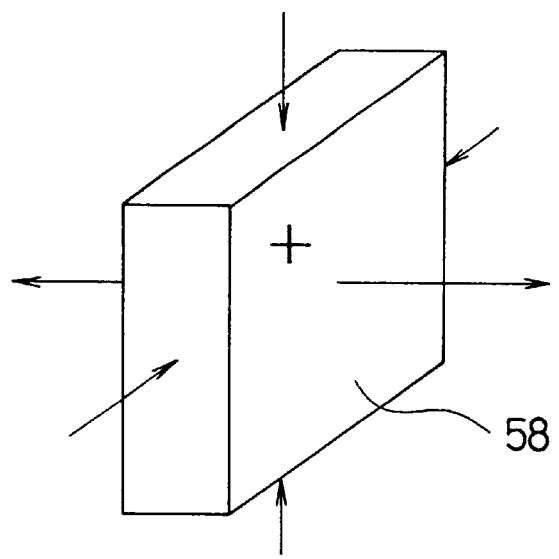
FIG. 11 is a perspective view that shows a piezo-electric element used in a vibration gyro of four-beam tuning fork type which is an embodiment of the present invention.
Figure 12:
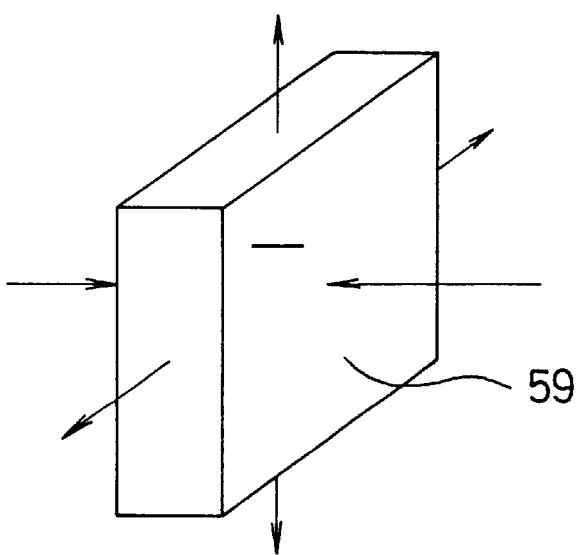
FIG. 12 is a perspective view that shows a piezo-electric element used in a vibration gyro of four-beam tuning fork type which is an embodiment of the present invention.

FIG. 1 through FIG. 12 are vibration gyros which are embodiments of the present invention, wherein FIG. 1 is a perspective view that shows an outer view of a four-beam tuning fork vibration gyro which is termed a "four-beam tuning fork" below, indicating the coordinates used in the description below, FIG. 2 is a perspective view that shows the locations of the piezo-electric elements and indicates the locations of the fork for adjusting vibration, FIG. 3 is a drawing which shows a cross-section view of the piezo-electric elements in the Y-axis direction as viewed from the ends of the beams of the four-beam tuning fork type and a schematic wiring diagram thereof, FIG. 6 is a drawing that shows an outer view of the structure of a vibration gyro enclosed in a cylindrical tube of a four-beam tuning fork, FIG. 7, FIG. 8, FIG. 9, and FIG. 10 are drawings which illustrate the operation of a four-beam tuning fork, and which schematically show the cross-sections of the beams in the Y-axis direction as seen from the ends thereof, and FIG. 11 and FIG. 12 are perspective views that show the state of deformation of a piezo-electric element.

FIRST EMBODIMENT

As shown in FIG. 1, the four-beam tuning fork type 10 is formed by a first beam 11, a second beam 12, a third beam 13, a fourth beam 14, piezo-electric elements not illustrated, and a base part 15. The beams are made from metal or silica glass exhibiting resiliency, the shape of each being a rectangular prism, and each having a driving section and a detecting section made up of a piezo-electric element affixed to a side surface of the rectangular prism. The base part is made from metal or silica glass exhibiting resiliency, the shape being a rectangular prism.

The first beam 11, second beam 12, third beam 13, and fourth beam 14 are disposed in mutually parallel directions onto the four vertices of the square base part 15, and the base part 15 is formed together as one with the first beam 11, second beam 12, third beam 13, and fourth beam 14.

An alloy known as Elinvar containing 50% iron, 35% nickel, and 9.1% chrome and whose resiliency coefficient has low temperature dependence is used in the present embodiment. Similarly, in a case where silica glass whose resiliency coefficient has low temperature dependency is used, a silver or chrome thin film may be priorly formed on the surface thereof using a method such as electroless plating or CVD.

In the description of the four-beam tuning fork 10 below, the Y-axis, Z-axis, and X-axis coordinate axes are set parallel to the respective sides. The longitudinal direction, that is, the direction in which the beams extend, is defined as the Y axis, the width direction as the Z axis, and the thickness direction as the X axis. The longitudinal, width, and thickness directions of the four-beam tuning fork 10 defined in this fashion are parallel to the Y, Z, and X axes, respectively. However, because the four-beam tuning fork 10 has a symmetric configuration within the X-Z plane, the terms "width" and "thickness" here have no particular meaning. The terms X- or Z-direction width are employed below.

FIG. 2 depicts, as one example, driving and detecting sections formed by the piezo-electric elements in an affixed stated on the first beam 11 and second beam 12. Because this is a perspective view the third beam 13 and fourth beam 14 are not illustrated, but piezo-electric elements are similarly affixed thereto. The piezo-electric elements are formed in thin sheets coated with silver or chrome alloy on both sides through CVD. One side of the piezo-electric element is coated with a conductive epoxy-based adhesive, and the element is priorly affixed to the appropriate side of the respective beam.

FIG. 3 shows a cross-section in the X-Z plane of the piezo-electric elements of the shape depicted in FIG. 2, cutting through the first beam 11, the second beam 12, the third beam 13, and the fourth beam 14.

The Piezo-electric elements 25 and 26 are affixed to the first beam 11, piezo-electric elements 27, 28, 29, and 30 are affixed to the second beam 12, and piezo-electric elements 35 and 36 are affixed to the fourth beam 14 for acceleration use.

The Piezo-electric elements 23 and 24 are affixed to the first beam 11, the piezo-electric elements 31, 32, 33, and 34 are affixed to the third beam 13, and the piezo-electric elements 37 and 38 are affixed to the fourth beam 14 for detection purpose.

FIG. 3 indicates an operational amplifier H0 making up an oscillator circuit to cause self-excitation vibration of all beams using the acceleration-use piezo-electric elements 25, 26, 27, 28, 29, 30, 35, 36 together with their respective electrodes, a first resistance H1, a second resistance H2, and a third resistance H3 to determine an amplification ratio of an inverting amplifier using an operational amplifier H0, a fourth resistance H4 and first capacitance H5 for phase-adjusting use, a damping buffer B0 making up a lock-in amplifier to detect signals from the respective electrodes of the detecting-use piezo-electric elements 23, 24, 31, 32, 33, 34, 37, and 38, a bandpass filter R1, a multiplier R2, a low-pass filter R3, a waveform shaping circuit R4 to shape a lock-in amplifier reference waveform, and a phase offset circuit R5 to adjust the phase of the reference waveform, and shows the wiring therebetween.

FIG. 6 shows the configuration of a four-beam tuning fork 10 as a gyro element sealed in a cylindrical tube. The base 16 is made of an insulating material such as ceramic, with a printed wiring board 22 adhered to the top surface thereof. The four-beam tuning fork 10 is fixed by adhesion to the printed wiring board 22. The base 16 to which the four-beam tuning fork 10 is fixed is pressed into a metallic cap 17, and the base 16 and metal cap 17 seal the four-beam tuning fork 10, thereby maintaining the internal environment within which the four-beam tuning fork 10 exists. This internal environment can be, for example, an atmosphere of an inert gas such as nitrogen, and the pressure thereof can be adjusted with consideration given to the vibration characteristics of the four-beam tuning fork 10 as a resonator, that is, with consideration given to the Q value and resonance impedance value that would facilitate use as a vibrating gyro.

The electrodes of the piezo-electric elements 25, 26, 27, 28, 29, 30, 35, 36, 23, 24, 31, 32, 33, 34, 37, and 38 affixed to the four-beam tuning fork 10 shown in FIG. 3 are electrically connected by soldered interconnects employing conductive wiring to leads 18, 19, 20, and 21 hermetically sealed inside the base 16. The leads 18, 19, 20, and 21 are electrically connected to the oscillator circuit and lock-in amplifier indicated in FIG. 3.

Next, the vibration operation of the vibrating gyro according to the present invention will be described, with reference being made to FIG. 11 and FIG. 12.

That is, FIG. 11 and FIG. 12 depict the operation of the piezo-electric elements. When a piezo-electric element termed a "PZT" employed with the present embodiment is priorly applied with high voltage and polarized, the direction of deformation varies according to the direction of the voltage applied to the piezo-electric element. FIG. 11 shows an increase in thickness of a surface 58, termed a (+) surface, which contracts vertically and horizontally in a state where positive voltage is applied.

Similarly, FIG. 12 shows a decrease in thickness of a surface 59, termed a (−) surface, which contracts vertically and horizontally in a state where positive voltage is applied. The symbols (+) and (−) indicated in FIG. 3 indicate which surfaces among the piezo-electric element surfaces of the four-beam tuning fork 10 to which beams whereon piezo-electric elements are affixed the beams are adhered to.

In FIG. 3, a first neutral line 39 of the Y-direction bending vibration of the first beam 11 is indicated by a point, a second neutral line 40 of the Y-direction bending vibration of the second beam 12 is indicated by a point, a third neutral line 41 of the Y-direction bending vibration of the third beam 13 is indicated by a point, and a fourth neutral line 42 of the Y-direction bending vibration of the fourth beam 14 is indicated by a point. The lines on the outer side of the drawing indicate the wiring between the several electrodes as a schematic representation.

In FIG. 3, when voltage is applied from the operational amplifier H0 to the electrodes of the piezo-electric elements 25 and 26 of the first beam 11, for example, the piezo-electric element 25 contracts in the Y direction and at the same time the piezo-electric element 26 expands in the Y direction, resulting in bending displacement in the X direction. This direction changes over time, resulting in bending vibration of the first beam 11 in the X-axis direction. When this occurs, even if the only driven beam is the first beam 11, the vibration of the first beam 11 is transmitted through the base part 15 so that the second beam 12, the third beam 13, and the fourth beam 14 automatically vibrate, the first beam 11 and the second beam 12 vibrating as a tuning fork in the Y-X plane, the third beam 13 and the fourth beam 14 in the Y-X plane, and a first bending vibration as a tuning fork in a phase that is inverted with respect to the vibration of the first beam 11 and the second beam 12 being self-excited. At this time a voltage signal for continuing self-excitation is returned from the electrodes of the piezo-electric elements 29 and 30 of the second beam 12 to the operational amplifier H0. The beam vibrated by this operational amplifier H0 may be the second beam 12, and the beam which receives the return signal may be the first beam 11.

When simultaneously thereto voltage is applied from the operational amplifier H0 to the electrodes of the piezo-electric elements 35 and 36 of the fourth beam 14, for example, the piezo-electric element 35 contracts in the Y direction and at the same time the piezo-electric element 36 expands in the Y direction, resulting in bending displacement in the Z direction. This direction changes over time, resulting in bending vibration of the fourth beam 14 in the Z-axis direction. When this occurs, even if the only driven beam is the fourth beam 14, the vibration of the fourth beam 14 is transmitted through the base part 15 so that the first beam 11, the second beam 12, and the third beam 13 automatically vibrate, the first beam 11 and the third beam 13 vibrating as a tuning fork in the Y-Z plane, the second beam 12 and the fourth beam 14 in the Y-Z plane, and a second bending vibration as a tuning fork in a phase that is inverted with respect to the vibration of the second beam 12 and the fourth beam 14 being self-excited.

At this time a voltage signal for continuing self-excitation is returned from the electrodes of the piezo-electric elements 27 and 28 of the second beam 12 to the operational amplifier H0. The beam vibrated by this operational amplifier H0 may be the second beam 12, and the beam which receives the return signal may be the fourth beam 14.

Figure 7:
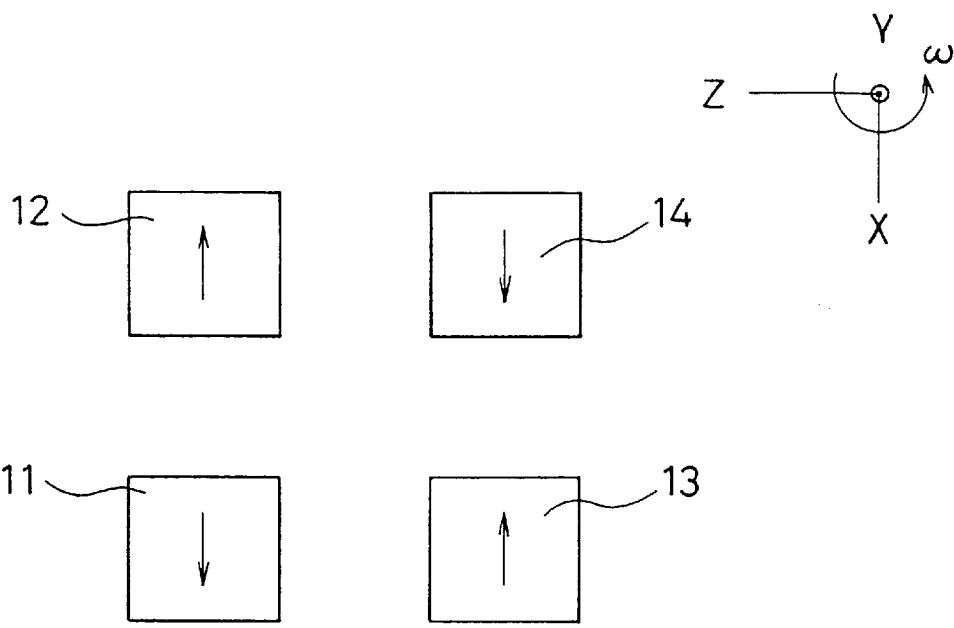
FIG. 7 is a drawing which illustrates the operation of a four-beam tuning fork vibrating gyro that is an embodiment of the present invention, and which schematically shows the cross-sections of the beams in the Y-axis direction as seen from the ends thereof.
Figure 8:
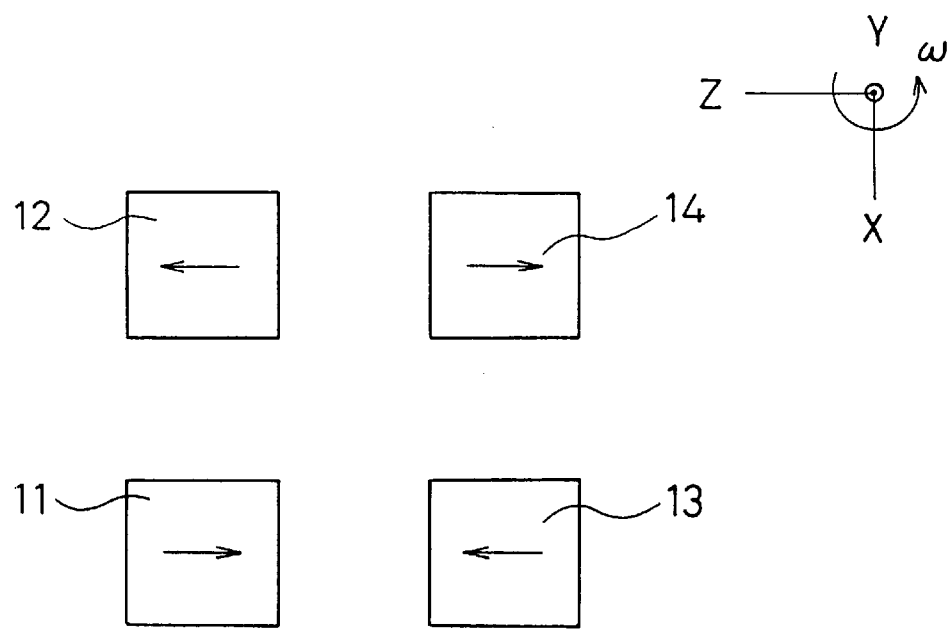
FIG. 8 is a drawing which illustrates the operation of a four-beam tuning fork vibrating gyro that is an embodiment of the present invention, and which schematically shows the cross-sections of the beams in the Y-axis direction as seen from the ends thereof.

FIG. 7 shows a schematic representation of the first bending vibration. With the first bending vibration, the first beam 11, the second beam 12, the third beam 13, and the fourth beam 14 of the four-beam tuning fork 10 exhibit bending vibration within the Y-X plane, the instantaneous displacement directions thereof being indicated by the arrows in this drawing. FIG. 8 shows a schematic representation of the second bending vibration. With the second bending vibration, the first beam 11, the second beam 12, the third beam 13, and the fourth beam 14 of the four-beam tuning fork 10 exhibit bending vibration within the Y-Z plane. In this case as well, the instantaneous displacement directions thereof are indicated by arrows.

The first bending vibration which is shown in FIG. 7 and the second bending vibration which is shown in FIG. 8 were verified to exist as resonant frequencies in an elastic body by means of verification with a prototype of the four-beam tuning fork 10. That is, in the first bending vibration all the beams vibrate in the X direction, the first beam 11 and the second beam 12 vibrate as a normal tuning fork, simultaneously with which the third beam 13 and the fourth beam 14 vibrate as a tuning fork in a phase that is inverted with respect to the vibration exhibited by the first beam 11 and the second beam 12.

In the second bending vibration, all beams vibrate in the Z direction, the first beam 11 and the third beam 13 vibrate as a normal tuning fork, simultaneously with which the second beam 12 and the fourth beam 14 vibrate as a tuning fork in a phase that is inverted with respect to the vibration exhibited by the first beam 11 and the third beam 13. These vibrations are characterized by balance between the four beams and, because the base part 15 is a node and is exhibiting almost no vibration, if the bottom surface of the four-beam tuning fork 10 is supported, there is almost no influence on the vibration condition by the support method.

FIG. 9 shows the condition of bending vibration in a four-beam tuning fork 10 for the case in which both the first bending vibration and the second bending vibration exist simultaneously. The four-beam tuning fork 10 is of a design having a symmetrical configuration in the X-axis and Z-axis directions, but in a case where machining precision is insufficient and the symmetry thereof is not assured, the respective characteristic mechanical resonant frequencies of the first bending vibration and the second bending vibration diverge, but in the circuit structure of FIG. 3, the reference signals of the first bending vibration and the second bending vibration are input to the single operational amplifier H0, and the voltage output of the single operational amplifier H0 excites the first bending vibration and the second bending vibration.

In this case the electromechanical vibrating system of the four-beam tuning fork 10 exhibiting the first bending vibration and the electromechanical vibrating system of the four-beam tuning fork 10 exhibiting the second bending vibration unite, the vibration frequency of the first bending vibration, f1, and the vibration frequency of the second bending vibration, f2, respectively change and become the same frequency, generating a third bending vibration having a frequency, f3, intermediate between the vibration frequency f1 of the first bending vibration and the vibration frequency f2 of the second bending vibration.

A note must be made in this regard. With the circuit structure shown in FIG. 3 the frequencies of the first bending vibration and the second bending vibration can be caused to coincide by an electromechanical attraction effect, but in a case where the respective mechanical Q values are large, there is a limit in the coincidence of the frequencies, and when the respective mechanical resonant vibration frequencies are excessively diverged, it is not possible to cause the first bending vibration and the second bending vibration to be simultaneously generated and cause the third bending vibration to be generated.

Under these conditions, efforts are made to bring the first bending vibration resonant frequency and the second bending vibration close together. Because the bending vibration resonant frequency of a bar-shaped resonator is proportional to the width thereof in the bending direction, the cross-section of the four-beam tuning fork 10 in the direction that is perpendicular to the Y axis is machined with good accuracy, and the resonant frequency of the second bending vibration and the resonant frequency of the first bending vibration are brought close together. However, in the case of mass production, the machining precision of wire saws and dicing saws generally used in machining is on the order of ±3$\mu$, so that if the width of each beam of a four-beam tuning fork vibrating gyro 10 were to be 300$\mu$, 1% or so would be the limit of machining accuracy. If adjustment to greater accuracy is required, because the resonant frequency of a bar-shaped resonator is inversely proportional to the square of the length of the bar, machining is done so that the beam length L1 as seen from the Z-axis direction as shown in FIG. 2 is made to differ from the length L2 of the beam as seen from the X direction, by making the depths of each base point differ.

By performing further precise machining of this part locally, it is possible to get a more precise matching between the first bending vibration resonant frequency and the second bending vibration resonant frequency, thereby allowing the realization of a third bending vibration.

When this third bending oscillation is generated, causing the four-beam tuning fork vibrating gyro 10 to rotate with an angular velocity ω about the Y-axis, each beam is subjected to a Coriolis force in the direction perpendicular to the direction of displacement, with the fourth bending vibration illustrated in FIG. 10 being excited by this Coriolis force. The vibration frequency of the fourth bending vibration coincides exactly with the vibration frequency of the third bending vibration. Accordingly, the excitation of the fourth bending vibration by the third bending vibration is caused by forced vibration, enabling generation of the fourth bending vibration with an extremely large amplitude with optimum efficiency.

The fourth bending vibration has as a constituent in the X-axis direction a fifth bending vibration. The fifth bending vibration exhibits the effect of changing the amplitude and phase of the first bending vibration. The effect of the fifth bending vibration changes the distortion generated by the first bending vibration of the fourth beam 14 within the X-Y plane, changing the voltage generated by the piezo-electric elements 37 and 38 in FIG. 3.

In accordance with the principles of Coriolis force generation, distortion in the Y-axis direction is proportional to the angular velocity ω, thus the change in voltage generated by the piezo-electric elements 37 and 38 is also proportional to the angular velocity ω. The voltage generated by the piezo-electric elements 37 and 38, including the change in voltage that is proportional to the angular velocity, is input to the negative of the input buffer B0.

Additionally, this changes the distortion generated by the first bending vibration of the third beam 13 in the Y-X plane, changing the voltage generated by the piezo-electric elements 33 and 34 in FIG. 3. As the distortion in the Y-axis direction is caused by the generation of a Coriolis force, it is proportional to the angular velocity ω, and the change in voltage generated by the piezo-electric elements 33 and 34 is thus proportional to the angular velocity ω. The voltage generated by the piezo-electric elements 33 and 34, including changes in voltage proportional to the angular velocity, is input to the negative of the input buffer B0.

Although in this arrangement, the piezo-electric element 33, the piezo-electric element 34, the piezo-electric element 37, and the piezo-electric element 38 are connected together electrically, addition of the vibration and the buffering in the X-axis direction of the four-beam tuning fork vibrating gyro 10 produces the effect of a mutual cancellation of noise output.

Similarly, the fourth bending vibration has as a constituent in the Z-axis direction the sixth bending vibration. The sixth bending vibration has an effect of changing the amplitude and phase of the second bending vibration. The effect of the sixth bending vibration changes the distortion generated by the second bending vibration of the first beam 11 within the Y-Z plane, changing the voltage generated by the piezo-electric elements 23 and 24 in FIG. 3.

In accordance with the principles of Coriolis force generation, the distortion in the Y-axis direction is proportional to the angular velocity thus the change in voltage generated by the piezo-electric elements 23 and 24 is also proportional to the angular velocity ω. The voltage generated by the piezo-electric elements 23 and 24, including changes in voltage proportional to the angular velocity, is input to the positive of the input buffer B0. Additionally,is changes the distortion generated by the second bending vibration in the third beam 13 in the Y-Z plane, changing the voltage generated by the piezo-electric elements 31 and 32 in FIG. 3.

In accordance with the principles of Coriolis force generation, the Y-axis direction is proportional to the angular velocity ω, and the change in voltage generated by the piezo-electric elements 31 and 32 is thus proportional to the angular velocity ω. The voltage generated by the piezo-electric elements 31 and 32, including changes in voltage proportional to the angular velocity, is also input to the positive of the input buffer B0.

Although the piezo-electric element 23, the piezo-electric element 24, the piezo-electric element 31, and the piezo-electric element 32 are here connected together electrically, addition of the vibration and the buffering in the Z-axis direction of the four-beam tuning fork vibrating gyro 10 produces the effect of a mutual cancellation of noise output.

The fifth bending vibration and sixth bending vibration exhibit mutually opposite effects in response to rotation of the angular velocity. That is, the fifth bending vibration generated in the direction of the rotation of angular velocity ω increases the amplitude of the first bending vibration, and the sixth bending vibration generated by the angular velocity ω attenuates the amplitude of the second bending vibration, whereas the fifth bending vibration generated by the angular velocity ω attenuates the amplitude of the first bending vibration, and the sixth bending vibration generated in the direction of the rotation of the angular velocity ω increases the amplitude of the second bending vibration. Furthermore, when the fifth bending vibration generated by the angular velocity ω advances the phase of the first bending vibration, the sixth bending vibration generated by the angular velocity ω retards the phase of the second bending vibration, and when the fifth bending vibration generated by the angular velocity ω retards the phase of the first bending vibration, the sixth bending vibration generated in the direction of the rotation of the angular velocity ω advances the phase of the second bending vibration.

Thus, the output of the input buffer B0 receiving differential input is the difference of the AC output of the first bending vibration and the AC output of the second bending vibration combined with the sum of the effect of the fifth bending vibration and the effect of the sixth bending vibration resulting from the Coriolis force. By the composition of the lock-in amplifier, the AC output is removed from this output. After shaping of the output of the buffer B0 by a bandpass filter R1, the signal is then input to a multiplier R2. The multiplier is of a switching type so as to provide suppression of DC drift. Stated in other terms, the multiplier passes input signals having a phase of 0° or greater but less than 180°, and inverts input signals having a phase of 180° or greater but less than 360°.

The phase data used in the inversion of the input signal utilizes a reference signal formed by binarization of the output of buffer B2 by a binary quantizing circuit R4, followed by adjustment by a phase-shift circuit R5. The output of the multiplier H0 is passed by an extremely narrow-band lowpass filter as direct current. In this configuration, signal components of a frequency other than the reference signal frequency, which are treated as noise, are almost completely eliminated, thereby enabling signal extraction with an extremely high S/N, and as a result, only the sum of the effect of the fifth bending vibration and the effect of the sixth bending vibration excited by the Coriolis force, in the form of direct current, is extracted. From this, the angular velocity ω value can be determined accurately.

The third bending vibration of a four-beam tuning fork vibrating gyro according to the present invention comprises a tuning fork-shaped vibrating device having a large Q value. That is, it produces a signal exhibiting an extremely stable frequency. Therefore, the use of this as a reference signal allows the bandwidth of a bandpass filter functioning with a lock-in amplifier to be extremely narrowed. Stated in different terms, utilizing this arrangement, virtually all noise other than the signal resulting from the angular velocity ω can be eliminated.

gyro vibration as a reference signal, when detecting the signal generated by the fourth bending vibration produced by the Coriolis force, enables amplification with an extremely high S/N ratio. The present embodiment shows the smallest arrangement for realizing these aims at minimum cost.

SECOND EMBODIMENT

The following is a second embodiment of the present invention, in which an optimum mode of embodiment of a vibration gyro of the past is described below with reference to the drawings.

FIG. 1 through FIG. 12 show a vibrating gyro having a form that is a mode of the current embodiment.

FIG. 1 is a perspective view which shows the outer appearance of a tuning fork-shaped vibrating gyro having four beams, hereinafter referred to as a four-beam tuning fork vibrating gyro, indicating the coordinate axes that will be used in the descriptions thereof to follow.

FIG. 2 is a perspective view which shows the position of piezo-electric elements and the position of the branch points for the purpose of vibration adjustment.

FIG. 4 shows a cross-sectional view of the beams, seen from the ends thereof, a cross-sectional view of the piezo-electric element in the Y-axis direction, and an accurate schematic wiring diagram.

FIG. 6 is an outer view drawing which shows the configuration of a vibrating gyro having a four-beam tuning fork vibrating gyro sealed in a cylindrical tube.

FIGS. 7, 8, 9, and 10 are drawings illustrating the operation of a four-beam tuning fork vibrating gyro showing a cross-sectional view of the four beams in the Y-axis direction as seen from the end of the beams.

FIGS. 11 and 12 are perspective views showing the piezo-electric elements in a deformed state.

FIGS. 30, 31, 32, and 33 are drawings illustrating the effect of the Coriolis force.

As shown in FIG. 1, the four-beam tuning fork vibrating gyro 10 comprises a first beam 11, a second beam 12, a third beam 13, a fourth beam 14, and, while not shown in the figure, a piezo-electric element and base part 15. The beams are made of a resilient metal or quartz glass in a square form, with a group of piezo-electric elements consisting of a drive electrode and a detection electrode provided on a side surface of each of the beams. The base part is made of a resilient metal or quartz glass and is of a square shape. The first beam 11, second beam 12, third beam 13, and fourth beam 14 are disposed in mutually parallel fashion on the four vertices of the square base part 15, with the first beam 11, second beam 12, third beam 13, and fourth beam 14 the base part 15 being integrally formed.

The metal used to make up the present embodiment is Elinvar, a constant-resiliency alloy comprising 50% iron, 35% nickel, and 9.1% chromium, the resiliency characteristics of which are for the most part unaffected by temperature. If the material used is quartz glass, the resilience characteristics of which are similarly virtually unaffected by temperature, the surfaces are first prepared with a film of silver and chromium, using electroless deposition, vacuum deposition, or other means.

In the description of the four-beam tuning fork vibrating gyro 10 which follows, the coordinate axes Y-axis, Z-axis, and X-axis are determined to be parallel to the respective edges of the four-beam tuning fork vibrating gyro 10. In this arrangement, the beam longitudinal direction (the length direction of the beam) is taken as the Y-axis, the width direction is taken as the Z-axis, and the thickness direction is taken as the X-axis.

The longitudinal, width, and thickness directions of a four-beam tuning fork vibrating gyro 10 cut in the above-noted manner, are parallel to the Y-axis, the Z-axis, and the X-axis, respectively.

However, because there is symmetry within the X-Z plane in the four-beam tuning fork vibrating gyro 10, the terms width and thickness as used herein do not have any particular meaning.

In the description that follows, the X or Z direction will be referred to as the width direction.

FIG. 2 shows the condition of piezo-electric elements comprising a driving section and a detecting section formed onto the first beam 11 and the second beam 12. Similar piezo-electric elements are formed onto the third beam 13 and the fourth beam 14, although the perspective view format of this drawing does not allow these to be shown. The piezo-electric elements are of a thin plate, with the piezo-electric elements pre-treated by application of an alloy of silver and chromium deposited on both surfaces thereof. Slightly electrically conductive epoxy-type adhesive is applied to one surface of each of the piezo-electric elements, with a piezo-electric element then being affixed to each of the beams.

FIG. 4 is a cross-sectional view showing the piezo-electric elements shown in FIG. 2 in a cross-sectional view in the X-Z plane which intersects the first beam 11, the second beam 12, the third beam 13, and the fourth beam 14. In FIG. 3, each beam is disposed such that driving and detecting electrodes thereon comprise a bimorph. As FIG. 4 indicates that such driving and detecting is possible by means of a unimorph, piezo-electric elements on the inner surfaces of the tuning fork are unnecessary, and therefore have been omitted.

FIG. 4 shows a piezo-electric element 25 attached to the first beam 11, piezo-electric elements 27 and 26 attached to the second beam 12, and a piezo-electric element 35 attached to the fourth beam 14, each piezo-electric element being used for excitation of vibration. Furthermore, a detection piezo-electric element 23 is attached to the first beam 11, detection piezo-electric elements 31 and 33 are attached to the third beam 13, and a detection piezo-electric element 37 is attached to the fourth beam 14.

FIG. 4 shows, as an embodiment of an oscillation circuit for automatically oscillating all beams and the electrodes of each of the vibration-stimulating piezo-electric elements 25, 27, 29, and 31 used thereby, an operational amplifier H0, and a first resistance H1, a second resistance H2, and a third resistance H3 that serve to determine the amplification factor of the inverting amplifier used in the operational amplifier H0, a fourth resistance H4 for phase adjustment, and a condenser H5.

FIG. 4 shows a first lock-in amplifier for detecting the signal from each electrode of the detection piezo-electric elements 33 and 37, the lock-in amplifier comprising a first buffer B1, a first bandpass filter R11, a first multiplier R12, a first lowpass filter R13, a second buffer B2 for detecting signals from each electrode of the detection piezo-electric elements 23 and 31 comprising the first lock-in amplifier's reference wave, a first waveform shaping circuit R14 for shaping the waveform of the reference wave, and a first phase-shift circuit R15 for adjusting the phase of the reference signal.

FIG. 4 shows a second lock-in amplifier for detecting the signal from each electrode of the detection piezo-electric elements 23 and 31, the lock-in amplifier comprising a third buffer B3, a second bandpass filter R21, a second multiplier R22, a second lowpass filter R23, a fourth buffer B44 for detecting signals from each electrode of the detection piezo-electric elements 33 and 37 comprising the second lock-in amplifier's reference wave, a second waveform shaping circuit R24 for shaping the waveform of the reference wave, and a second phase-shift circuit R25 for adjusting the phase of the reference signal.

FIG. 4 shows a differential amplifier circuit R10 for synthesizing the output of the first lowpass filter R13 and the second lowpass filter R23.

FIG. 6 shows the configuration of a four-beam tuning fork vibrating gyro 10 as a gyro element sealed in a cylindrical tube. The base 16 is made of an insulating material such as ceramic, with the printed wiring board adhered to the top surface thereof. The four-beam tuning fork vibrating gyro 10 is fixed by adhesion to the printed wiring board 22.

The base 16 to which the four-beam tuning fork vibrating gyro 10 is fixed is pressed into a metallic cap 17, and the base 16 and metal cap 17 are sealed, thereby maintaining the internal environment within which the four-beam tuning fork vibrating gyro 10 exists.

This internal environment can be, for example, an atmosphere of an inert gas such as nitrogen, and the pressure thereof can be adjusted with consideration given to the vibration characteristics of the four-beam tuning fork vibrating gyro 10 as a resonator, that is, with consideration given to the Q value and resonance impedance value that would facilitate use as a vibrating gyro.

The electrodes of the piezo-electric elements 25, 27, 29, 35, 23, 31, 33, and 37 of the four-beam tuning fork vibrating gyro 10 are connected electrically to the leads 18, 19, 20, and 21, which are hermetically sealed, via the base 16. The leads 18, 19, 20, and 21 are connected to the oscillator circuit and buffers B1, B2, B3, and B4 comprising the lock-in amplifier shown in FIG. 4.

In FIG. 4, if a voltage from the operational amplifier H0 is applied to the electrode of piezo-electric element 25 on the first beam 11, in this example, the piezo-electric element 25 contracts in the Y-direction, resulting in displacement of the first beam 11 in the X-axis direction. This direction changes with time, with the result that the first beam 11 exhibits bending vibration in the X-axis direction. In this case, even if the only driven beam is the first beam 11, the vibration of the first beam 11 is transmitted via the base 15, the second beam 12, the third beam 13, and the fourth beam 14 vibrate automatically, the first beam 11 and second beam 12 vibrating as a tuning fork in the Y-X plane, and the third beam 13 and fourth beam 14 vibrating as a tuning fork in the Y-X plane with a phase that is inverted with respect to the vibration exhibited by the first beam 11 and second beam 12, this first bending force causing self-excitation. When this occurs, a voltage signal from the electrode of the piezo-electric element 29 on the second beam 12 caused by continuous self-excitation is returned to the operational amplifier H0. The beam exciting the operational amplifier H0 can also be the second beam 12, and the beam to which the return signal is fed back can be the first beam 11.

Simultaneously, as an example, if a voltage from the operational amplifier H0 is applied to the electrode of the piezo-electric element 35 on the fourth beam 14, the piezo-electric element 35 contracts in the Y-direction, and as a result, bending displacement occurs in the Z-axis direction. This direction changes with time, with the result that the fourth beam 14 exhibits bending vibration in the Z-axis direction.

When this occurs, even if the only driven beam is the fourth beam 14, the vibration of the fourth beam 14 is transmitted through the base part 15 so that the first beam 11, the second beam 12, and the third beam 13 vibrate automatically, with the first beam 11 and the third beam 13 vibrating as a tuning fork in the Y-Z plane, and the second beam 12 and fourth beam 14 vibrating as a tuning fork in the Y-Z plane with a phase that is inverted with respect to the vibration exhibited by the first beam 11 and the third beam 13, thus eliciting self-excitation of the second bending vibration. When this occurs, the voltage signal caused by continuous self-oscillation is returned from the electrode of the piezo-electric element 27 on the second beam 12 to the operational amplifier H0. The beam exciting the operational amplifier H0 can also be the second beam 12, and the beam to which the return signal is fed back can be the fourth beam 14.

FIG. 7 shows a schematic representation of the first bending vibration. With the first bending vibration, the first beam 11, the second beam 12, the third beam 13, and the fourth beam 14 of the four-beam tuning fork vibrating gyro 10 exhibit bending vibration within the X-Y plane, the instantaneous displacement thereof being indicated by the arrows in this drawing. Furthermore, FIG. 8 shows a schematic representation of the second bending vibration. With the second bending vibration, the first beam 11, the second beam 12, the third beam 13, and the fourth beam 14 of the four-beam tuning fork vibrating gyro 10 exhibit bending vibration within the Y-Z plane. In this case as well, the instantaneous displacement directions thereof are indicated by arrows.

The first bending vibration which is shown in FIG. 7 and the second bending vibration which is shown in FIG. 8 were verified to exist as resonant frequencies in an elastic body by means of verification with a prototype. That is, in the first bending vibration, all the beams vibrate in the X direction, the first beam 11 and the second beam 12 vibrate as a normal tuning fork, simultaneously with which the third beam 13 and the fourth beam 14 vibrate as a tuning fork in a phase that is inverted with respect to the vibration exhibited by the first beam 11 and the second beam 12.

In the second bending vibration, all beams vibrate in the Z direction, the first beam 11 and the third beam 13 vibrate as a normal tuning fork, simultaneously with which the second beam 12 and the fourth beam 14 vibrate as a tuning fork in a phase that is inverted with respect to the vibration exhibited by the first beam 11 and the third beam 13. These vibrations are characterized by balance between the four beams and, because the base part 15 is a node and is exhibiting almost no vibration, if the bottom surface of the four-beam tuning fork vibrating gyro 10 is supported, there is almost no influence on the vibration condition by the support method.

FIG. 9 shows a schematic representation of the condition of bending vibration in 10 four-beam tuning fork vibrating gyro 10 for the case in which both the first bending vibration and the second bending vibration exist simultaneously. Although the shape of the four-beam tuning fork vibrating gyro 10 is designed to have symmetry in the X-axis and Z-axis directions, if machining accuracy is insufficient, and if such symmetry cannot be ensured, then regardless of the differing mechanical resonance frequencies of the first bending vibration and second bending vibration, in the circuit constructed as shown in FIG. 4, a reference signal from the first bending vibration and second bending vibration is input to one operational amplifier H0, and the voltage output from another operational amplifier H0 is used for excitation of the first bending vibration and second bending vibration.

In this case, the electromechanical vibration system of the four-beam tuning fork vibrating gyro 10 in the first bending vibration and the electromechanical vibration system of the four-beam tuning fork vibrating gyro 10 in the second bending vibration are combined, and the vibration frequency of the first bending vibration f1 and the vibration frequency of the second bending vibration f2 are altered so as to converge at a single frequency, thus forming a third bending vibration having a frequency f between the frequency of the first bending vibration f1 and the frequency of the second bending vibration f2.

There is something that should be noted. In the circuit as devised in FIG. 4, although the mechanical drawing effect causes the frequencies of the first bending vibration and second bending vibration to coincide, if the mechanical Q value of each respective bending vibration is high, there is a limit to the degree of coincidence, and if the resonant frequency of each bending vibration is not sufficiently close to that of the other, generation of the third bending vibration caused by the simultaneous generation of the frequencies of the first bending vibration and second bending vibration is not possible.

The following describes a technique for bringing the first bending vibration resonant frequency and the second bending vibration mechanical resonant frequency closer together. Because the bending vibration resonant frequency of a bar-shaped resonator is proportional to the width thereof, the cross-section of the four-beam tuning fork vibrating gyro 10 in the direction that is perpendicular to the Y-axis is machined with a high degree of precision, thus the second bending vibration resonant frequency is made to nearly coincide with the first bending vibration resonant frequency.

However, in the case of mass production, the machining precision of wire saws and dicing saws generally used in machining is on the order of ±3μ, so that if the width of each beam of a four-beam tuning fork vibrating gyro 10 were to be 300μ, 1% or so would be the limit of machining accuracy. If adjustment to greater accuracy is required, because the resonant frequency of a bar-shaped resonator is inversely proportional to the square of the length of the bar, machining is done so that the beam length L1 as seen from the Z-axis direction as shown in FIG. 2 is made to differ from the length of the beam L2 as seen from the X-axis direction, by making the depths of each base point differ. By performing further precise machining of this part locally, it is possible to get a more precise matching between the first bending vibration resonant frequency and the second bending vibration resonant frequency, thus allowing the realization of the third bending vibration.

When this third bending oscillation is generated, causing the four-beam tuning fork vibrating gyro 10 to rotate with an angular velocity ω about the Y-axis, each beam is subjected to a Coriolis force in the direction perpendicular to the direction of displacement, with the fourth bending vibration illustrated in FIG. 10 being excited by this Coriolis force. The vibration frequency of the fourth bending vibration coincides with that of the third bending vibration. Thus, the excitation of the fourth bending vibration by the third bending vibration is caused by forced vibration, enabling generation of the fourth bending vibration with an extremely large amplitude with optimum efficiency.

The fourth bending vibration has as a constituent a fifth bending vibration in the X-axis direction. The fifth bending vibration exhibits the effect of changing the amplitude and phase of the first bending vibration. The effect of this fifth bending vibration changes the distortion generated by the first bending vibration of the fourth beam 14 within the X-Y plane, changing the voltage generated by the piezo-electric element 37 in FIG. 4. In accordance with the principles of generation of a Coriolis force, the distortion in the Y-axis direction is proportional to the angular velocity ω, thus the change in voltage generated by the piezo-electric element 37 is also proportional to the angular velocity ω.

The voltage generated by the piezo-electric element 37, including changes in voltage proportional to the angular velocity, is input to the buffers B1 and B4. Furthermore, this changes the distortion generated by the first bending vibration of the third beam 13 in the Y-X plane, changing the voltage generated by the piezo-electric element 33 in FIG. 4. In accordance with the principles of generation of a Coriolis force, the distortion in the Y-axis direction is proportional to the angular velocity ω, thus the change in voltage generated by the piezo-electric element 33 is also proportional to the angular velocity ω. The voltage generated by the piezo-electric element 33, including changes in voltage proportional to the angular velocity, is input to the buffers B1 and B4.

Although in this case the piezo-electric element 33 and the piezo-electric element 37 are connected together electrically, addition of the vibration and the buffering in the X-axis direction of the four-beam tuning fork vibrating gyro 10 produces the effect of a mutual cancellation of noise output.

Similarly, the fourth bending vibration has as a constituent the sixth bending vibration in the Z-axis direction. The sixth bending vibration exhibits the effect of changing the amplitude and phase of the second bending vibration. The effect of the sixth bending vibration changes the distortion generated by the second bending vibration of the first beam 11 within the Y-Z plane, changing the voltage generated by the piezo-electric element 23 in FIG. 4.

In accordance with the principles of generation of a Coriolis force, the distortion in the Y-axis direction is proportional to the angular velocity ω, thus the change in voltage generated by the piezo-electric element 23 is also proportional to the angular velocity ω. The voltage generated by the piezo-electric element 23, including changes in voltage proportional to the angular velocity, is input to the input buffers B2 and B3. Furthermore, this changes the distortion in the Y-Z plane generated by the second bending vibration of the third beam 13, changing the voltage generated by the piezo-electric element 31 in FIG. 4.

In accordance with the principles of generation of a Coriolis force, the distortion in the Y-axis direction is proportional to the angular velocity ω, thus the change in voltage generated by the piezo-electric element 31 is also proportional to the angular velocity ω. The voltage generated by the piezo-electric element 31, including changes in voltage proportional to the angular velocity, is also input to the input buffers B2 and B3. Although here the piezo-electric element 23 and the piezo-electric element 31 are connected together electrically, if the vibration in the X-axis direction of the four-beam tuning fork vibrating gyro 10 and the buffering are added, it produces the effect of mutually negating the resulting noise output.

The fifth bending vibration and sixth bending vibration exhibit mutually opposite effects in response to rotation of the angular velocity. That is, when the fifth bending vibration generated in the direction of the rotation of angular velocity ω increases the amplitude of the first bending vibration, the sixth bending vibration generated by the angular velocity ω attenuates the amplitude of the second bending vibration, and when the fifth bending vibration generated by the angular velocity ω attenuates the amplitude of the first bending vibration, the sixth bending vibration generated in the direction of the rotation of the angular velocity ω increases the amplitude of the second bending vibration. Furthermore, when the fifth bending vibration generated by the angular velocity ω advances the phase of the first bending vibration, the sixth bending vibration generated by the angular velocity ω retards the phase of the second bending vibration, and when the fifth bending vibration generated by the angular velocity ω retards the phase of the first bending vibration, the sixth bending vibration generated in the direction of the rotation of the angular velocity ω advances the phase of the second bending vibration.

Thus, the output of the input buffer B1 comprises the AC output of the first bending vibration combined with the effect of the fifth bending vibration. By the structure of the lock-in amplifier, the AC component is removed from this output. First, the output of the buffer B1 is shaped by a bandpass filter R11 and then input to a multiplier R12. The multiplier is of a switching type so as to suppresses DC drift.

That is, the multiplier passes input signals having a phase of 0° or greater but less than 180°, and inverts input signals having a phase of 180° or greater but less than 360°.

The phase data employed in the inversion of the input signal utilizes a reference signal formed by binarization of the output of buffer B2 by a binary quantizing circuit R14, followed by an adjustment by a phase-shift circuit R15. The output of a multiplier R13 is passed by an extremely narrow-band lowpass filter as direct current. In this configuration, signal components of a frequency other than the reference signal frequency, which are treated as noise, are almost completely eliminated, thereby enabling signal extraction with an extremely high S/N, and as a result, only the effect of the fifth bending vibration and the excited by the Coriolis force combined with the constant output due to the first bending vibration, in the form of direct current, is extracted.

Next, the output of the buffer B3 comprises the AC output of the second bending vibration combined the effect of the sixth bending vibration resulting from the Coriolis force. By the composition of the lock-in amplifier, the AC output is removed from this output. After shaping of the output of the buffer B3 by a bandpass filter R21, the signal is then input to a multiplier R22. The multiplier is of a switching type so as to provide suppression of DC drift.

Stated in other terms, the multiplier passes input signals having a phase of 0° or greater but less than 180°, and outputs the inverted signal for input signals having a phase of 180° or greater but less than 360°.

The phase data employed in the inversion of the input signal utilizes a reference signal formed by binarization of the output of buffer B4 by a binary quantizing circuit R24, followed by an adjustment by a phase-shift circuit R25. The signal from the multiplier 22 is passed by an extremely narrow-band lowpass filter as direct current. In this configuration, signal components of a frequency other than the reference signal frequency, which are treated as noise, are almost completely eliminated, thereby enabling signal extraction with an extremely high S/N, and as a result, only the effect of the fifth bending vibration excited by the Coriolis force combined with the constant output due to the second bending vibration, in the form of direct current, is extracted.

The output of the lowpass filter R13 resulting from the first bending vibration and the fifth bending vibration, and the output of the lowpass R13 resulting from the first bending vibration and the fifth bending vibration are added by means of a differential amplifier R10, the resulting Coriolis force effect being output from the differential amplifier R10.

Here FIG. 4 shows, with respect to the outputs of the piezo-electric elements 23, 31, 33, and 37 of the four-beam tuning fork vibrating gyro 10 shown in FIG. 4, the Z-axis direction signal from piezo-electric elements 23 and 31 is used for the reference for the first lock-in amplifier to which the X-axis direction signals from the piezo-electric elements 33 and 37 are input, and the X-axis direction signal from the piezo-electric elements 33 and 37 is used for the reference for the second lock-in amplifier to which the Z-axis direction signal from piezo-electric elements 23 and 31 is input.

As the reference signal for the lock-in amplifier, since the reference signal must be constantly output, as shown in FIG. 3, the output of operational amplifiers H0 constructed of oscillating circuits are used in many cases. However, the output of a and energy supply element for a self-oscillation constant fine adjustment is conducted at all times among the mechanical oscillation systems formed on the four beams.

The effect of this adjustment is that a slight shift in phase develops between the output of the mechanical oscillator and the operational amplifier H0. With a shift in phase occurring between the lock-in amplifier's input signal and the reference signal, the output influences DC drift. DC drift is undesirable in a vibrating gyro for which angular velocity is used as output. For a vibrating gyro, of which collection of angular data is the purpose, the addition of DC drift to direct current output which is proportional to angular velocity results in inaccurate differential values which constitute the angular data.

In accordance with the arrangement of the present embodiment, using constant generation of the first bending vibration and the second bending vibration, with both the first lock-in amplifier and the second lock-in amplifier used for reference signals, the operational amplifier H0 supplying energy for vibrating the four-beam tuning fork vibrating gyro 10 uses a signal that is not directly connected electrically, in other words, since only the energy generated as a result of the mechanical vibration of the four-beam tuning fork vibrating gyro 10 is used, virtually no phase shift develops between the lock-in amplifiers' input signals and the reference signals. Therefore, there is also virtually no development of DC drift.

FIG. 30, FIG. 31, FIG. 32, and FIG. 33 show the effect of the Coriolis force expressed as the fifth bending vibration and sixth bending vibration. First, FIG. 30 and FIG. 31 will be used to describe the effect of the output voltage on amplitude. The four-beam tuning fork vibrating gyro 10 at rest exhibits a rest voltage output A, the amplitude of the voltage output B from the piezo-electric element 33 and the piezo-electric element 37 and the voltage output C from the piezo-electric element 23 and the piezo-electric element 31 are static, either being identical or maintaining a fixed difference, which, for the sake of simplicity in the explanation will be taken as coinciding.

Figure 30:
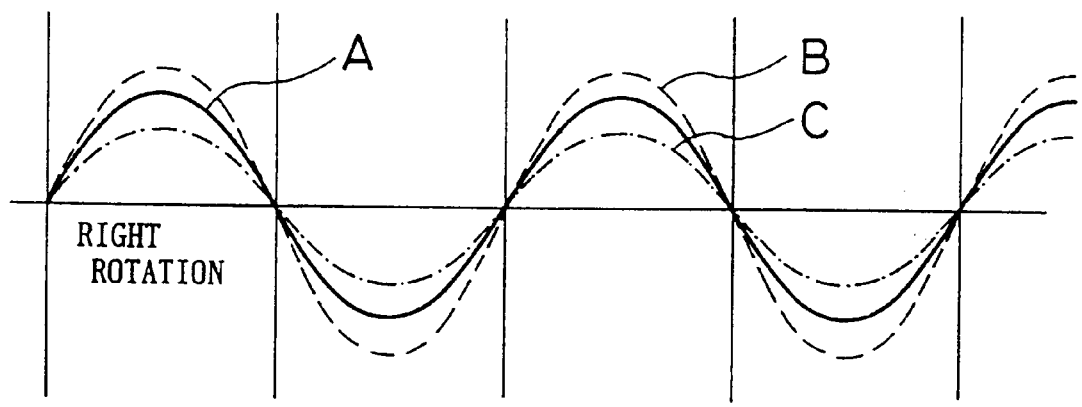
FIG. 30 is a voltage waveform diagram that shows the effect of Coriolis force a vibration gyro.
Figure 31:
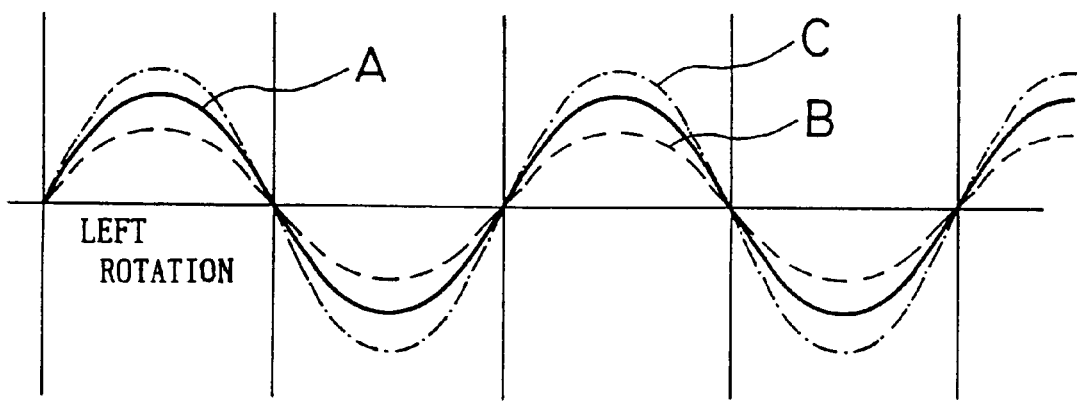
FIG. 31 is a voltage waveform diagram that shows the effect of Coriolis force in a vibration gyro.

When the four-beam tuning fork vibrating gyro 10 rotates to the right, the amplitude of the voltage output B from the piezo-electric element 33 and the piezo-electric element 37 increases, as indicated by the broken line shown in FIG. 30, and the amplitude of the voltage output C from the piezo-electric element 23 and the piezo-electric element 31 is attenuated, as indicated by the dotted line in FIG. 30. When the four-beam tuning fork vibrating gyro 10 rotates to the left, the amplitude of the voltage output B from the piezo-electric element 33 and the piezo-electric element 37 is attenuated, as indicated by the broken line shown in FIG. 31, and the amplitude of the voltage output C from the piezo-electric element 23 and the piezo-electric element 31 increases, as indicated by the dotted line in FIG. 31.

Figure 32:
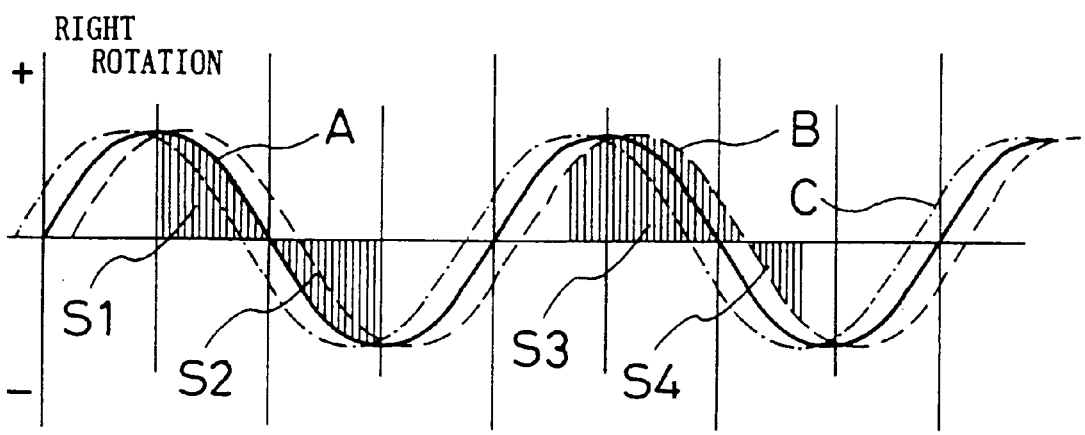
FIG. 32 is a voltage waveform diagram that shows the effect of Coriolis force in a vibration gyro.
Figure 33:
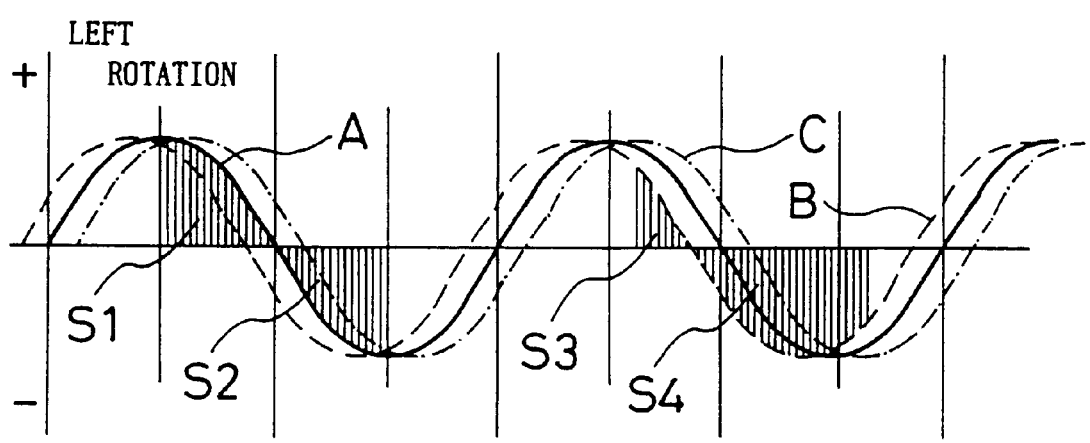
FIG. 33 is a voltage waveform diagram that shows the effect of Coriolis force in a vibration gyro.

Next, FIG. 32 and FIG. 33 will be used to describe the effect of the output voltage on phase. The four-beam tuning fork vibrating gyro 10 at rest exhibits a rest voltage output A, the phase of the voltage output B from the piezo-electric element 33 and the piezo-electric element 37 and the voltage output C from the piezo-electric element 23 and the piezo-electric element 31 are stable, either being identical or maintaining a fixed difference, which, for the sake of simplicity in the explanation will be taken as coinciding.

When the four-beam tuning fork vibrating gyro 10 rotates to the right, the phase of the voltage output B from the piezo-electric element 33 and the piezo-electric element 37 is retarded/delayed, as indicated by the broken line shown in FIG. 32, and the phase of the voltage output C from the piezo-electric element 23 and the piezo-electric element 31 is advanced, as indicated by the dotted line in FIG. 32.

When the four-beam tuning fork vibrating gyro 10 rotates to the left, the phase of the voltage output B from the piezo-electric element 33 and the piezo-electric element 37 is retarded, as indicated by the broken line shown in FIG. 33, and the phase of the voltage output C from the piezo-electric element 23 and the piezo-electric element 31 is advanced, as indicated by the dotted line in FIG. 33.

These changes in phase due to the influence of the Coriolis force, for example, taking the phase of the voltage output C, represent the sum of the positive square S1 and negative square S2 expressing the time integral of the voltage outputs in FIG. 32 and FIG. 33 if the period of integration of the voltage output B signal is determined, and in response to the case in which, with the four-beam tuning fork vibrating gyro 10 at rest, the voltage output B and voltage output C are at the same time equivalent to the voltage output A, when the four-beam tuning fork vibrating gyro 10 is rotating, the change in the sum of the positive square S3 and the negative square S4 exerts an influence on the lock-in amplifier's DC output. Here, when using both a detection signal and reference signal such as the voltage output B and voltage output C, neither of which is electrically connected to the oscillator circuit, the mutual changes in phase reflect only the Coriolis force, with virtually no DC drift being generated.

However, if the operational amplifier H0 output or output of an oscillator circuit is used for the reference signal, phase changes are added so to regulate oscillations other than those caused by the Coriolis force. This is the cause of DC drift. Although with an angular velocity ω of 90 per second, the shift in phase of the second bending vibration relative to the phase of the first bending vibration comes to 15, if this amount of phase shift occurs, the DC output of the lock-in amplifier then exhibits a linearity of 0.2%, proportional to the angular velocity ω. The output of the lock-in amplifier resulting from this phase shift is greater than the output of the lock-in amplifier resulting from changes in amplitude.

The form of the present embodiment, with its capacity to detect the effects of both changes in amplitude and phase shifting with virtually no DC drift, for use in applications, such as in prevention of shaking in compact video camcorders, for which small size is an important consideration, regardless of the characteristics of vibrating gyros whose reduced size results in low output, achieves an optimum construction for a vibrating gyro.

THIRD EMBODIMENT

A third embodiment of a vibration gyro according to the present invention is described below with reference to the drawings.

FIG. 1 through FIG. 12 are vibration gyros which are embodiments of the present invention, wherein FIG. 1 is a perspective view that shows an outer view of a four-beam tuning fork vibration gyro which is termed a "four-beam tuning fork" below, indicating the coordinates used in the description below, FIG. 2 is a perspective view that shows the locations of the piezo-electric elements and indicates the locations of the fork for adjusting vibration, FIG. 5 is a drawing which shows a cross-section view of electrode structure in the Y-axis direction of the four-beam tuning fork, and a schematic wiring diagram thereof, FIG. 6 is a drawing that shows an outer view of the structure of a vibration gyro enclosed in a cylindrical tube of a four-beam tuning fork, FIG. 7, FIG. 8, FIG. 9, and FIG. 10 are drawings which illustrate the operation of a four-beam tuning fork, and which schematically show the cross-sections of the beams in the Y-axis direction as seen from the ends thereof, FIG. 11 and FIG. 12 are perspective views that show the state of deformation of a piezo-electric element, and FIG. 30, FIG. 31, FIG. 32, and FIG. 33 are drawings illustrating operation of Coriolis effect.

As shown in FIG. 1, the four-beam tuning fork type 10 is formed by a first beam 11, a second beam 12, a third beam 13, a fourth beam 14, piezo-electric elements not illustrated, and a base part 15. The beams are made from metal or silica glass exhibiting resiliency, the shape of each being a rectangular prism, and each having a driving section and a detecting section made up of a piezo-electric element affixed to a side surface of the rectangular prism. The base part is made from metal or silica glass exhibiting resiliency, the shape being a rectangular prism. The first beam 11, second beam 12, third beam 13, and fourth beam 14 are disposed in mutually parallel directions onto the four vertices of the square base part 15, and the base part 15 is formed together as one with the first beam 11, second beam 12, third beam 13, and fourth beam 14.

An alloy known as Elinvar containing 50% iron, 35% nickel, and 9.1% chrome and whose resiliency coefficient has low temperature dependence is used in the present embodiment. Similarly, in a case where silica glass whose resiliency coefficient has low temperature dependence is used, a silver or chrome thin film may be priorly formed on the surface thereof using a method such as electroless plating or CVD.

In the description of the four-beam tuning fork 10 below, the Y-axis, Z-axis, and X-axis coordinate axes are set parallel to the respective sides. The longitudinal direction, that is, the direction in which the beams extend, is defined as the Y axis, the width direction as the Z axis, and the thickness direction as the X axis. The longitudinal, width, and thickness directions of the four-beam tuning fork 10 defined in this fashion are parallel to the Y, Z, and X axes, respectively. However, because the four-beam tuning fork 10 has a symmetric configuration within the X-Z plane, the terms "width" and "thickness" here have no particular meaning. The terms X- or Z-direction width are employed below.

FIG. 2 depicts, as one example, driving and detecting sections formed by the piezo-electric elements in an affixed stated on the first beam 11 and second beam 12. Because this is a perspective view the third beam 13 and fourth beam 14 are not illustrated, but piezo-electric elements are similarly affixed thereto. The piezo-electric elements are formed in thin sheets coated with silver or chrome alloy on both sides through CVD. One side of the piezo-electric element is coated with a conductive epoxy-based adhesive, and the element is priorly affixed to the appropriate side of the respective beam.

FIG. 3 shows a cross-section in the X-Z plane of the piezo-electric elements of the shape depicted in FIG. 2, cutting through the first beam 11, the second beam 12, the third beam 13, and the fourth beam 14. In FIG. 3 the electrodes to drive and detect each beam were disposed in a bimorph configuration. In FIG. 5, driving and detecting are possible even with a unimorph, and so piezo-electric elements on the inner sides of the tuning fork type which are not necessarily required are omitted from the depiction. In FIG. 5 a piezo-electric element 25 is affixed to the first beam 11, piezo-electric elements 27 and 29 are affixed to the second beam 12, and a piezo-electric element 35 is affixed to the fourth beam 14 for acceleration use. A piezo-electric element 23 is affixed to the first beam 11, piezo-electric elements 31 and 33 are affixed to the third beam 13, and a piezo-electric element 37 is affixed to the fourth beam 14 for detection use.

FIG. 5 indicates an operating amplifier H0 making up an oscillator circuit to cause self-excitation vibration of all beams using the acceleration-use piezo-electric elements 25, 27, 29, 35 together with their respective electrodes, a first resistance H1, a second resistance H2, and a third resistance H3 to determine an amplification ratio of an inverting amplifier using an operational amplifier H0, a resistance H4 and capacitance H5 for phase-adjusting use, a first damping buffer B5 making up a first lock-in amplifier to detect signals from the respective electrodes of the detecting-use piezo-electric elements to detect signals from the respective electrodes of detecting-use piezo-electric elements 33 and 37, a first bandpass filter R31, a first multiplier R32, a first lowpass filter R33, a second damping buffer B6 to detect signals from the detecting-use piezo-electric elements 33 and 37 as first lock-in amplifier reference waveforms, a first waveform shaping circuit R34 to shape a reference waveform, a first phase offset circuit R35 to adjust the phase of the reference waveform, a third damping buffer B7 making up a second lock-in amplifier to detect signals from detecting-use piezo-electric elements 23 and 31, a second bandpass filter R41, a second multiplier R42, a second lowpass filter R43, a fourth damping buffer B8 to detect signals from the detecting-use piezo-electric elements 23 and 31 as second lock-in amplifier reference waveforms, a second waveform shaping circuit R44 to shape the reference waveform, a second phase offset circuit R45 to adjust the phase of the reference waveform, and a differential amplification circuit R20 to synthesize the output of the first lowpass filter R33 and the second lowpass filter R43.

FIG. 6 shows the configuration of a four-beam tuning fork 10 as a gyro element sealed in a cylindrical tube. The base 16 is made of an insulating material such as ceramic, with a printed wiring board 22 adhered to the top surface thereof. The four-beam tuning fork 10 is fixed by adhesion to the printed wiring board 22. The base 16 to which the four-beam tuning fork 10 is fixed is pressed into a metallic cap 17, and the base 16 and metal cap 17 are sealed, thereby maintaining the internal environment within which the four-beam tuning fork 10 exists. This internal environment can be, for example, an atmosphere of an inert gas such as nitrogen, and the pressure thereof can be adjusted with consideration given to the vibration characteristics of the four-beam tuning fork 10 as a resonator, that is, with consideration given to the Q value and resonance impedance value that would facilitate use as a vibrating gyro.

The electrodes of the piezo-electric elements 25, 27, 29, 35, 23, 31, 33, and 37 affixed to the four-beam tuning fork 10 shown in FIG. 4 are electrically connected by soldered interconnects employing conductive wiring to leads 18, 19, 20, and 21 hermetically sealed inside the base 16. The leads 18, 19, 20, and 21 are electrically connected to the damping buffers B5, B6, B7, and B8 which make up the oscillator circuit and the lock-in amplifier indicated in In FIG. 5, when voltage is applied from the operational amplifier H0 to the electrode of the piezo-electric element 25 of the first beam 11, for example, the piezo-electric element 25 contracts in the Y direction, resulting in bending displacement in the X direction. This direction changes over time, resulting in bending vibration of the first beam 11 in the X-axis direction. When this occurs, even if the only driven beam is the first beam 11, the vibration of the first beam 11 is transmitted through the base part 15 so that the second beam 12, the third beam 13, and the fourth beam 14 automatically vibrate, the first beam 11 and the second beam 12 vibrating as a tuning fork in the Y-X plane, the third beam 13 and the fourth beam 14 in the Y-X plane, and a first bending vibration as a tuning fork in a phase that is inverted with respect to the vibration of the first beam 11 and the second beam 12 being self-excited. At this time a voltage signal for continuing self-excitation is returned from the electrode of the piezo-electric element 29 of the second beam 12 to the operational amplifier H0. The beam vibrated by this operational amplifier H0 may be the second beam 12, and the beam which receives the return signal may be the first beam 11.

When simultaneously thereto voltage is applied from the operational amplifier H0 to the electrode of the piezo-electric element 35 of the fourth beam 14, for example, the piezo-electric element 35 contracts in the Y direction, resulting in bending displacement in the Z direction. This direction changes over time, resulting in bending vibration of the fourth beam 14 in the Z-axis direction.

When this occurs, even if the only driven beam is the fourth beam 14, the vibration of the fourth beam 14 is transmitted through the base part 15 so that the first beam 11, the second beam 12, and the third beam 13 automatically vibrate, the first beam 11 and the third beam 13 vibrating as a tuning fork in the Y-Z plane, the second beam 12 and the fourth beam 14 in the Y-Z plane, and a second bending vibration as a tuning fork in a phase that is inverted with respect to the vibration of the second beam 12 and the fourth beam 14 being self-excited. At this time a voltage signal for continuing self-excitation is returned from the electrode of the piezo-electric element 27 of the second beam 12 to the operational amplifier H0. The beam vibrated by this operational amplifier H0 may be the second beam 12, and the beam which receives the return signal may be the fourth beam 14.

FIG. 7 shows a schematic representation of the first bending vibration. With the first bending vibration, the first beam 11, the second beam 12, the third beam 13, and the fourth beam 14 of the four-beam tuning fork 10 exhibit bending vibration within the Y-X plane, the instantaneous displacement directions thereof being indicated by the arrows in this drawing. FIG. 8 shows a schematic representation of the second bending vibration. With the second bending vibration, the first beam 11, the second beam 12, the third beam 13, and the fourth beam 14 of the four-beam tuning fork 10 exhibit bending vibration within the Y-Z plane. In this case as well, the instantaneous displacement directions thereof are indicated by arrows.

The first bending vibration which is shown in FIG. 7 and the second bending vibration which is shown in FIG. 8 were verified to exist as resonant frequencies in an elastic body by means of verification with a prototype of the four-beam tuning fork 10. That is, in the first bending vibration all the beams vibrate in the X direction, the first beam 11 and the second beam 12 vibrate as a normal tuning fork, simultaneously with which the third beam 13 and the fourth beam 14 vibrate as a tuning fork in a phase that is inverted with respect to the vibration exhibited by the first beam 11 and the second beam 12. In the second bending vibration, all beams vibrate in the Z direction, the first beam 11 and the third beam 13 vibrate as a normal tuning fork, simultaneously with which the second beam 12 and the fourth beam 14 vibrate as a tuning fork in a phase that is inverted with respect to the vibration exhibited by the first beam 11 and the third beam 13. These vibrations are characterized by balance between the four beams and, because the base part 15 is a node and is exhibiting almost no vibration, if the bottom surface of the four-beam tuning fork 10 is supported, there is almost no influence on the vibration condition by the support method.

FIG. 9 shows the condition of bending vibration in a four-beam tuning fork 10 for the case in which both the first bending vibration and the second bending vibration exist simultaneously. The four-beam tuning fork 10 is of a design having a symmetrical configuration in the X-axis and Z-axis directions, but in a case where machining precision is insufficient and the symmetry thereof is not assured, the respective characteristic mechanical resonant frequencies of the first bending vibration and the second bending vibration diverge, but in the circuit structure of FIG. 4, the reference signals of the first bending vibration and the second bending vibration are input to the single operational amplifier H0, and the voltage output of the single operational amplifier H0 excites the first bending vibration and the second bending vibration.

In this case the electromechanical vibrating system of the four-beam tuning fork 10 exhibiting the first bending vibration and the electromechanical vibrating system of the four-beam tuning fork 10 exhibiting the second bending vibration unite, the vibration frequency of the first bending vibration, f1, and the vibration frequency of the second bending vibration, f2, respectively change and become the same frequency, generating a third bending vibration having a frequency, f3, intermediate between the vibration frequency f1 of the first bending vibration and the vibration frequency f2 of the second bending vibration.

A note must be made in this regard. With the circuit structure shown in FIG. 5 the frequencies of the first bending vibration and the second bending vibration can be caused to coincide by an electromechanical attraction effect, but in a case where the respective mechanical Q values are large, there is a limit in the coincidence of the frequencies, and when the respective mechanical resonant vibration frequencies are excessively diverged, it is not possible to cause the first bending vibration and the second bending vibration to be simultaneously generated and cause the third bending vibration to be generated.

The following describes a technique for bringing the first bending vibration resonant frequency and the second bending vibration mechanical resonant frequency closer together. Because the bending vibration resonant frequency of a bar-shaped resonator is proportional to the width thereof, the cross-section of the four-beam tuning fork vibrating gyro 10 in the direction that is perpendicular to the Y-axis is machined with a high degree of precision, thus the second bending vibration resonant frequency is made to nearly coincide with the first bending vibration resonant frequency.

However, in the case of mass production, the machining precision of wire saws and dicing saws generally used in machining is on the order of $\pm 3\mu$, so that if the width of each beam of a four-beam tuning fork vibrating gyro 10 were to be 300$\mu$, 1% or so would be the limit of machining accuracy. If adjustment to greater accuracy is required, because the resonant frequency of a bar-shaped resonator is inversely proportional to the square of the length of the bar, machining is done so that the beam length L1 as seen from the Z-axis direction as shown in FIG. 2 is made to differ from the length of the beam L2 as seen from the X-axis direction, by making the depths of each base point differ. By performing further precise machining of this part locally, it is possible to get a more precise matching between the first bending vibration resonant frequency and the second bending vibration resonant frequency, thus allowing the realization of the third bending vibration.

When this third bending oscillation is generated, causing the four-beam tuning fork vibrating gyro 10 to rotate with an angular velocity $\omega$ about the Y-axis, each beam is subjected to a Coriolis force in the direction perpendicular to the direction of displacement, with the fourth bending vibration illustrated in FIG. 10 being excited by this Coriolis force. The vibration frequency of the fourth bending vibration coincides with that of the third bending vibration. Thus, the excitation of the fourth bending vibration by the third bending vibration is caused by forced vibration, enabling generation of the fourth bending vibration with an extremely large amplitude with optimum efficiency.

The fourth bending vibration has as a constituent a fifth bending vibration in the X-axis direction. The fifth bending vibration exhibits the effect of changing the amplitude and phase of the first bending vibration. The effect of this fifth bending vibration changes the distortion generated by the first bending vibration of the fourth beam 14 within the X-Y plane, changing the voltage generated by the piezo-electric element 37 in FIG. 5. In accordance with the principles of generation of a Coriolis force, the distortion in the Y-axis direction is proportional to the angular velocity $\omega$, thus the change in voltage generated by the piezo-electric element 37 is also proportional to the angular velocity $\omega$.

The voltage generated by the piezo-electric element 37, including changes in voltage proportional to the angular velocity, is input to the buffers B5 and B6. Furthermore, this changes the distortion generated by the first bending vibration of the third beam 13 in the Y-X plane, changing the voltage generated by the piezo-electric element 33 in FIG. 5. In accordance with the principles of generation of a Coriolis force, the distortion in the Y-axis direction is proportional to the angular velocity $\omega$, thus the change in voltage generated by the piezo-electric element 33 is also proportional to the angular velocity $\omega$. The voltage generated by the piezo-electric element 33, including changes in voltage proportional to the angular velocity, is input to the buffers B5 and B6.

Although in this case the piezo-electric element 33 and the piezo-electric element 37 are connected together electrically, addition of the vibration and the buffering in the X-axis direction of the four-beam tuning fork vibrating gyro 10 produces the effect of a mutual cancellation of noise output.

Similarly, the fourth bending vibration has as a constituent the sixth bending vibration in the Z-axis direction. The sixth bending vibration exhibits the effect of changing the amplitude and phase of the second bending vibration. The effect of the sixth bending vibration changes the distortion generated by the second bending vibration of the first beam 11 within the Y-Z plane, changing the voltage generated by the piezo-electric element 23 in FIG. 5.

In accordance with the principles of generation of a Coriolis force, the distortion in the Y-axis direction is proportional to the angular velocity ω, thus the change in voltage generated by the piezo-electric element 23 is also proportional to the angular velocity ω. The voltage generated by the piezo-electric element 23, including changes in voltage proportional to the angular velocity, is input to the input buffers B7 and B8. Furthermore, this changes the distortion in the Y-Z plane generated by the second bending vibration of the third beam 13, changing the voltage generated by the piezo-electric element 31 in FIG. 5.

In accordance with the principles of generation of a Coriolis force, the distortion in the Y-axis direction is proportional to the angular velocity, thus the change in voltage generated by the piezo-electric element 31 is also proportional to the angular velocity. The voltage generated by the piezo-electric element 31, including changes in voltage proportional to the angular velocity, is also input to the input buffers B7 and B8. Although here the piezo-electric element 23 and the piezo-electric element 31 are connected together electrically, if the vibration in the X-axis direction of the four-beam tuning fork vibrating gyro 10 and the buffering are added, it produces the effect of mutually negating the resulting noise output.

The fifth bending vibration and sixth bending vibration exhibit mutually opposite effects in response to rotation of the angular velocity. That is, when the fifth bending vibration generated in the direction of the rotation of angular velocity ω increases the amplitude of the first bending vibration, the sixth bending vibration generated by the angular velocity 107 attenuates the amplitude of the second bending vibration, and when the fifth bending vibration generated by the angular velocity ω attenuates the amplitude of the first bending vibration, the sixth bending vibration generated in the direction of the rotation of the angular velocity ω increases the amplitude of the second bending vibration. Furthermore, when the fifth bending vibration generated by the angular velocity ω advances the phase of the first bending vibration, the sixth bending vibration generated by the angular velocity ω retards the phase of the second bending vibration, and when the fifth bending vibration generated by the angular velocity ω retards the phase of the first bending vibration, the sixth bending vibration generated in the direction of the rotation of the angular velocity ω advances the phase of the second bending vibration.

Thus, the output of the input buffer B5 comprises the AC output of the first bending vibration combined with the effect of the fifth bending vibration. By the structure of the lock-in amplifier, the AC component is removed from this output. First, the output of the buffer B5 is shaped by a bandpass filter R31 and then input to a multiplier R32. The multiplier is of a switching type so as to suppresses DC drift.

That is, the multiplier passes input signals having a phase of 0° or greater but less than 180°, and inverts input signals having a phase of 180° or greater but less than 360°.

The phase data employed in the inversion of the input signal utilizes a reference signal formed by binarization of the output of buffer B6 by a binary quantizing circuit R34, followed by an adjustment by a phase-shift circuit R35. The output of a multiplier R32 is passed by an extremely narrow-band lowpass filter 33 as direct current. In this configuration, signal components of a frequency other than the reference signal frequency, which are treated as noise, are almost completely eliminated, thereby enabling signal extraction with an extremely high S/N, and as a result, only the effect of the fifth bending vibration and the excited by the Coriolis force combined with the constant output due to the first bending vibration, in the form of direct current, is extracted.

Next, the dumping buffer 87 comprises the AC output of the second bending vibration combined the effect of the sixth bending vibration resulting from the Coriolis force. By the composition of the lock-in amplifier, the AC output is removed from this output. After shaping of the output of the buffer B7 by a bandpass filter R41, the signal is then input to a multiplier R42. The multiplier is of a switching type so as to provide suppression of DC drift.

Stated in other terms, the multiplier passes input signals having a phase of 0° or greater but less than 180°, and outputs the inverted signal for input signals having a phase of 180° or greater but less than 360°.

The phase data employed in the inversion of the input signal utilizes a reference signal formed by binarization of the output of buffer B8 by a binary quantizing circuit R44, followed by an adjustment by a phase-shift circuit R45. The signal from the multiplier 42 is passed by an extremely narrow-band lowpass filter R43 as direct current. In this configuration, signal components of a frequency other than the reference signal frequency, which are treated as noise, are almost completely eliminated, thereby enabling signal extraction with an extremely high S/N, and as a result, only the effect of the fifth bending vibration excited by the Coriolis force combined with the constant output due to the second bending vibration, in the form of direct current, is extracted.

The output of the lowpass filter R33 resulting from the first bending vibration and the fifth bending vibration, and the output of the lowpass R43 resulting from the first bending vibration and the fifth bending vibration are added by means of a differential amplifier R20, the resulting Coriolis force effect being output from the differential amplifier R20.

Here FIG. 5 shows, with respect to the outputs of the piezo-electric elements 23, 31, 33, and 37 of the four-beam tuning fork vibrating gyro 10 shown in FIG. 5, the Z-axis direction signal from piezo-electric elements 23 and 31 is used for the reference for the first lock-in amplifier to which the X-axis direction signals from the piezo-electric elements 33 and 37 are input, and the X-axis direction signal from the piezo-electric elements 33 and 37 is used for the reference for the second lock-in amplifier to which the Z-axis direction signal from piezo-electric elements 23 and 31 is input.

As the reference signal for the lock-in amplifier, since the reference signal must be constantly output, as shown in FIG. 3, the output of operational amplifiers H0 constructed of oscillating circuits are used in many cases. However, the output of a and energy supply element for a self-oscillation constant fine adjustment is conducted at all times among the mechanical oscillation systems formed on the four beams.

The effect of this adjustment is that a slight shift in phase develops between the output of the mechanical oscillator and the operational amplifier H0. With a shift in phase occurring between the lock-in amplifier's input signal and the reference signal, the output influences DC drift. DC drift is undesirable in a vibrating gyro for which angular velocity is used as output. For a vibrating gyro, of which collection of angular data is the purpose, the addition of DC drift to direct current output which is proportional to angular velocity results in inaccurate differential values which constitute the angular data.

In accordance with the arrangement of the present embodiment, using constant generation of the first bending vibration and the second bending vibration, with both the first lock-in amplifier and the second lock-in amplifier using the respective signals, per se, to be used for detecting as the reference signals, virtually no phase shift develops between the lock-in amplifiers' input signals and the reference signals. Therefore, there is also virtually no development of DC drift.

FIG. 30, FIG. 31, FIG. 32, and FIG. 33 show the effect of the Coriolis force expressed as the fifth bending vibration and sixth bending vibration. First, FIG. 30 and FIG. 31 will be used to describe the effect of the output voltage on amplitude. The four-beam tuning fork vibrating gyro 10 at rest exhibits a rest voltage output A, the amplitude of the voltage output B from the piezo-electric element 33 and the piezo-electric element 37 and the voltage output C from the piezo-electric element 23 and the piezo-electric element 31 are static, either being identical or maintaining a fixed difference, which, for the sake of simplicity in the explanation will be taken as coinciding.

When the four-beam tuning fork vibrating gyro 10 rotates to the right, the amplitude of the voltage output B from the piezo-electric element 33 and the piezo-electric element 37 increases, as indicated by the broken line shown in FIG. 30, and the amplitude of the voltage output C from the piezo-electric element 23 and the piezo-electric element 31 is attenuated, as indicated by the dotted line in FIG. 30. When the four-beam tuning fork vibrating gyro 10 rotates to the left, the amplitude of the voltage output B from the piezo-electric element 33 and the piezo-electric element 37 is attenuated, as indicated by the broken line shown in FIG. 31, and the amplitude of the voltage output C from the piezo-electric element 23 and the piezo-electric element 31 increases, as indicated by the dotted line in FIG. 31.

Next, FIG. 32 and FIG. 33 will be used to describe the effect of the output voltage on phase. The four-beam tuning fork vibrating gyro 10 at rest exhibits a rest voltage output A, the phase of the voltage output B from the piezo-electric element 33 and the piezo-electric element 37 and the voltage output C from the piezo-electric element 23 and the piezo-electric element 31 are stable, either being identical or maintaining a fixed difference, which, for the sake of simplicity in the explanation will be taken as coinciding.

When the four-beam tuning fork vibrating gyro 10 rotates to the right, the phase of the voltage output B from the piezo-electric element 33 and the piezo-electric element 37 is retarded/delayed, as indicated by the broken line shown in FIG. 32, and the phase of the voltage output C from the piezo-electric element 23 and the piezo-electric element 31 is advanced, as indicated by the dotted line in FIG. 32.

When the four-beam tuning fork vibrating gyro 10 rotates to the left, the phase of the voltage output B from the piezo-electric element 33 and the piezo-electric element 37 is retarded, as indicated by the broken line shown in FIG. 33, and the phase of the voltage output C from the piezo-electric element 23 and the piezo-electric element 31 is advanced, as indicated by the dotted line in FIG. 33.

According to the present embodiment, where the detected signal itself is used as the reference signal, there are no effects due to phase offset. This embodiment detects only the effect of amplitude change, and as a result constitutes a low-noise, ideal vibration gyro ideal for application in car navigation systems, attitude controllers for large equipment, and the like, where size is less critical than the need to eliminate noise, including DC drift.

As explained above, the present embodiment of the vibration gyro has four beams positioned symmetrically, and the base part remains motionless regardless of beam vibration. The support method has no effect on the performance of the invention, only reasonable levels of fabrication and assembly precision are required, and because the resonant frequencies of detecting and excitation to improve gain can be matched relatively easily the design is suited to volume production. The invention utilizes a structure which provides large resonant detection gain and cancels out non-Coriolis forces to provide low noise and a high S/N ratio.

A specific embodiment of a vibration gyro according to the present invention is explained below.

Figure 34:
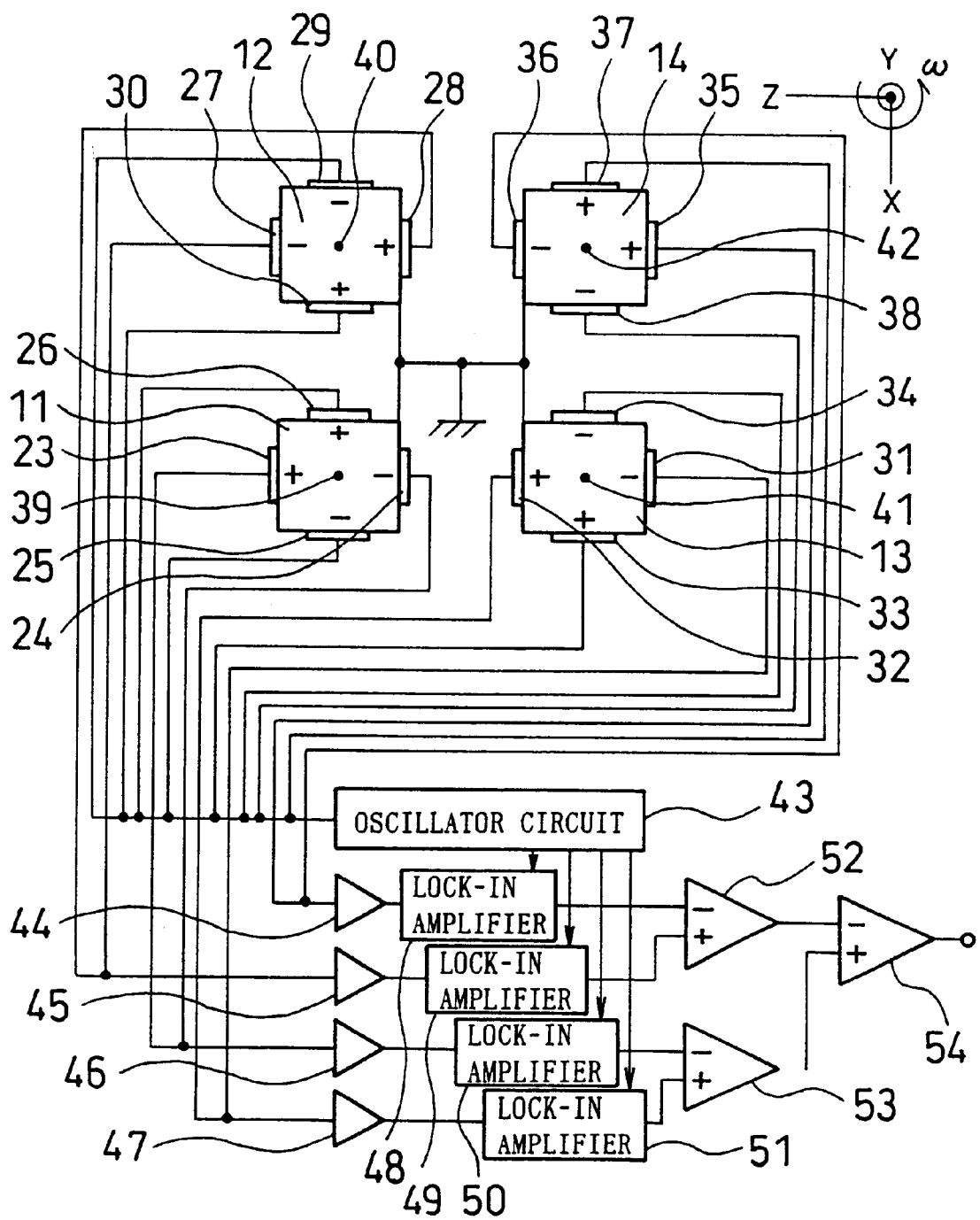
FIG. 34 is a drawing which shows the cross-sections of the beams of a four-beam tuning fork vibrating gyro that is a fourth embodiment of the present invention as viewed from the ends of the beams and a circuit block diagram thereof, and a schematic wiring diagram thereof.

FIG. 34 indicates the structure of piezo-electric a vibration gyro in a fourth embodiment according to the present invention. Specifically, it is a vibration gyro with four beams, electrodes, and a base part. The beams are formed of resilient metal, in the shape of rectangular prisms, and the sides of the beams are mounted with driving sections and detecting sections, both of which are formed of piezo-electric elements. The base part is of resilient metal having a rectangular shape, and is integral with the four beams.

The four beams are mutually parallel, and are mounted in four corners of the base part. An input of AC voltage to the driving sections of the first beam, the second beam, the third beam, and the fourth beam causes vibration the propagated through the base part, causing first bending vibration in all beams due to Coriolis force through rotation. The voltage generated by the second bending vibration, perpendicular to the first bending vibration, is detected by the detecting sections of the first beam, the second beam, the third beam, and the fourth beam making up the vibration gyro.

The four parallel beams, mounted on a base part in a square array in this embodiment of the vibration gyro, and the base part, are formed to have almost square cross-sections so that the resonant frequency of the first bending vibration will match the resonant frequency of the second bending vibration. In addition, the four parallel beams, mounted in a square array in this vibration gyro, have beam position adjusted so that the lengths of the beams when viewed from the width direction, or when viewed from the thickness direction, are different from each other, in order to make the resonant frequency of the first bending vibration approximate the resonant frequency of the second bending vibration.

One possible method of operation of the vibration gyro is to apply AC voltage to the driving sections of the first and second beams to generate the first bending vibration, while at the same time applying AC voltage to the driving sections of the second and fourth beams to generate the second bending vibration matching the first bending vibration in vibration and phase, but perpendicular to it. The third bending vibration is generated as a synthesis of the first bending vibration and the second bending vibration. The Coriolis force caused by rotation generates the fourth bending vibration, perpendicular to the third bending vibration. The third bending vibration uses the detecting sections on the third and fourth beams to detect the voltage generated by the fifth bending vibration, which is the component of the fourth bending vibration in the direction of the first bending vibration. The voltage generated by the sixth bending vibration, which is the component of the fourth bending vibration in the direction of the second bending vibration, is detected by the detecting sections on the first beam and the third beam.

In the present embodiment the oscillation circuit used to generate the AC voltage to create third bending vibration, and the oscillation circuit used to generate the AC voltage used to create the fourth bending vibration, may be implemented as a single oscillation circuit, to match the vibration frequency and phase of the two circuits and enhance electromechanical vibration characteristics. To match vibration frequency and phase of the first oscillation circuit used to generate the third bending vibration and the second oscillation circuit used to generate the fourth bending vibration , a PLL feedback can be used for one or both.

In the embodiment the output of the oscillation circuit generating the fist bending vibration can be used as a reference signal by the lock-in amplifier detecting the output voltage generated by the second bending signal. Further, the output of the oscillation circuit generating the first bending vibration can be used as a reference signal by the first lock-in amplifier detecting the output voltage generated by the fifth bending vibration, and converting it into the first DC voltage; and as a reference signal by the second lock-in amplifier detecting the output voltage generated by the sixth bending vibration,and converting it into the second DC voltage.

The vibration gyro according to the present embodiment may be provided with a first lock-in amplifier to convert output voltage generated by the fifth bending vibration, using the output of the first oscillation circuit which generates the first bending vibration as a reference signal, into the first DC, and to provide the second lock-in amplifier to convert output voltage generated by the sixth bending vibration, using the output of the first oscillation circuit which generates the first bending vibration as a reference signal, into the second DC. The embodiment may also be provided with a differential amplifier accepting voltages generated by the fifth bending vibration and the sixth bending vibration.

FIG. 34 shows a fourth embodiment according to the present invention, indicating the shape of the piezo-electric elements utilized in the vibration gyro. Specifically, it shows a cross-section in the X-Z plane of a first beam 11, a second beam 12, a third beam 13, and a fourth beam 14. For acceleration, the first beam 11 is mounted with piezo-electric elements 25 and 26, the second beam 12 is mounted with piezo-electric elements 29 and 30, the third beam 13 is mounted with piezo-electric elements 33 and 34, and the fourth beam 14 is mounted with piezo-electric elements 35 and 36.

FIG. 34 indicates an oscillation circuit 43, supplying AC voltage to the electrodes of acceleration piezo-electric elements 25, 26, 29, 30, 33, 34, 37, and 38, damping buffers 44, 45, 46, and 47, lock-in amplifiers 48, 49, 50, and 51, differential amplifying amplifiers 52 and 53, and a differential amplifier 54, which together make up the circuit detecting the signals from the electrodes of the detecting-use piezo-electric elements 23, 24, 27, 28, 31, 32, 35, and 36.

The symbols (+) and (−) appearing in FIG. 34 indicate which surfaces among the piezo-electric element surfaces of the four-beam tuning fork 10 to which beams whereon piezo-electric elements are affixed the beams are adhered to. In FIG. 34, a first neutral line 39 of the Y-direction bending vibration of the first beam 11 is indicated by a point, a second neutral line 40 of the Y-direction bending vibration of the second beam 12 is indicated by a point, a third neutral line 41 of the Y-direction bending vibration of the third beam 13 is indicated by a point, and a fourth neutral line 42 of the Y-direction bending vibration of the fourth beam 14 is indicated by a point. The lines on the outer side of the drawing show a schematic representation of the wiring between the electrodes of the piezo-electric elements, the connecting oscillation circuit 43, and the damping buffers 44, 45, 46, and 47 which make up the detecting circuit.

In FIG. 34, the AC voltage from oscillation circuit 43 is input to the electrodes of piezo-electric elements 25 and 26 of the first beam 11, so that when, for example, the piezo-electric element 25 contracts on the Y axis, the piezo-electric element 26 expands on the Y axis at the same time, with the result that bending displacement occurs on the X axis.

This direction changes over time with the result that bending vibration occurs on the X axis of the first beam 11. When voltage is input to the electrodes of the piezo-electric elements 29 and 30 on the second beam 12, so that when, for example, the piezo-electric element 29 contracts on the Y axis, the piezo-electric element 30 expands on the Y axis at the same time, with the result that bending vibration occurs on the X axis of the second beam 12. When voltage is input to the electrodes of the piezo-electric elements 33 and 34 on the third beam 13, so that when, for example, the piezo-electric element 33 expands on the Y axis, the piezo-electric element 34 contracts on the Y axis at the same time, with the result that bending displacement occurs on the X axis.

This direction changes over time with the result that bending vibration occurs on the X axis of the third beam 13. When voltage is input to the electrodes of the piezo-electric elements 37 and 38 on the fourth beam 14, so that when, for example, the piezo-electric element 37 extends on the Y axis, the piezo-electric element 38 contracts on the Y axis at the same time, with the result that bending vibration occurs on the X axis. This direction changes over time with the result that bending vibration occurs on the X axis of the fourth beam 14. If the frequency of the oscillation circuit 43 is close to the resonant frequency of the four-beam tuning fork 10 as a resilient structure, these bending vibrations are propagated though base part 15, generating the first bending vibration whereby the entire structure has a single frequency and phase.

In this case, even if only the first beam 11 is driving, as long as the frequency of the oscillation circuit 43 is close to the resonant frequency of the four-beam tuning fork 10 as a resilient structure, the vibration of the first beam 11 will be propagated through the base part 15, exciting the second beam 12, the third beam 13, and the fourth beam 14, so that the first beam 11 and the second beam 12 cause the fork to vibrate in the Y-X plane, and the third beam 13 and the fourth beam 14 in the Y-X plane but with the opposite phase of the vibration caused by the first beam 11 and the second beam 12, so that the fork generates the first bending vibration.

FIG. 7 shows a schematic representation of the first bending vibration. The first bending vibration is bending vibration within the Y-X plane of the first beam 11, the second beam 12, the third beam 13, and the fourth beam 14 of the four-beam tuning fork 10, and the simultaneous displacement is indicated with an arrow here. When this first bending vibration is present and the four-beam tuning fork rotates on the Y axis with an angular velocity ω, Coriolis force has an effect perpendicular to the direction of displacement, and this Coriolis force in turn generates the second bending vibration.

FIG. 8 shows a schematic representation of the second bending vibration. The second bending vibration is bending vibration within the Y-Z plane of the first beam 11, the second beam 12, the third beam 13, and the fourth beam 14 of the four-beam tuning fork. The first beam 11 and the third beam 13 vibrate within the Y-Z plane as forks, and the second beam 12 and the fourth beam 14 vibrate in the same Y-Z plane as forks but with the opposite phase. The simultaneous displacement is indicated with an arrow here.

The second bending vibration causes, for example, the first beam 11 to bend in the Y-Z plane. Deformation on the Y axis is in accordance with the principles of Coriolis force and is proportional to angular velocity ω, and the characteristics of the piezo-electric element cause it to output a voltage proportional to deformation. As indicated in FIG. 3, bending vibration in the Y-Z plane causes the piezo-electric elements 23 and 24 to generate voltages proportional to angular velocity ω at their electrodes, which is passed to the damping buffer 46 as indicated in FIG. 3.

Similarly, bending vibration in the Y-Z plane causes the piezo-electric elements 27 and 28 of the second beam 12 to generate voltages proportional to angular velocity ω at their electrodes, which is passed to the damping buffer 45; bending vibration in the Y-Z plane causes the piezo-electric elements 31 and 32 of the third beam 13 to generate voltages proportional to angular velocity ω at their electrodes, which is passed to the damping buffer 47; and bending vibration in the Y-Z plane causes piezo-electric elements 35 and 36 of the fourth beam 14 to generate voltages proportional to angular velocity ω at their electrodes, which is passed to the damping buffer 44. Outputs from the damping buffers 44, 45, 46, and 47 are amplified by the lock-in amplifiers 48, 49, 50, and 51, respectively, referenced to the output from the oscillation circuit 43, the outputs from the lock-in amplifiers 48 and 49 are amplified by differential amplifier 52, the outputs from the lock-in amplifiers 50 and 51 are amplified by the differential amplifier 53, and outputs from the differential amplifiers 52 and 53 are amplified by the differential amplifier 54. The output of the differential amplifier 54 is proportional to angular velocity ω causing the second bending vibration, which makes it possible to determine angular velocity ω.

The operation of a prototype four-beam tuning fork 10 was used to confirm the first bending vibration shown in FIG. 7 and the second vibration shown in FIG. 8, and it was confirmed that it has a resonant frequency as a resilient structure. In other words, the first bending vibration is a vibration on all beams on the X axis, so that the first beam 11 and the second beam 12 vibrate as an ordinary tuning fork, at which time the third beam 13 and the fourth beam 14 vibrate as a tuning fork with a phase opposite to that of the first beam 11 and the second beam 12. The second bending vibration is a vibration on all beams on the Z axis, so that the first beam 11 and the third beam 13 vibrate as an ordinary tuning fork, at which time the second beam 12 and the fourth beam 14 vibrate as a tuning fork with a phase opposite to that of the first beam 11 and the third beam 13.

The vibrations of the four beams are in balance, and because the base part 15 is a vibration node it is essentially free of vibration, so that the method of support used for the four-beam tuning fork 10 has no effect on the vibration state.

For example, as indicated in FIG. 7, the first bending vibration is generated and a rotation angular velocity on the Y axis imparted, generating Coriolis force, and the Coriolis force acts perpendicular to the direction of the first bending vibration, causing the second bending vibration indicated in FIG. 8. However, if the resonant frequencies of the first and second bending vibrations are separated from each other, the first forced vibration is unable to excite the second bending vibration to sufficient amplitude. The four-beam tuning fork 10 is designed with symmetry on the X and Z axes, but where fabrication precision cannot assure sufficient symmetry, the resonant frequencies of the first and second bending vibrations will be separated from each other.

To resolve this problem, measures must be taken to bring the mechanical resonant frequency of the first bending vibration closer to the mechanical resonant frequency of the second bending vibration. The frequency of bending vibration in a rod-like vibrating body is proportional to the width in the direction of bending, so precision manufacturing of the cross-section of the four-beam tuning fork 10 perpendicular to the Y axis will increase the degree of bend in the second bending vibration caused by a given angular velocity ω.

However, when volume production requirements are taken into consideration, the fabrication precision of generally-used dicing saws and wire saws are about +/−3 μm, which means that for a beam width of 300 μm for a four-beam tuning fork 10 the limit of manufacturing precision would be 1%. If adjustment finer than 1% were required, since the resonant frequency of the rod-like vibration body is inversely proportional to the square of the bar length, it would be necessary to give each fork a different depth so that (as shown in FIG. 2) the beam length L1 as viewed from the Z axis would be different from the beam length L2 as viewed from the X axis. Localized, high-precision fabrication here would make it possible to match the mechanical resonant frequency of the first bending vibration to the mechanical resonant frequency of the second bending vibration with excellent precision, and thereby increase the degree of bend in the second bending vibration caused by a given angular velocity ω.

In this embodiment the first bending vibration of the four-beam tuning fork 10 is coupled to an oscillation circuit 43, forming a tuning-fork oscillator with an high Q. That is, the frequency is extremely stable, which means that it can be used to eliminate essentially all noise caused by vibration outside the excitation frequency due to Coriolis force, with the same frequency as the first bending vibration.

The detecting circuit in FIG. 34 is made up of the lock-in amplifier and the differential amplifier, and the signal from the oscillation circuit 43 is used as the reference signal. As a result, the lock-in amplifier using the signal from the first bending vibration as the reference signal achieves a very large S/N ratio when detecting the signal from the second bending vibration. Because the voltage used to detect the second bending vibration is differentially amplified from the voltage of the first beam 11 and the third beam 13, which have mutually opposite phases, and differentially amplified from the voltage of the second beam 14 and the fourth beam 14, which have opposite phases from each other, noise caused by vibration and impact applied to the four-beam tuning fork 10 are applied to all beams in the same bending direction, and are therefore canceled out, providing high S/N.

Next is a description of a fifth embodiment of the vibration gyro according to the present invention.

Figure 35:
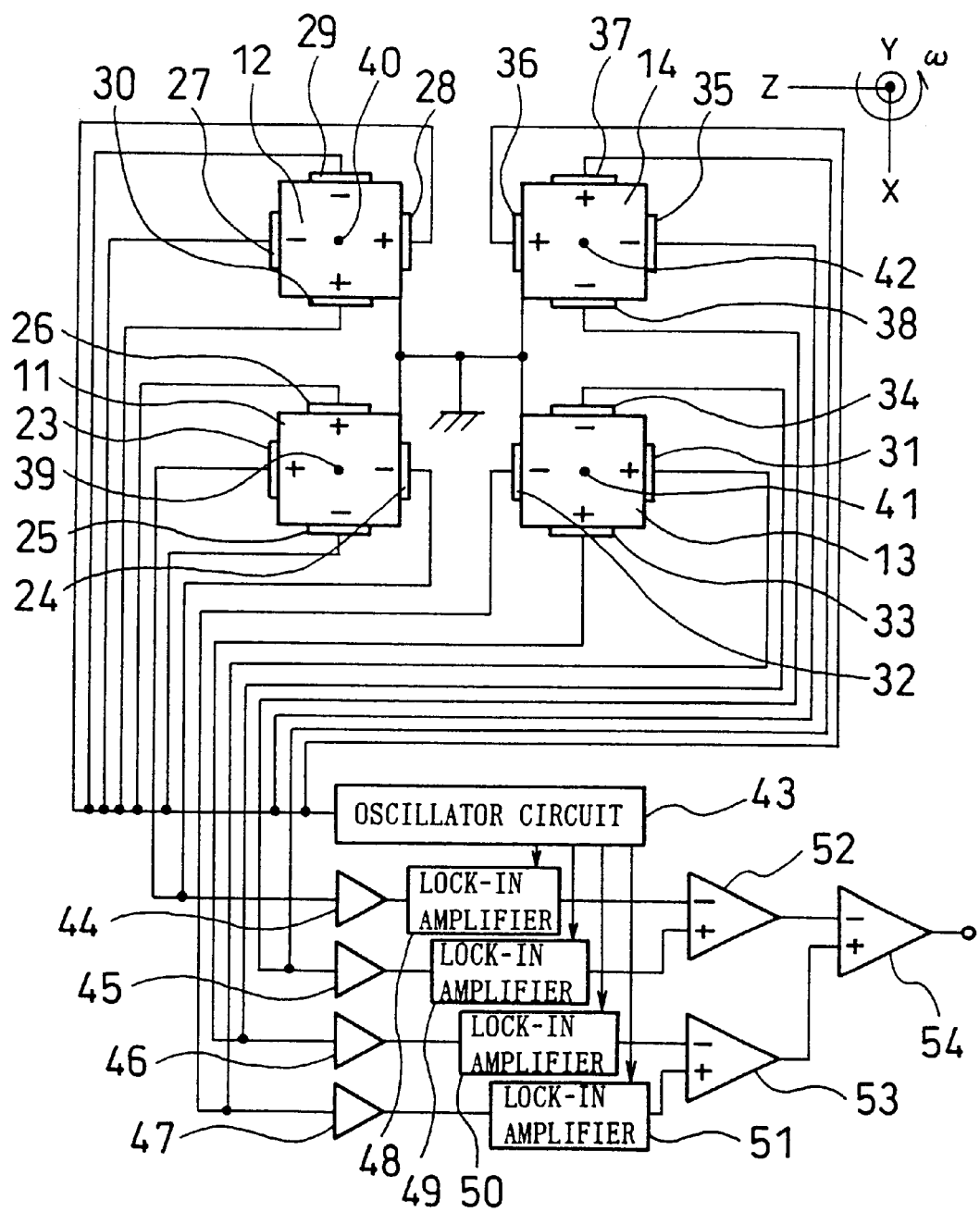
FIG. 35 is a drawing which shows the cross-sections of the beams of a four-beam tuning fork vibrating gyro that is a fifth embodiment of the present invention as viewed from the ends of the beams and a circuit block diagram thereof, and, a schematic wiring diagram thereof.

FIG. 35 indicates a schematic structure of a vibration gyro which is a fifth embodiment according to the present invention. It shows a cross-section in the X-Z plane of the shapes of piezo-electric elements on a first beam 11, a second beam 12, a third beam 13, and a fourth beam 14. For acceleration, the first beam 11 is mounted with piezo-electric elements 25 and 26, the second beam 12 is mounted with piezo-electric elements 27,28, 29, and 30, and the fourth beam 14 is mounted with piezo-electric elements 35 and 36. For detecting, the first beam 11 is mounted with piezo-electric elements 23 and 24, the third beam 13 is mounted with piezo-electric elements 31, 32, 33, and 34, and the fourth beam 14 is mounted with piezo-electric elements 37 and 38.

FIG. 35 shows the acceleration piezo-electric elements 25, 26, 27, 28, 29, 30, 35, and 36, with an oscillator circuit 43 to input AC voltage to their electrodes, and damping buffers 44, 45, 46, and 47, lock-in amplifiers 48, 49, 50, and 51, and differential amplifying amplifiers 52 and 53 and differential amplifier 54, which make up a circuit to detect the signals from the electrodes of the detecting piezo-electric elements 23, 24, 31, 32, 33, 34, 37, and 38, and the wiring connecting them.

Figure 36:
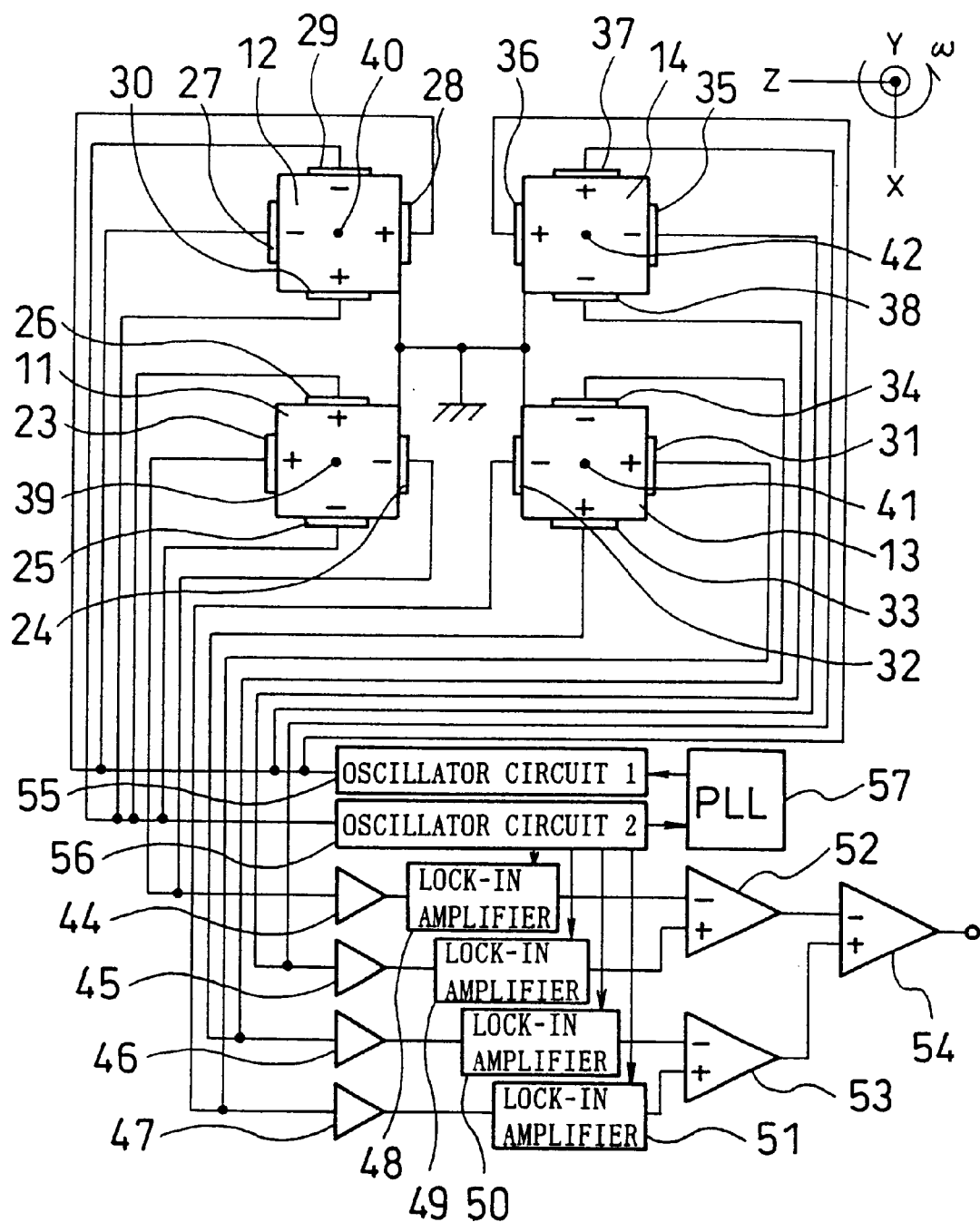
FIG. 36 is a drawing which shows the cross-sections of the beams of a four-beam tuning fork vibrating gyro that is a sixth embodiment of the present invention as viewed from the ends of the beams and a circuit block diagram thereof, and a schematic wiring diagram thereof.

FIG. 36, which illustrates a sixth embodiment of the invention, shows a first oscillation circuit 55 which inputs AC voltage to electrodes of acceleration piezo-electric elements 27, 28, 35, and 36; a second oscillation circuit 56 which inputs AC voltage to electrodes of acceleration piezo-electric elements 25, 26, 29, and 30; a PLL circuit 57 to match the phases and frequencies of the first oscillation circuit and the second oscillation circuit; damping buffers 44, 45, 46, and 47, lock-in amplifiers 48, 49, 50, and 51, differential amplifying amplifiers 52 and 53, and differential amplifier 54, which make up a circuit to detect the signals from the electrodes of the detecting piezo-electric elements 23, 24, 31, 32, 33, 34, 37, and 38; and the wiring connecting them.

The symbols (+) and (−) indicated in FIG. 35 and FIG. 36 indicate which surfaces among the piezo-electric element surfaces of the four-beam tuning fork 10 to which beams whereon piezo-electric elements are affixed the beams are adhered to. In FIG. 35 and FIG. 36, a first neutral line 39 of the Y-direction bending vibration of the first beam 11 is indicated by a point, a second neutral line 40 of the Y-direction bending vibration of the second beam 12 is indicated by a point, a third neutral line 41 of the Y-direction bending vibration of the third beam 13 is indicated by a point, and a fourth neutral line 42 of the Y-direction bending vibration of the fourth beam 14 is indicated by a point. The lines on the outer side of the drawing indicate the wiring between the several electrodes as a schematic representation, and in FIG. 35 are connected to the oscillator circuit 43 and the damping buffers 44, 45, 46, and 47 making up the detection circuit. In FIG. 5, connection is to the first oscillator circuit 55 and the second oscillator center 56 and the damping buffers 44, 45, 46, and 47 making up the detection circuit.

In FIG. 35, when voltage is applied to the electrodes of the piezo-electric elements 25 and 26 of the first beam 11 due to AC voltage from the oscillator circuit 43, for example, the piezo-electric element 25 contracts in the Y direction and at the same time the piezo-electric element 26 expands in the Y direction, resulting in bending displacement in the X direction. This direction changes over time, resulting in bending vibration of the first beam 11 in the X-axis direction. When voltage is applied to the electrodes of the piezo-electric elements 29 and 30 of the second beam 12, for example, the piezo-electric element 29 contracts in the Y direction and at the same time the piezo-electric element 30 expands in the Y direction, resulting in bending displacement in the X direction.

This direction changes over time, resulting in bending vibration of the second beam 12 in the X-axis direction. When this occurs, even if the only driven beams are the first beam 11 and the second beam 12, if the frequency of the oscillator circuit 43 is near the resonant frequency of the four-beam tuning fork 10 as a resonant body, the vibration of the first beam 11 and the second beam 12 is transmitted through the base part 15 so that the third beam 13 and the fourth beam 14 automatically vibrate, the first beam 11 and the second beam 12 vibrating as a tuning fork in the Y-X plane, the third beam 13 and the fourth beam 14 in the Y-X plane, and a first bending vibration as a tuning fork in a phase that is inverted with respect to the vibration of the first beam 11 and the second beam 12 being self-excited.

When simultaneously thereto voltage is applied to the electrodes of the piezo-electric elements 27 and 28 of the second beam 12 due to AC voltage from the oscillator circuit 43, for example, the piezo-electric element 27 contracts in the Y direction and at the same time the piezo-electric element 28 expands in the Y direction, resulting in bending displacement in the X direction. This direction changes over time, resulting in bending vibration in the Z-axis direction. When voltage is applied to the electrodes of the piezo-electric elements 35 and 36 of the fourth beam 14, for example, the piezo-electric element 35 contracts in the Y direction and at the same time the piezo-electric element 36 expands in the Y direction, resulting in bending displacement in the Z direction.

This direction changes over time, resulting in bending vibration of the fourth beam 14 in the Z-axis direction. If the frequency of the oscillator circuit 43 is near the resonant frequency of the four-beam tuning fork 10 as a resonant body, these bending vibrations are transmitted through the base part 15, and a second bending vibration which vibrates at the same overall frequency and in the same overall phase is generated.

When this occurs, even if the only driven beams are the second beam 12 and the fourth beam 14, if the frequency of the oscillator circuit 43 is near the resonant frequency of the four-beam tuning fork 10 as a resonant body, the vibration of the second beam 12 and the fourth beam 14 is transmitted through the base part 15 so that the first beam 11 and the third beam 13 automatically vibrate, the first beam 11 and the third beam 13 vibrating as a tuning fork in the Y-Z plane, the second beam 12 and the fourth beam 14 in the Y-Z plane, and the second bending vibration as a tuning fork in a phase that is inverted with respect to the vibration of the first beam 11 and the third beam 13 being self-excited.

The above-noted FIG. 7 shows a schematic representation of the first bending vibration. That is, with the first bending vibration, the first beam 11, the second beam 12, the third beam 13, and the fourth beam 14 of the four-beam tuning fork 10 exhibit bending vibration within the Y-X plane, the instantaneous displacement directions thereof being indicated by the arrows in this drawing. The above-noted FIG. 8 shows a schematic representation of the second bending vibration. With the second bending vibration, the first beam 11, the second beam 12, the third beam 13, and the fourth beam 14 of the four-beam tuning fork 10 exhibit bending vibration within the Y-Z plane. In this case as well, the instantaneous displacement directions thereof are indicated by solid arrows.

The first bending vibration which is shown in FIG. 7 and the second bending vibration which is shown in FIG. 8 were verified to exist as resonant frequencies in an elastic body by means of verification with a prototype of the four-beam tuning fork 10. That is, in the first bending vibration all the beams vibrate in the X direction, the first beam 11 and the second beam 12 vibrate as a normal tuning fork, simultaneously with which the third beam 13 and the fourth beam 14 vibrate as a tuning fork in a phase that is inverted with respect to the vibration exhibited by the first beam 11 and the second beam 12.

In the second bending vibration, all beams vibrate in the Z direction, the first beam 11 and the third beam 13 vibrate as a normal tuning fork, simultaneously with which the second beam 12 and the fourth beam 14 vibrate as a tuning fork in a phase that is inverted with respect to the vibration exhibited by the first beam 11 and the third beam 13. These vibrations are characterized by balance between the four beams and, because the base part 15 is a node and is exhibiting almost no vibration, if the bottom surface of the four-beam tuning fork 10 is supported, there is almost no influence on the vibration condition by the support method.

FIG. 9 shows the condition of bending vibration in a four-beam tuning fork 10 for the case in which both the first bending vibration and the second bending vibration exist simultaneously. In the circuit structure of FIG. 35, the first bending vibration and the second bending vibration are generated simultaneously. In this case the electromechanical vibrating system of the four-beam tuning fork 10 exhibiting the first bending vibration and the electromechanical vibrating system of the four-beam tuning fork 10 exhibiting the second bending vibration unite with the oscillator circuit 43, the vibration frequency f1 and the phase δ 1 of the first bending vibration and the vibration frequency f2 and the phase δ 2 of the second bending vibration respectively become the same, generating a third bending vibration shown in FIG. 9.

In the circuit structure of FIG. 36, the vibration frequency f1 and the phase δ 1 of the first bending vibration and the vibration frequency f2 and the phase δ 2 of the second bending vibration are made respectively the same by a PLL circuit 57 which generates the first bending vibration using the first oscillator circuit 55, generates the second bending vibration using the second oscillator circuit 56, detects the phase difference with the oscillation frequency of the first oscillator circuit 56 by taking the oscillation of the second oscillator circuit 55 as a reference signal, converts this to a voltage, and provides feedback to a variable capacitor of the first oscillator circuit 55. As a result, the third bending vibration shown in FIG. 9 is generated similarly to the circuit structure using only a single oscillator circuit shown in FIG. 4. However, a structure having two oscillator circuits is employed in a case where prior adjustment of the amplitudes of the first bending vibration and the second bending vibration and adjustment of the direction of the third bending vibration are desired.

A note must be made in this regard. The four-beam tuning fork 10 is of a design having a symmetrical configuration in the X-axis and Z-axis directions, but in a case where machining precision is insufficient and the symmetry thereof is not assured, the respective characteristic mechanical resonant frequencies of the first bending vibration and the second bending vibration diverge. Both the method of using one oscillator circuit shown in FIG. 35 and the method of using a PLL shown in FIG. 36 are methods of causing the frequencies of the first bending vibration and the second bending vibration to coincide by an electromechanical attraction effect, but this is limited, and when the respective mechanical resonant vibration frequencies are excessively diverged, it is not possible to cause the first bending vibration and the second bending vibration to coincide.

Under these conditions, efforts are made to bring the first bending vibration resonant frequency and the second bending vibration close together. Because the bending vibration resonant frequency of a bar-shaped resonator is proportional to the width thereof in the bending direction, the cross-section of the four-beam tuning fork 10 in the direction that is perpendicular to the Y axis is machined with good accuracy, and the resonant frequency of the second bending vibration and the resonant frequency of the first bending vibration are brought close together.

However, in the case of mass production, the machining precision of wire saws and dicing saws generally used in machining is on the order of ±3 μm, so that if the width of each beam of a four-beam tuning fork vibrating gyro 10 were to be 300 μm, 1% or so would be the limit of machining accuracy. If adjustment to greater accuracy is required,because the resonant frequency of a bar-shaped resonator is inversely proportional to the square of the length of the bar, machining is done so that the beam length L1 as seen from the Z-axis direction as shown in FIG. 2 is made to differ from the length of the beam as seen from the X direction, by making the depths of each base point differ. By performing further precise machining of this part locally, it is possible to get a more precise matching between the first bending vibration resonant frequency and the second bending vibration resonant frequency, thereby allowing the realization of a third bending vibration.

When this third bending oscillation is generated, causing the four-beam tuning fork 10 to rotate with an angular velocity ω about the Y-axis, each beam is subjected to a Coriolis force in the direction perpendicular to the direction of displacement, with the fourth bending vibration illustrated in FIG. 10 being excited by this Coriolis force. The vibration frequency of the fourth bending vibration coincides exactly with the vibration frequency of the third bending vibration. Accordingly, the excitation of the fourth bending vibration by the third bending vibration is caused by forced vibration, enabling generation of the fourth bending vibration with an extremely large amplitude with maximum efficiency.

The fourth bending vibration has a fifth bending vibration as a component in the X-axis direction, and the fifth bending vibration has a sixth bending vibration as a component in the Z-axis direction perpendicular to the fifth bending vibration. For example, with the fifth bending vibration, deformation is generated within the Y-X plane at the fourth beam 14, and voltage is produced by the piezo-electric elements 37 and 38 shown in FIG. 35 and FIG. 36. In accordance with the principles of Coriolis force generation, deformation in the Y-axis direction is proportional to the angular velocity ω and so the voltage produced at the piezo-electric elements 37 and 38 is proportional to the angular velocity ω. This voltage that is proportional to the angular velocity is input to the damping buffer 45.

Additionally, deformation is generated within the Y-X plane at the third beam 13, and voltage is produced by the piezo-electric elements 33 and 34 shown in FIG. 35 and FIG. 36. In accordance with the principles of Coriolis force generation, deformation in the Y-axis direction is proportional to the angular velocity ω, and so the voltage produced at the piezo-electric elements 33 and 34 is proportional to the angular velocity ω. This voltage that is proportional to the angular velocity is input to the damping buffer 46. Similarly, deformation is generated within the Y-Z plane at the first beam 11, and voltage is produced by the piezo-electric elements 23 and 24 shown in FIG. 35 and FIG. 36. In accordance with the principles of Coriolis force generation, deformation in the Y-axis direction is proportional to the angular velocity ω, and so the voltage produced at the piezo-electric elements 23 and 24 is proportional to the angular velocity ω. This voltage that is proportional to the angular velocity is input to the damping buffer 44.

Further, deformation is generated within the Y-Z plane at the third beam 13, and voltage is produced by the piezo-electric elements 31 and 32 shown in FIG. 35 and FIG. 36. In accordance with the principles of Coriolis force generation, deformation in the Y-axis direction is proportional to the angular velocity ω, and so the voltage produced at the piezo-electric elements 31 and 32 is proportional to the angular velocity ω. This voltage that is proportional to the angular velocity is input to the damping buffer 47.

The output of the buffer 44, to which is input a voltage proportional to the angular velocity of Z-direction vibration, and the output of buffer 44, to which is input a voltage proportional to X-direction vibration are respectively input to lock-in amplifiers 48 and 49, the outputs of which are input to the differential amplifier 52. Outputs caused by the first bending vibration and the second bending vibration, these having the same phase, are already input to the differential amplifier 52, and are adjusted so that the output is made zero.

In contrast to the above, the signals based on the Coriolis forces input for outputs caused by the fifth and sixth bending vibrations are in opposite phases,and the output of the differential amplifier 52 is based on only Coriolis forces. The output of the buffer 46, to which is input a voltage proportional to the angular velocity of X-direction vibration, and the output of the buffer 47, to which is input a voltage proportional to the angular velocity of Z-direction vibration, are respectively input to the lock-in amplifiers 50 and 51, the output of which is input to the differential amplifier 53. Outputs caused by the first bending vibration and the second bending vibration, these having the same phase, are already input to the differential amplifier 52, and are adjusted so that the output is made zero.

In contrast to the above, the signals based on the Coriolis forces input for outputs caused by the fifth and sixth bending vibrations are in opposite phases,and the output of the differential amplifier 53 is based only on Coriolis forces. The outputs of differential amplifiers 52 and 53, which are based only on Coriolis forces, are opposite in phase, and are input to the differential amplifier 54. As a result, because the fifth bending vibration acting in the X direction acts to strengthen the first bending vibration also acting in the X direction, and the sixth bending vibration acting in the Z direction acts to strengthen the second bending vibration acting in the same Z direction, the output of the differential amplifier 54 is generated by the fifth and sixth bending vibrations, which are components of the fourth bending vibration caused by the Coriolis force.

In this embodiment, to improve the detection accuracy of the outputs of the buffers 44, 45, 46, and 47, the lock-in amplifiers 48, 49, 50, and 51, which have a large S/N ratio, are used. A lock-in amplifier operates on the principle of filtering the detection signal using a reference signal.

The first bending vibration in the four-beam tuning fork of the present embodiment is coupled with either the oscillation circuit 43 or the first and second oscillation circuits 55 and 56 to form a tuning-fork type oscillation having a high Q. That is, the signal has an extremely stable frequency. Therefore, by using these as reference signals, it is possible to achieve an extremely narrow bandwidth in the bandpass filter function of the lock-in amplifier. Stated differently, using this, it is possible to almost completely eliminate noise other than signals related to the angular velocity ω. Therefore, the lock-in amplifier using the signal from the first bending vibration as a reference signal achieves amplification with an extremely high S/N ratio when detecting signals of the fifth and sixth bending vibrations.

As will be understood from the above description, in the vibration gyro of according to the present embodiment, by disposing four beams with good symmetry, the base part is stationary for any type of vibration, there is influence on performance by the support method, and it is possible to achieve coincidence between the resonant frequencies of the excitation and detected vibration so as to obtain a high gain with the requirement for highly precise assembly, making this embodiment suitable for mass production, and providing a configuration that provides high gain in the structural resonance detection direction and cancellation of outputs other than Coriolis forces, the result being low noise and a high S/N ratio.

The seventh embodiment of a vibration gyro according to the present invention is described below, with reference being made to relevant drawings.

Figure 37:
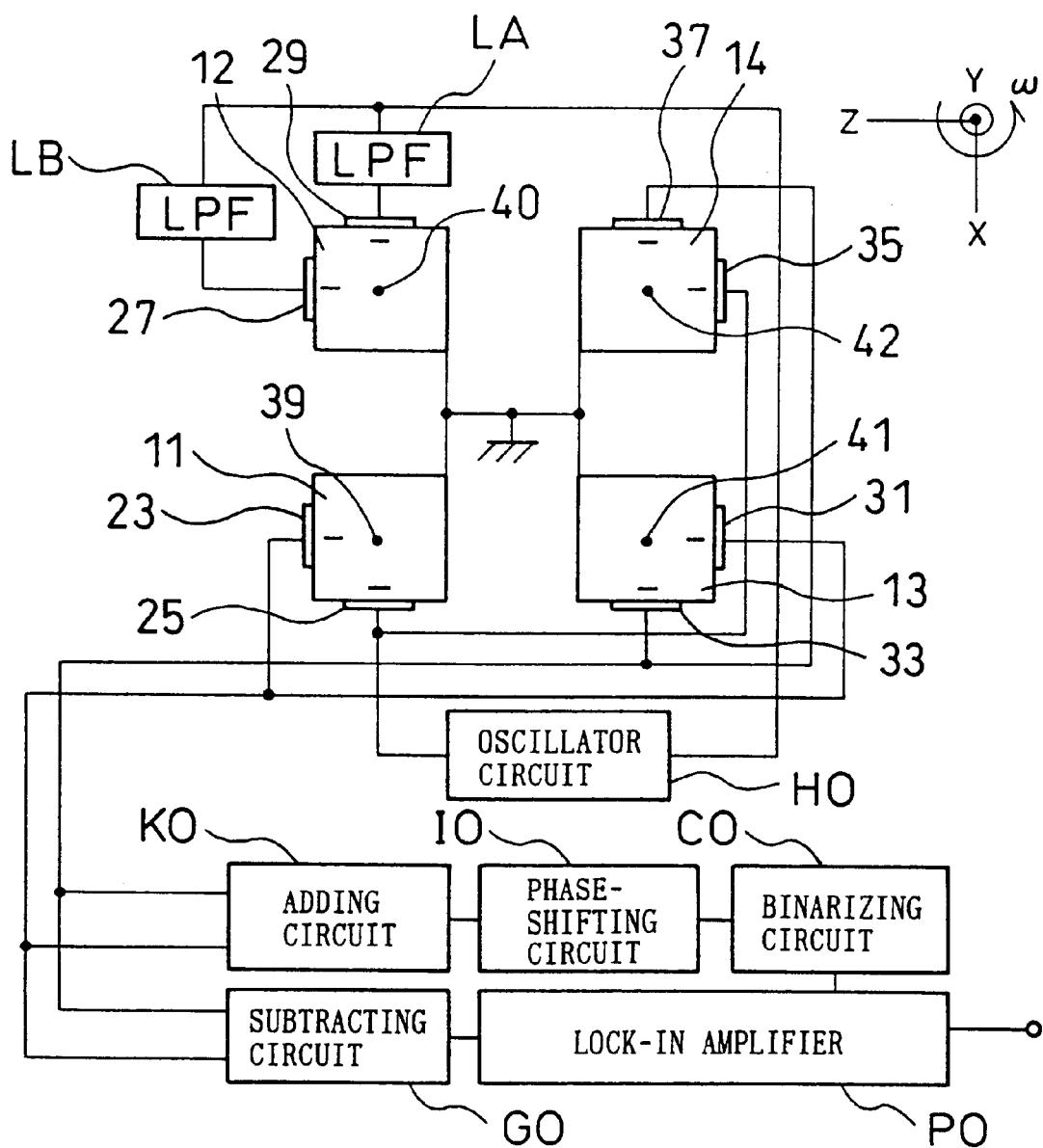
FIG. 37 is a drawing which shows the cross-sections of the beams of a four-beam tuning fork vibrating gyro that is a seventh embodiment of the present invention as viewed from the ends of the beams and a circuit block diagram thereof, and a schematic wiring diagram thereof.

FIG. 37 shows a block diagram of a vibration gyro of the seventh embodiment, this vibration gyro having four beams, electrodes, and a base part, the beams being made of a resilient material and having the shape of rectangular columns. The beams have drive sections and detection sections on their side surfaces, these being piezo-electric elements. The base part is made of a resilient material, has the shape of a rectangular column, and is integral with the four beams. The four beams are disposed in a quad-divided square arrangement on the base part and are mutually parallel. The bottom surface of the base part is used for support. Piezo-electric elements on the first and second beams are used to cause self-excited oscillation, causing a first bending vibration, piezo-electric elements on the second and fourth beams are used to cause self-excited oscillation, causing a second bending vibration with a frequency that coincides with that of the first bending vibration in a direction perpendicular to that of the first bending vibration, and a third bending vibration is synthesized from the first and second bending vibrations, a voltage generated as a result of a fifth bending vibration, which is a component of a fourth bending vibration in the direction of the first bending vibration, in a direction perpendicular to that of the third bending vibration and caused by Coriolis forces due to rotation of the third beam is detected by detection sections on the third and fourth beams, and a voltage generated as a result of a sixth vibration which is a component of the fourth bending vibration in the direction of the second bending vibration is detected by detection section on the first and second beams.

It is preferable that the four parallel beams disposed a quad-divided square arrangement in the embodiment have the depths of the adjusted parts thereof adjusted so that the lengths of the beams in the width direction and the lengths of the beams in the thickness direction differ, so as to cause coincidence between the resonant frequencies of the first bending vibration the second bending vibration.

In this embodiment, there is close mutual electrical connection between the piezo-electric element of the third beam and the piezo-electric element of the fourth beam, which vibrate by the first bending vibration.

Additionally, in this embodiment, it is preferable that there be close mutual electrical connection between the piezo-electric element of the first beam and the piezo-electric element of the third beam, which vibrate by the second bending vibration,and further preferable that there be close electrical contact between the piezo-electric element of the third beam and the piezo-electric element of the fourth beam, which vibrate by the first bending vibration.

This embodiment preferably has an addition circuit, which adds a voltage generated in a piezo-electric element affixed to the third beam by a vibration synthesized from the first and fifth bending vibrations and a voltage generated in a piezo-electric element affixed to the third beam by a vibration synthesized from the second and sixth bending vibration, a phase-shifting circuit that shifts the phase of the output of the addition circuit by 90 degrees, a binary quantizing circuit that binarizes the output of the phase-shifting circuit, a subtraction circuit that performs a subtraction between a voltage that is generated in a piezo-electric element affixed to the third beam by a vibration synthesized from the first and fifth bending vibrations and a voltage generated in a piezo-electric element affixed to the third beam by a vibration synthesized from the second and the sixth bending vibration, and a lock-in amplifier that detects the output of the subtraction circuit using the output of the binary quantizing circuit.

It is additionally preferable that a lowpass filter be provided so as to adjust the output signal of the oscillation circuit so that there is coincidence in amplitude and phase of the first and second bending vibrations.

In a vibration gyro according to this embodiment, by disposing four beams in a quad-divided square arrangement with good symmetry, the base part is almost stationary for any type of vibration, without using vibration that is influenced by the supporting method, such as extraplanar vibration in a tuning fork, and it is possible therewith to detect angles with good accuracy and little influence on performance by the supporting method. Because stimulus and detection use the same vibration mode, the configuration makes it possible to obtain a large output signal in the structural detection direction, low noise and cancellation of outputs other than Coriolis forces, and a high S/N ratio. Because stimulus and detection can be done at separate beams, there is almost no DC drift caused by a shift in phased attributed to the oscillation system.

The beams of this embodiment are made of metal or quartz glass having resiliency, have the shape of square prisms, and have driving sections and detection sections formed by piezo-electric elements affixed to the side surface of the four square prisms.

The base part is made of metal or quartz glass having resiliency and a shape of a square column.

The first beam 11, second beam 12, third beam 13, and fourth beam 14 are disposed at the four vertices of the rectangular base part 15 in a mutually parallel manner, the base part 15 being integral with the first beam 11, second beam 12, third beam 13, and fourth beam 14.

The metal used in this embodiment is Elinvar alloy comprising 50% iron, 35% nickel, and 9.1% chrome. In a case in which quartz glass having a resiliency coefficient has an extremely small dependency upon temperature is used, a thin film of an electrically conductive material such as silver or chrome is priorly formed on part of the surface, this serving as a common electrode for all the affixed piezo-electric elements.

The electrode configuration of the vibration gyro of the present embodiment is shown in FIG. 37, in an X-Z plane cross-section view which cuts through the first beam 11, the second beam 12, the third beam 13, and the fourth beam 14. A piezo-electric element 25 is affixed to the first beam 11, a piezo-electric element 29 is affixed to the second beam 12, and a piezo-electric element 35 is affixed to the fourth beam 14 for the purpose of self-excited vibration. A piezo-electric element 23 is affixed to the first beam 11, piezo-electric elements 31 and 33 are affixed to the third beam 13, and a piezo-electric element 37 is affixed to the fourth beam 14, for the purpose of detection.

FIG. 37 additionally shows the interconnections between an oscillator circuit H0 that causes self-excited vibration in all beams and electrodes of vibration stimulus piezo-electrodes 25, 25, 29, and 35, lowpass filters LA and LB, which adjust the oscillation condition, an addition circuit K0, which adds signals from the electrodes of the sensing piezo-electric elements 23, 31, 33, and 37, a phase-shifting circuit I0, which shifts the phase of the added signal, a binary quantizing circuit C0, which binarizes the phase-shifted signal, a subtractor circuit G0, which subtracts signals from the electrodes of the detecting piezo-electric elements 23, 31, 33, and 37 and generates the reference signal, and a lock-in amplifier P0, which phase-detects the subtracted signal using a reference signal, and converts it to a DC voltage.

Figure 38:
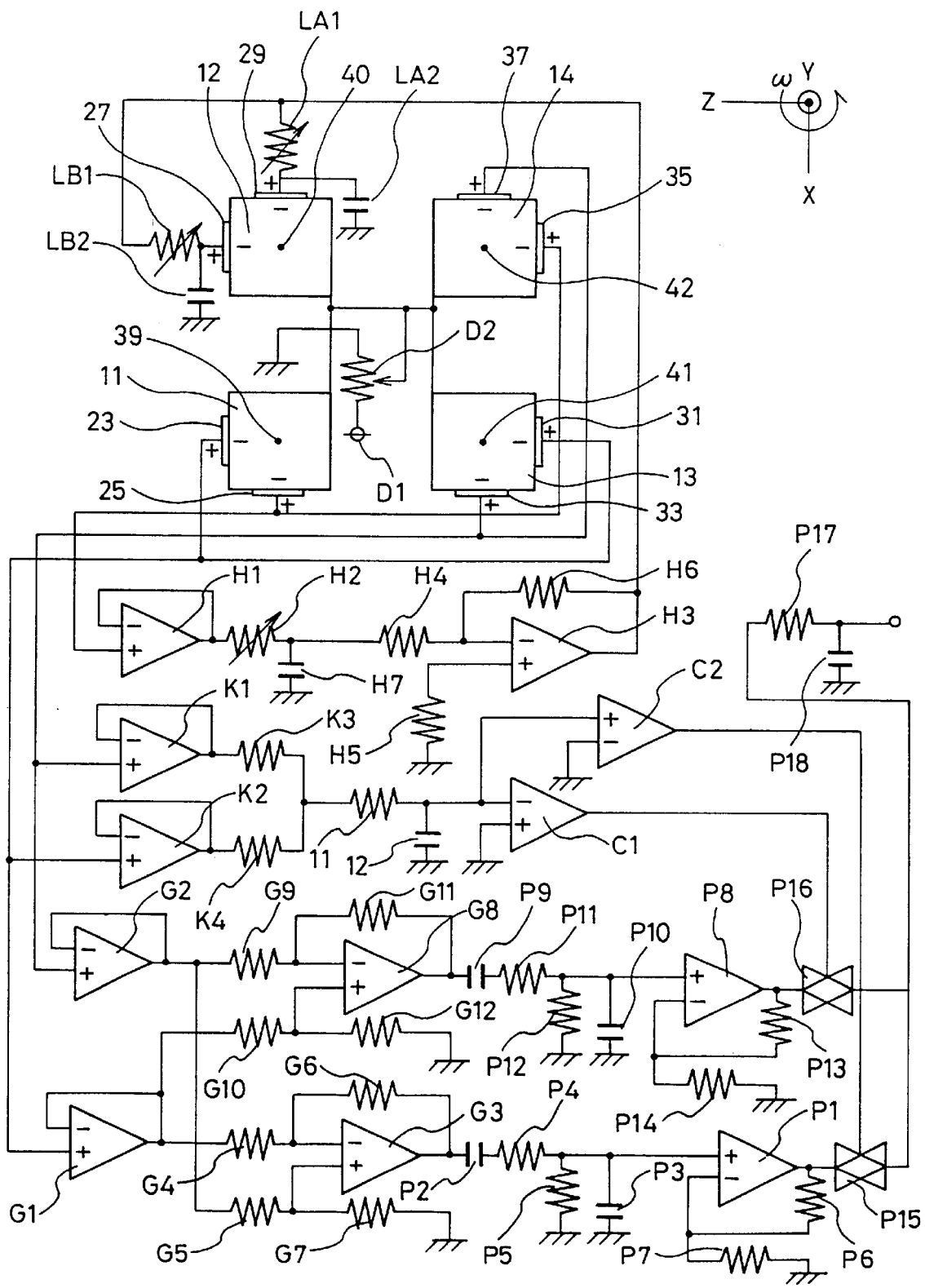
FIG. 38 is a drawing which shows the cross-sections of the beams of a four-beam tuning fork vibrating gyro that is the seventh embodiment shown in FIG. 37 as viewed from the ends of the beams and a detailed circuit example thereof.

FIG. 38, as an example of the oscillator circuit H0 of this embodiment, shows an operational amplifier H1 forming an interference buffer, a trimmer resistor H2 and a capacitor H7 that form a lowpass filter, and an operational amplifier H3 and resistances H4 to H6 that form an inverting amplifier, and additionally shows a negative power supply D1 and a dividing resistor D2 for applying DC bias.

FIG. 38 shows, as an example of the lowpass filter LA of FIG. 37, a trimmer resistance LA1 and a capacitor LA2.

Figure 39:
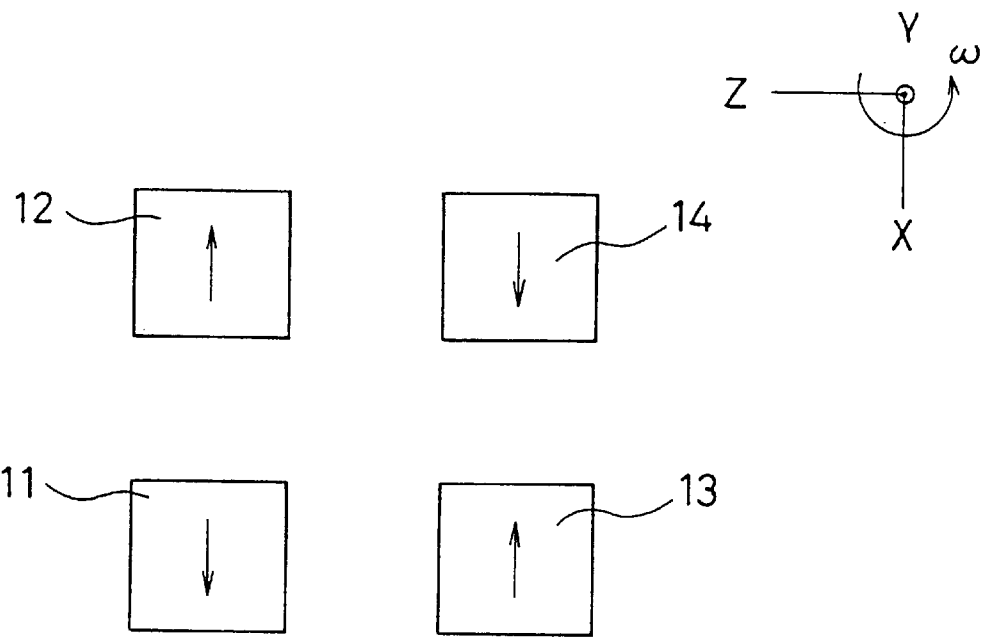
FIG. 39 is a drawing which illustrates the operation in the form of cross-sectional representations of beams as viewed from the ends of beams of a four-beam tuning fork vibration gyro according to the present invention.

FIG. 39 shows, as an example of the lowpass filter LB of FIG. 37, a trimmer resistance LB1 and a capacitor LB2.

FIG. 38 shows, as an example of addition circuit of FIG. 37, operational amplifiers K1 and K2 and resistances K3 and K4, which form an interference buffer.

FIG. 38 shows, as an example of the phase-shifting circuit I0 of FIG. 37, a resistance I1 and a capacitor I2, which form a lowpass filter.

FIG. 38 shows, as an example of the binary quantizing circuit C0 of FIG. 37, a first comparator C1 and a second comparator C2.

FIG. 38 shows, as an example of the subtraction circuit G0 of FIG. 37, interference buffers G1 and G2, an operational amplifier G3, and resistances G4 to G7, which form a first differential amplifier, and an operational amplifier G8 and resistance G9 to G12, which form a second differential amplifier.

FIG. 38 shows, as an example of the lock-in amplifier P0 of FIG. 37, an operational amplifier P1, capacitors P2 and P3, and resistances P4 to P7, which form a first lowpass filter, an operational amplifier P8, capacitors P9 and P10, and resistances P11 to P14, which form a second lowpass filter, a first analog switch P15, a second analog switch P16, and a resistance P17 and capacitor P18, which form a lowpass filter.

The electrodes of the piezo-electric elements 25, 27, 29, 35, 23, 31, 33, and 37, which are affixed to the four-beam tuning fork 10 and shown in FIG. 3 are electrically connected by soldered wires to leads 18, 19, 20, and 21, which are hermetically pressed into the base 16. The leads 18, 19, 20, and 21, are connected to the oscillator circuit H0, the addition circuit K0, and the subtraction circuit G0 shown in FIG. 37.

In FIG. 37 and FIG. 38, the first neutral line 39 of the first beam 11 Y-direction bending vibration, the second neutral line 40 of the second beam 12 Y-direction bending vibration, the third neutral line 41 of the third beam 13 Y-direction bending vibration, and the fourth neutral line of the fourth beam 14 Y-direction bending vibration are indicated as points.

It has been pointed out that PZT exhibits a deterioration in its polarized condition when a voltage is applied in a direction that is opposite of polarizing direction. In this embodiment, although there is no particular problem if the voltage is negligible compared to the high voltage applied when forming polarization, FIG. 38 shows a method as a response to the above-noted comment. When the base part is a conductor such as Elinvar the electrodes of the piezo-electric elements 25, 27, 29, 35 23, 31, 33, and 37 form a common electrode. While usually, as shown in FIG. 37, this is connected to ground, as a countermeasure with respect to PZT polarization deterioration, because a voltage of the same direction as normally done during polarization is applied, this is connected to a voltage supply D1 that has a level lower than ground.

When a voltage is applied to the electrode of the piezo-electric element 29 of the second beam 12 in FIG. 37, there is, for example, contraction of the piezo-electric element 29 in the Y direction, resulting in bending deformation in the X-axis direction.

With the passage of time, this direction changes, the result being that the second beam 12 exhibits bending vibration in the X-axis direction. When this occurs, even if the driving beam is only the second beam 12, the vibration of the second beam 12 is transmitted via the base part 15, causing the first beam 11, the third beam 13, and the fourth beam 14 to be automatically excited, the first beam 11 and the second beam 12 vibrating as a turning fork in the Y-X plane, and the third beam 13 and fourth beam 14 being self-excited so as to vibrate as a tuning fork in the Y-X plane in opposite phase from the vibration of the first beam 11 and second beam 12.

The beam that the oscillator circuit stimulates can be the first beam 11 and the beam that receives the reference signal can be the second beam 12.

When a voltage is applied to the electrode of the piezo-electric element 27 of the second beam 12 in FIG. 37, there is, for example, contraction of the piezo-electric element 27 in the Y direction, resulting in bending deformation in the Z-axis direction.

With the passage of time, this direction changes, the result being that the second beam 12 exhibits bending vibration in the Z-axis direction. When this occurs, even if the driving beam is only the second beam 12, the vibration of the second beam 12 is transmitted via the base part 15, causing the first beam 11, the third beam 13, and the forth beam 14 to be automatically excited, the fourth beam 14 and the second beam 12 vibrating as a tuning fork in the Y-Z plane, and the third beam 13 and first beam 11 vibrating as a tuning fork in the Y-Z plane in opposite phase from the vibration of the fourth beam 14 and the second beam 12.

When this occurs, a reference signal for the purpose of continuing the self-excitation is fed back from the piezo-electric element 35 of the fourth beam 14 to the oscillator circuit H0. The beam the oscillator H0 stimulates can be the fourth beam 14, and the beam that receives the reference signal can be the second beam 12.

Figure 40:
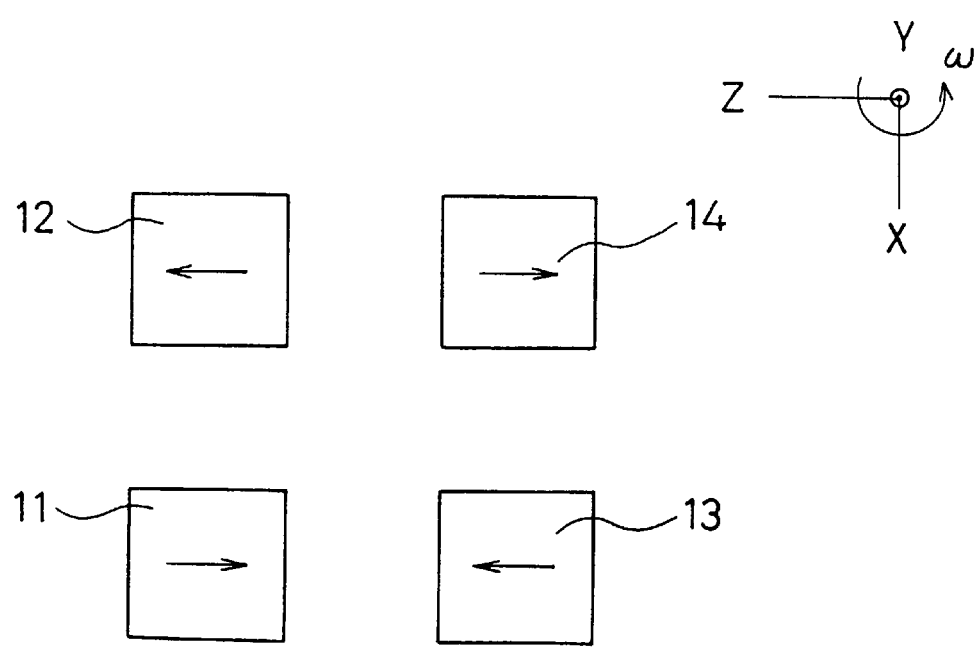
FIG. 40 is a drawing which illustrates the operation in the form of cross-sectional representations of beams as viewed from the ends of beams of a four-beam tuning fork vibration gyro according to the present invention.

FIG. 39 shows a schematic representation of the first bending vibration. With the first bending vibration, the first beam 11, second beam 12, third beam 13, and fourth beam 14 of the four-beam tuning fork 10 exhibit bending vibration in the Y-X plane, with the deformation direction at some instant in time indicated here by arrows. FIG. 40 shows a schematic representation of the second bending vibration. In the second bending vibration, the first-beam 11, second beam 12, third beam 13, and fourth beam 14 of the four-beam tuning fork 10 exhibit bending vibration in the Y-Z plane, with the deformation at some instant in time indicated here by arrows.

By verification, using a prototype of a four-beam tuning fork 10, of the first bending vibration and second bending vibration shown in FIG. 37, the existence of resonant frequency as a resilient body was verified. That is, in the first bending vibration, all the beams vibrate in the X direction, the first beam 11 and second beam 12 vibrating as a normal tuning fork, and the third beam 13 and fourth beam 14 simultaneously vibrating as a tuning fork with a phase that is the opposite from the first beam 11 and the second beam 12. In the second bending vibration, all the beams vibrate in the Z direction, the first beam 11 and the third beam 13 vibrating as a normal tuning fork, and the second beam 12 and the fourth beam 14 simultaneously vibrating as a tuning fork with a phase that is the opposite from the first beam 11 and the third beam 13. Because these vibrations are mutually balanced among the four beams, the base part 15 becomes a vibration mode which exhibits almost no vibration, so that by supporting the four-beam tuning fork 10 at the bottom surface, there is almost no change in the vibration condition due to the support method.

Figure 41:
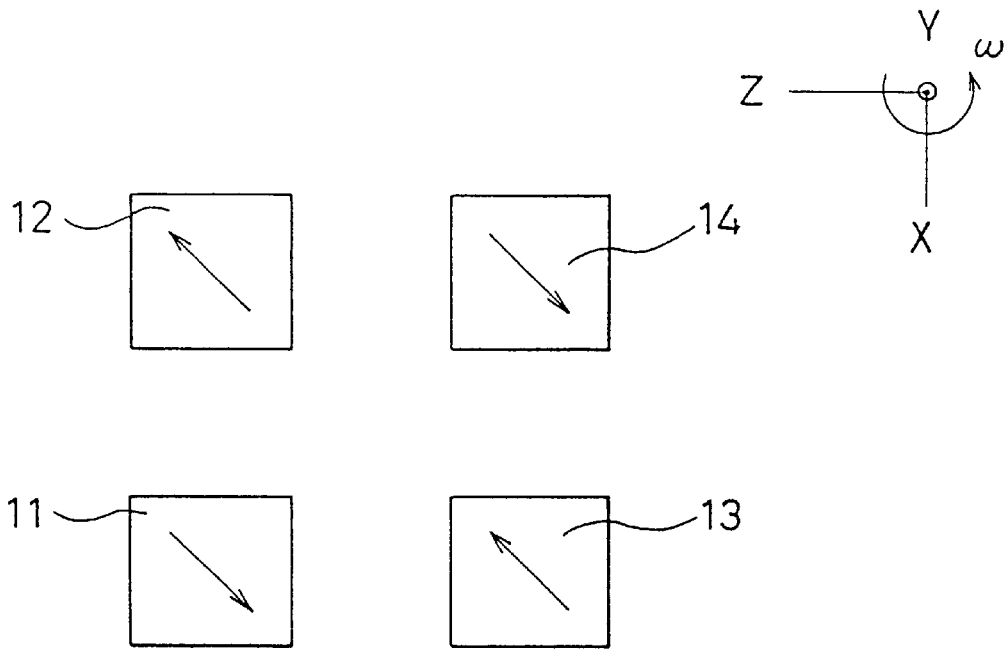
FIG. 41 is a drawing which illustrates the operation in the form of cross-sectional representations of beams as viewed from the ends of beams of a four-beam tuning fork vibration gyro according to the present invention.

FIG. 41 shows a schematic representation of the bending vibration condition in the four-beam tuning fork 10 for the case of simultaneous first and second bending vibrations. In the oscillator circuit of FIG. 37, the first bending vibration and second vibration reference signal are input to one oscillator circuit H0, the first bending vibration and second bending vibration being excited by the voltage output thereof. Under this condition, the resonant frequency f1 of the first bending vibration and the resonant frequency f2 of the second bending vibration are the same, a third bending vibration being generated as the synthesis from the first and second bending vibrations.

Figure 42:
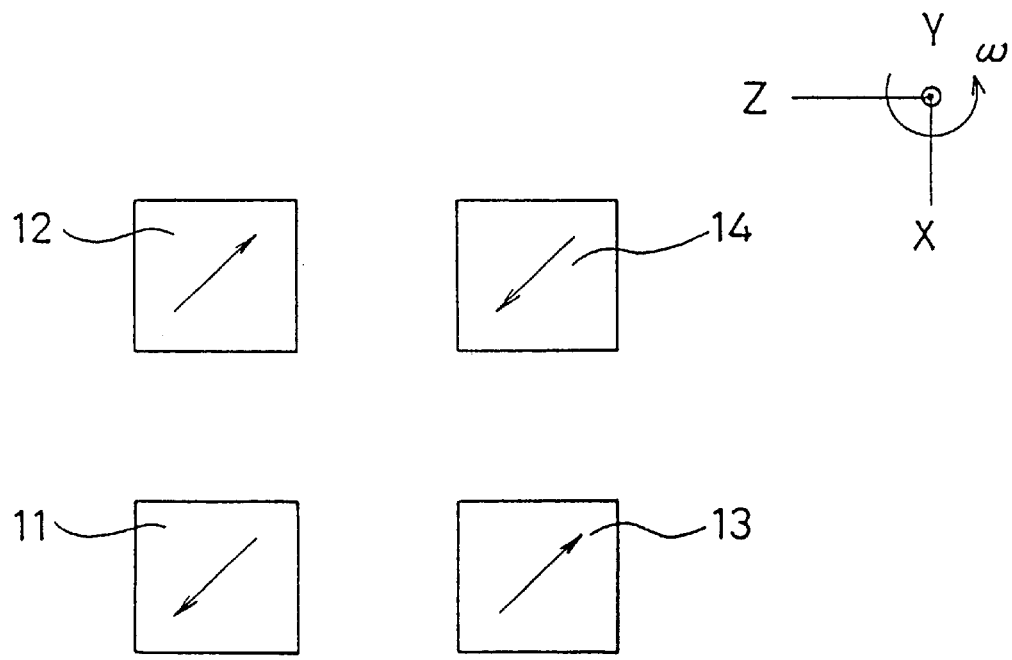
FIG. 42 is a drawing which illustrates the operation in the form of cross-sectional representations of beams as viewed from the ends of beams of a four-beam tuning fork vibration gyro according to the present invention.

When the third bending vibration is generated, if the four-beam tuning fork 10 rotates about the Y axis with an angular velocity of ω, each of the beams receives a Coriolis force that is perpendicular to the direction of displacement, a fourth bending vibration as shown in FIG. 42 being caused by these Coriolis forces. While the fourth bending vibration can be treated as the synthesis of the first and second bending vibrations, similar to the case of the third bending vibration, in contrast to the third bending vibration, the second bending vibration phase is changed by 180 degrees with respect to the phase of the first bending vibration. The properties of the third and fourth bending vibration are exactly the same, excitation of the fourth bending vibration by the third bending vibration being done with the maximum efficiency, making it possible to obtain a fourth bending vibration having a large amplitude.

Figure 43:
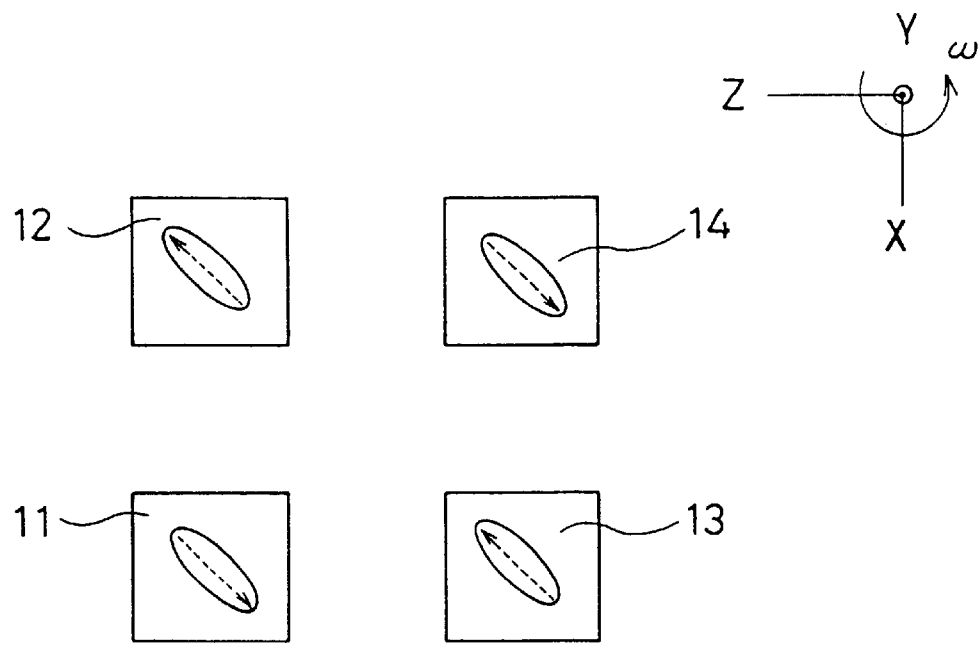
FIG. 43 is a drawing which illustrates the operation in the form of cross-sectional representations of beams as viewed from the ends of beams of a four-beam tuning fork vibration gyro according to the present invention.

Because a Coriolis force is an initial force, a large force acts at a position of a high velocity. This indicates that, in the operation of a vibrating beam,at the position of maximum velocity , this being the position in which the beam is not bent, is the position at which the largest Coriolis force acts. Therefore, the fourth bending vibration, in which a Coriolis force caused by the third bending vibration is vibration that differs in phase by 90 degrees from the third bending vibration. From this fact, the vibration condition synthesized from the third bending vibration shown in FIG. 9 and the fourth bending vibration caused by the Coriolis force shown in FIG. 42 is one in which, as shown in FIG. 43, each beam describes an ellipse by its motion.

The four-beam tuning fork 10 is designed so as to be symmetrical about the X axis and Y axis. Verification of this ideal shape is possible using a finite-element analysis, and for an isotropically resilient body, if complete symmetry is guaranteed, in a four-beam tuning fork 10, it is verified that, rather than the first and second bending vibrations, the third and fourth bending vibration are the intrinsic bending vibrations. If symmetry is even slightly upset, however, the first and second bending vibrations are the intrinsic bending vibrations. For realistic fabrication accuracies that are finite, because symmetry in the X and Y directions is not guaranteed, the first and second bending vibrations are the intrinsic bending vibrations, with the respective mechanical resonance frequencies being different, these values being f1 and f2.

With the configuration shown in FIG. 37, the first and second bending vibrations comprise an electromechanical vibrating system according to the mechanism of the four-beam tuning fork 10 and the oscillator circuit H0.

In the electromechanical vibrating system of the four-beam tuning fork 10, by causing frequencies of the first and second bending vibrators to coincide, it is possible to cause a third bending vibration having a of frequency f that is close to the lower frequency of f1 and f2. Under this condition, the higher frequency of f1 and f2 is distant from the mechanical characteristic frequency.

Figure 44:
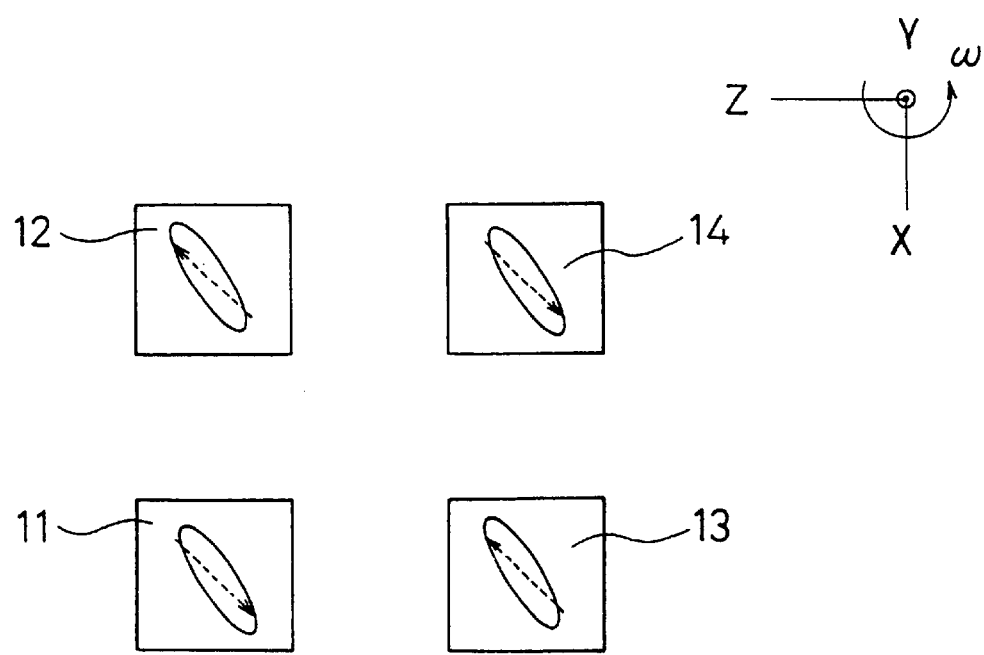
FIG. 44 is a drawing which illustrates the operation in the form of cross-sectional representations of beams as viewed from the ends of beams of a four-beam tuning fork vibration gyro according to the present invention.

In the ideal case, in the condition in which Coriolis force does not act, the third bending vibration is the linear vibration at a direction of 45 degrees shown in FIG. 9. If the Coriolis force shown in FIG. 42 acts, the main axis shown in FIG. 43 is an elliptical path at a direction of 45 degrees, the Coriolis force being observed only as a change of phase between the first and second bending vibrations. However, in a practical case in which there is variation in the mass and characteristics of the piezo-electric elements used, in addition to the effect of the manufacturing precision of the tuning fork, even in a condition in which Coriolis force is not acting, the amplitude and phase of the first and second bending vibrations, and third bending vibration generally, as shown in FIG. 44, has a main axis that is an elliptical path tilted at an angle of 45 degrees.

If there is a phase difference in the four-beam tuning fork 10 even when it is not rotating, when it rotates there is additionally an inclination in the elliptical main axis caused by the amplitude difference occurs, the difference in amplitude between the first and second bending vibrations acts in a complex manner to mutually increase the amplitude difference under the influence of the Coriolis force. In this embodiment, using the lowpass filters LA and LB shown in FIG. 2, by varying the amplitude and phase of the vibration stimulus of the oscillator circuit H0, it is possible in the condition in which a Coriolis force does not act, to cause the amplitudes of the first and second bending vibrations to coincide, and to eliminate the phase difference therebetween, thereby achieving the linear third bending vibration shown in FIG. 43.

The effect of Coriolis force in this case appears only as a phase difference between the first and second bending vibrations, and it is possible to detect the Coriolis force with a simple detection circuit to be described below. The actual effect of Coriolis force is a further change in the amplitude in the main elliptical axis where the third bending vibration becomes elliptical, although these need not be used for detection.

As shown in FIG. 38, the lowpass filters LA and LB, and the capacitors LA2 and LB2, it being possible to use capacitors LA2 and LB2 of different values, so as to adjust the phase and amplitude. The phase change in the overall oscillator with a change in phase is absorbed by priorly changing the constants in a separate lowpass filter of the oscillator circuit H0, this also being formed by a trimmer resistance H2 and a capacitor H7.

If the respective mechanical resonance frequencies are excessively distant, and the first and second bending vibrations are simultaneously generated, so as to generate the third bending vibration, f becomes greatly distant from the higher frequency of f1 and f2, and the bending vibration that has as its resonant frequency the higher frequency becomes merely a forced vibration, so that the third bending vibration can no longer be called a resonance phenomenon, making it necessary to inject sufficient vibration stimulus energy from the oscillator circuit to maintain sufficient amplitude. In such a non-resonant condition, the fourth bending vibration, which is generated by Coriolis force, attenuates extremely quickly, and there is also the effect of the large vibration stimulus of the oscillator circuit H0 causing attenuation of the fourth bending vibration, so that it is not possible to obtain a sufficient output.

Given the above, a measure is taken so that the mechanical resonant frequencies of the first and second bending vibrations are brought into proximity. Because the frequency of bending vibration of a bar-shaped vibrating element is proportional to the width thereof in the bending direction, by machining the cross-section of the four-beam tuning fork 10 perpendicular to the 4 axes with good precision, the resonant frequencies of the first and second bending vibrations are brought into mutual proximity.

Considering mass production, however, the machining precision of dicing saws and wire cutters generally used is approximately +/−3 µm, so that for a beam width of 300 µm for the beams of the four-beam tuning fork 10, 1% is the limit of machining precision. If further adjustment is required, because the resonant frequency of a bar-shaped resonator is inversely proportional to the square of the length of the bar, machining is done so that the respective depths at the furcating parts differ, thereby making the beam length L1 seen from the Z direction and the beam length L2 seen from the X direction different. By performing local machining of the part only with further machining precision, it is possible to cause the resonant frequencies of the first and second bending vibrations to coincide with further accuracy, thereby making it possible to obtain resonant third bending vibration.

In FIG. 37, the output from the electrodes of the piezo-electric elements 33 and 37, which detect X-direction vibration, is taken as the signal A, and the output of the electrodes of the piezo-electric elements 23 and 31, which detect Z-direction vibration, is taken as the signal B. The piezo-electric element 33 and the piezo-electric element 37 are electrically connected, this being done so that, when an X-direction vibration or shock is applied to the four-beam tuning fork 10, the noise outputs attributed to these are canceled out.

The piezo-electric element 23 and the piezo-electric element 31 are electrically connected, this being done so that, when an Z-direction vibration or shock is applied to the four-beam tuning fork 10, the noise outputs attributed to these are canceled out. The fourth bending vibration has as an X-direction component a fifth bending vibration. The fifth bending vibration has the effect of changing the first bending vibration. That is, signal A is synthesized of the first bending vibration and the fifth bending vibration, which is caused by a Coriolis force. The fourth bending vibration has as a Z-direction component a sixth bending vibration.

The sixth bending vibration has the effect of changing the second bending vibration. That is, signal B is synthesized of the second bending vibration and the sixth bending vibration, which is caused by a Coriolis force. In this embodiment, the signals A and B are input to the addition circuit K0 and to the subtraction circuit G0, so as to generate the sum of (signal A+signal B) and the difference of (signal A−signal B), which are then used.

Figure 14:
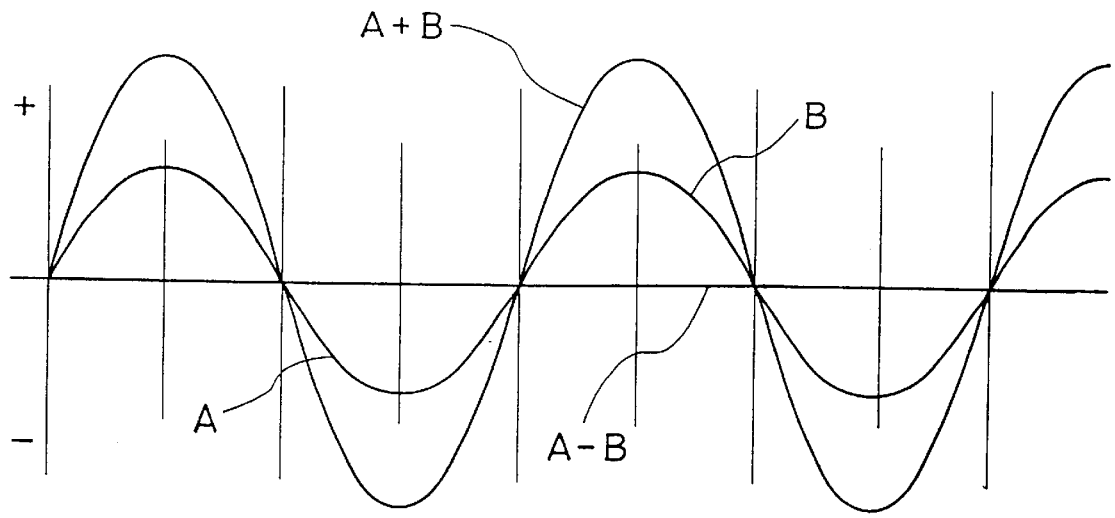
FIG. 14 is a waveform diagram that shows signals from piezo-electric elements.

FIG. 14 shows the relationships of signal A, signal B, A+B, and A−B, for the case in which no Coriolis force acts. In this case, signal A and signal B are respectively the first and second bending vibrations themselves, these being adjusted by the lowpass filters LA and LB, so that they completely coincide as signals. Signal A+B is then a signal having double the amplitude of either signal A or signal B, and signal A−B has no amplitude.

Figure 15:
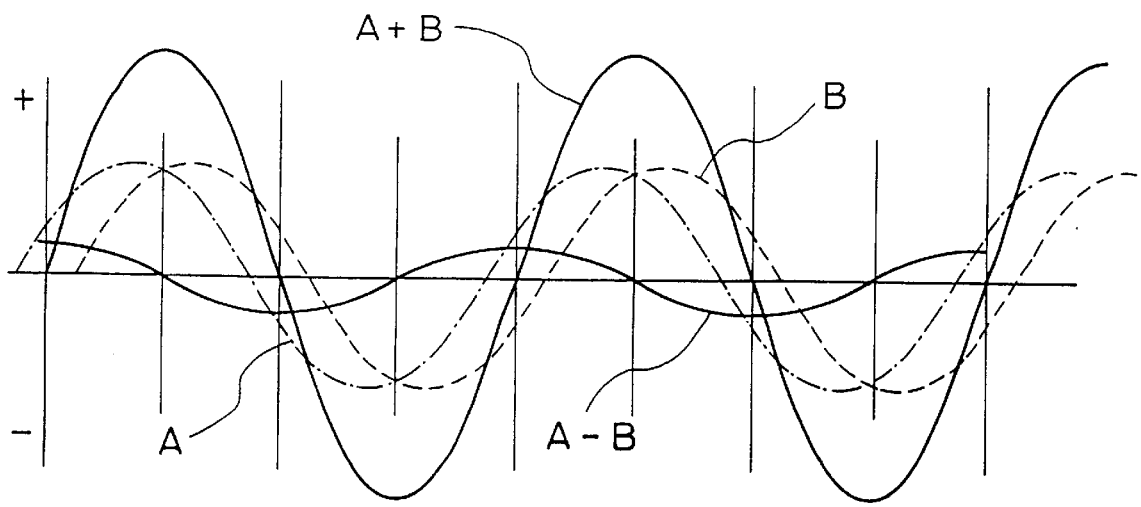
FIG. 15 is a waveform diagram that shows signals from piezo-electric elements.
Figure 17:
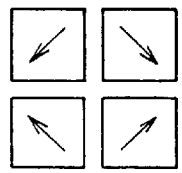
FIG. 17 through FIG. 28 are drawings which illustrate the operation of an ordinary four-beam tuning fork vibrating gyro, and which schematically show the cross-sections of the beams as seen from the ends thereof.
Figure 18:
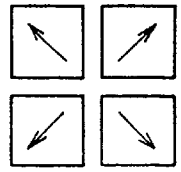
Figure 19:
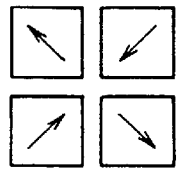
Figure 20:
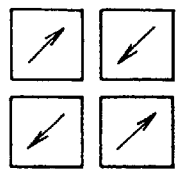
Figure 21:
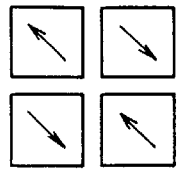
Figure 22:
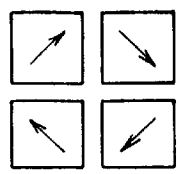
Figure 23:
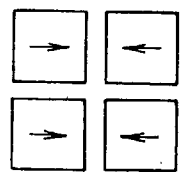
Figure 24:
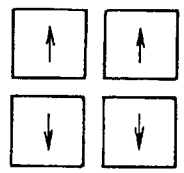
Figure 25:
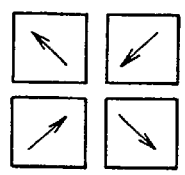
Figure 26:
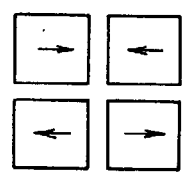
Figure 27:
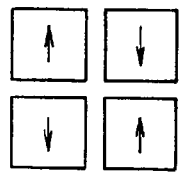
Figure 28:
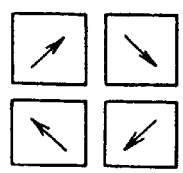
Figure 29:
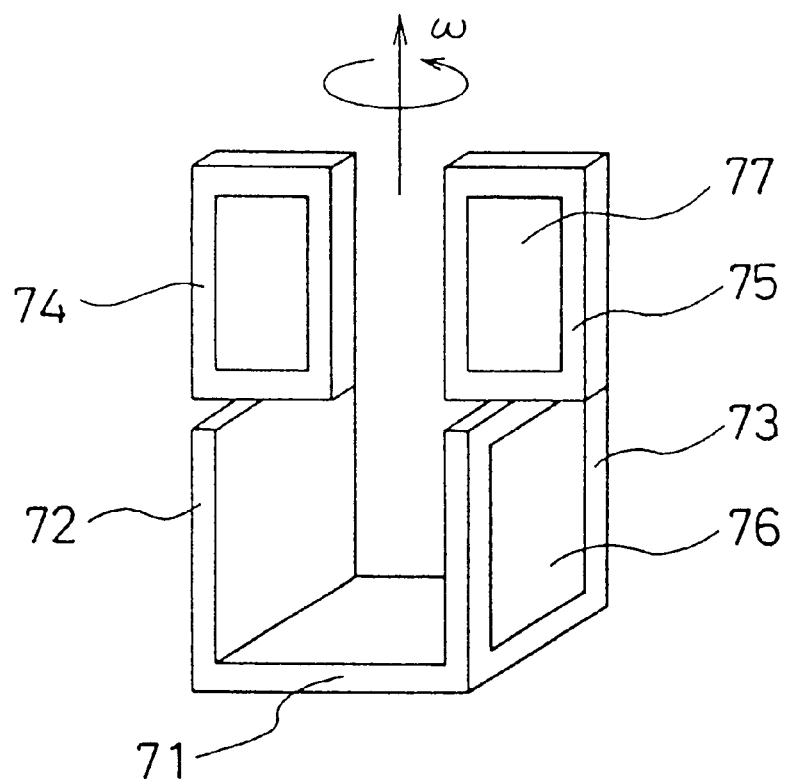
FIG. 29 is a perspective view that shows a tuning fork vibration gyro according to the prior art.

FIG. 15 shows the relationships of signals A, B, A+B, and A−B for the case in which a fourth bending vibration is caused by a Coriolis force. The effect of the fourth bending vibration is to change the relative phase of the signals A and B. The relative phase between signal A and signal B substantially in proportion to the size of the rotating angular velocity ω of the four-beam tuning fork 10.

If the angular velocity ω causes the phase of the signal A to lead and causes the signal B to lag, an angular velocity of−ω will cause the signal B to lead and the signal A to lag, so that the change of the phases of signals A and B depends upon the direction of ω. In contrast, regardless of the existence or non-existence of a Coriolis force, the signals A+B and A−B maintain the phase as if there were no Coriolis force. A Coriolis force brings about a small change of amplitude in the signal A+B, and brings about a minute change of amplitude in the signal A−B.

Figure 16:
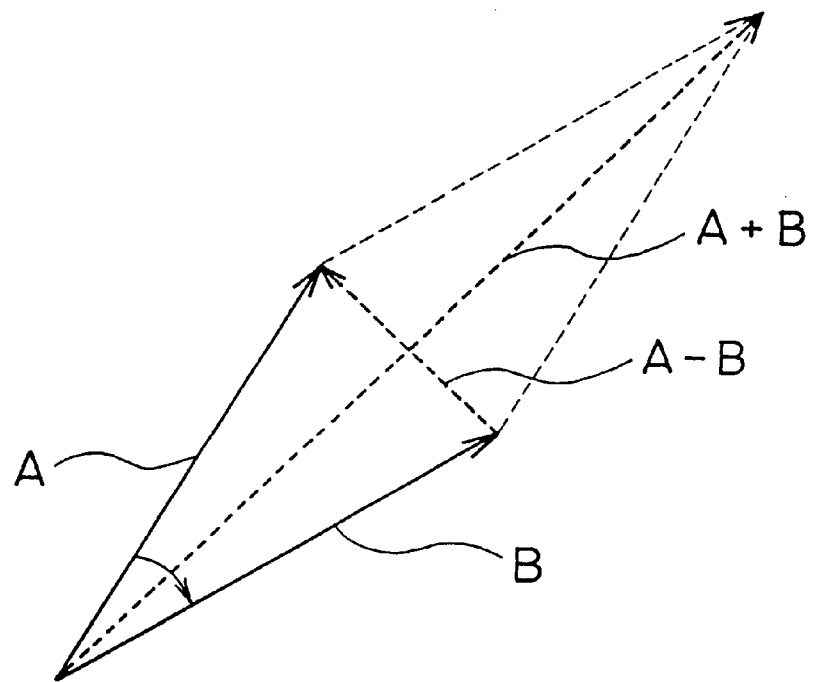
FIG. 16 is a drawing which illustrates the operation in the form of vector representations of signals from piezo-electric elements.
Figure 13:
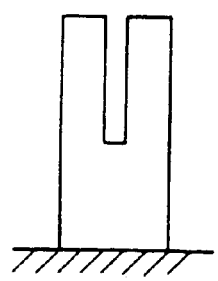
FIG. 13 is a front view that shows an ordinary four-beam tuning fork.

FIG. 16 represents the signals A, B, A+B, and A−B as vectors. In this case, the signal amplitude is represented by the vector length, and the signal phase is represented by the vector rotation. The effect of a Coriolis force can be detected as a chance in the amplitudes of the signals A+B and A−B. It should be noted that if the change in signal A and signal B is phase only, with no change in amplitude, the relative phase between the signals A+B and A−B us always 90 degrees, regardless of the size of the Coriolis force.

In the embodiment, a lock-in amplifier configuration is used in the detection of a Coriolis force having a small output, a component having the same frequency as a reference signal being the only one extracted from the signal being detected, thereby achieving a high S/N ratio, in which case it is necessary to have an accurate reference signal with a phase that coincides with the signal being detected. First, because the detected signals A, B, and A+B, which reflect the Coriolis force, have large amplitudes even when there is no Coriolis force, these signals are not suitable for detecting changes caused by a small Coriolis force.

In contrast, because the signal A−B has no output when there is no Coriolis force, considering dynamic range, this signal is best suited as a detected signal and is thus used. Because signals A and B exhibit phase changes because of a Coriolis force, they cannot be used as a detected signal. Because the signal A−B itself, which has the most accurate phase, has either no AC output or an unstable output if there is little or no Coriolis force acting, it cannot be used. However, as shown in FIG. 16, the signal A+B always has a large stable amplitude and a phase difference with respect to the signal A+B that is precisely 90 degrees. Therefore, the signal A+B shifted by 90 degrees is used as the reverence signal.

As shown in FIG. 37, the signals A and B are input to the subtraction circuit G0, differential amplifier circuits G1 to G12, having a high common-mode rejection ratio (CMRR), such as shown in FIG. 38, are used to generate a signal A−B and an inverted-phase signal B−A, these being input to the lock-in amplifier P0 shown in FIG. 37. As shown in FIG. 37, within the lock-in amplifier P0, bandpass filters P1 to P14 are used to remove the DC and odd-numbered harmonic components from the signal A−B and the inverted-phase signal thereof B−A, analog switches P15 and P16 are used to perform switching, and smoothing/integration circuits P17 and P18 are used to make a conversion to DC.

As shown in FIG. 37, signals A and B are input to the addition circuit K0, and as shown in FIG. 38, phase is shifted by 90 degrees by the phase-shifting circuits I0 and I1. At the comparators C1 and C2, a switching signal and an inverted-phase switching signal are generated, these being input to the analog switches P15 and P16. As a result, the signal A−B is full-wave detected at a timing that is shifted by 90 degrees from the signal A+B, thereby being converted to DC output. In order to avoid DC drift, a switching method is used, rather than a multiplier, to detect the phase. With this configuration, there is almost complete elimination of signal components o frequencies other than that of the reference signal, thus being viewed as noise, enabling the achievement of Coriolis force detection with an extremely high S/N ratio.

Therefore, from a vibration that is the effect of the fifth and sixth bending vibrations, which are caused by a Coriolis force, on the difference between the first and second bending vibrations, only the effects of the fifth and sixth bending vibrations, which is cause by a Coriolis force, are ultimately detected as DC. This enables accurate knowledge of the value of the angular velocity ω.

The third bending vibration in the four-beam tuning fork 10 according to the present invention comprises a tuning fork type oscillator having a large Q value. That is, it has an extremely stable frequency. Therefore, by using this as a reference signal, it is possible to make the frequency-extraction width, which is a function of a lock-in amplifier, extremely small. Stated differently, using the configuration of this embodiment, it is possible to almost completely eliminate noise other than a signal, attributable to the angular velocity ω, and to achieve a very good S/N ratio.

As is clear from the foregoing, a vibration gyro according to the present invention, by disposing four beams in a quad-divided square arrangement with good symmetry, the base part is made substantially stationary, for any type of vibration used, without using a vibration that is influenced by the method of support, such as extraplanar vibrations in a tuning fork, enabling accurate angular velocity detection, with little influence on performance by the method of support. Because the vibration stimulus and detection make use of the same vibration mode, it is possible to obtain a large output signal in the structural detection direction, and to adopt a configuration that enables cancellation of outputs other that Coriolis force, thereby reducing noise and achieving a high S/N ratio. Because vibration stimulus and detection are done on separate beams, there is almost no DC drift caused by phase shift due to the oscillation system.

What is claimed is:

1. A vibration gyro made of a resilient material, comprising four beams and a base part that is integrally formed with said beams, and;
   said four beams are disposed at equal distances and at uniform angular spacing with respect to the center part of said base part;
   wherein a depth of the furcated parts formed between two of said four parallel beams of said vibration gyro disposed in a quad-divided-square arrangement are adjusted so that the length thereof seen on an X-Y plane is different from the length seen on a Y-Z plane, thereby causing the resonant frequencies of the first bending vibration and the second bending vibration to coincide.

2. A vibration gyro according to claim 1, wherein a piezo-electric element of a third beam exhibiting said first bending vibration and a piezo-electric element of a fourth beam exhibiting said first bending vibration are connected electrically.

3. A vibration gyro made of a resilient material, comprising four beams and a base part that is integrally formed with said beams,
   wherein said four beams are disposed at equal distances and at uniform angular spacing with respect to the center part of said base part;

a first part of said beams comprising at least a part of said beams selected from said beams, which are caused to make self-excitation resulting in a first bending vibration along a first direction;

a second part of said beams comprising at least a part of said beams selected from said beams and including at least one beam belonging to said first part of said beams, which are caused to make self-excitation resulting in a second bending vibration along a second direction different from said first direction;

at least one electrode selected from a group of a drive electrode and a detection electrode each being made of piezo-electric element is provided on a side surface of each of said beams; and a voltage that is generated by bending vibration on at least a part of said beams is measured; and further wherein a first part of beams selected from said beams is caused to perform only an operation of vibration of self-excitation;

a second part of beams selected from said beam is caused to perform only an operation of detection by measurement of a voltage accompanying with said vibration of said beams; and yet another part of beams is caused to perform both an operation of vibration by self-excitation and an operation of detection with a detection electrode.

4. A vibration gyro according to claim 3, wherein:

only a drive electrode is provided on said fist part of beams selected from said beams;

only a detection electrode is provided on said second part of beams selected from said beams; and both a drive electrode and a detection electrode are provided on said yet another part of said beam part.

5. A vibration gyro made of a resilient material, comprising four beams and a base part that is integrally formed with said beams, wherein said four beams are disposed at equal distances and at uniform angular spacing with respect to the center part of said base part;

a first part of said beams comprising at least a part of said beams selected from said beams, which are caused to make self-excitation resulting in a first vibration along a first direction that is not within a plane that includes the center lines of said selected two mutually adjacent beams and said first vibration being separable into a first bending vibration and a second bending vibration;

a second part of said beams comprising at least a part of said beams selected from said beams and including at least one beam belonging to said first part of said beams, which are caused to make self-excitation resulting in a second vibration along a second direction different from said first direction and which is not within a plane that includes the center lines of said selected two mutually adjacent beams and said second vibration being separable into a first bending vibration and a second bending vibration;

at least one electrode selected from a group of a drive electrode and a detection electrode each being made of piezo-electric element is provided on a side surface of each of said beams; and a voltage that is generated by bending vibration on at least a part of said beams is measured; and further wherein a self-excited vibration is caused on a first and a second beam selected from said beams by using a piezo-electric element provided on said first beam and said second, so as to cause a first bending vibration, and simultaneously with which, a separate self-excited vibration is caused on said second beam and a fourth beam selected from said beams by using a piezo-electric element provided on said second beam and said fourth beam, so as to cause a second bending vibration in a direction perpendicular to said first bending vibration and with a frequency and phase thereof being approximately the same as those of said first bending vibration and further wherein, a third bending vibration is generated by synthesis of said first bending vibration and said second bending vibration, as well as a fourth bending vibration being generated from said third bending vibration by Coriolis force caused by rotation of said vibration gyro, in a direction perpendicular to the direction of said third bending vibration, and further wherein, a voltage which is generated as a result of a fifth bending vibration which is a component of said vibrating direction in said first bending vibration of said fourth bending vibration, being detected by detectors provided on third and fourth beams, while a voltage which is generated as a result of a sixth bending vibration, which is a component of said vibrating direction in said second bending vibration of said fourth bending vibration, being detected by detectors of said first and said third beams, so as to use both of the voltage generated by said fifth bending vibration and the voltage generated by said sixth bending vibration, as an detection output.

6. A vibration gyro according to claim 5, comprising a PLL loop feedback circuit for causing the frequency and phase of a first oscillator circuit for generating a third bending vibration and a second oscillator circuit for generating a fourth bending vibration to coincide, said PLL loop feedback circuit being provided for one oscillator circuit with respect to the other, or in both oscillator circuits with each other.

7. A vibration gyro according to claim 5 comprising a lock-in amplifier for detecting an output voltage generated as a result of a second bending vibration, using an output of an oscillator that generates a first bending vibration as a reference signal.

8. A vibration gyro according to claim 7 comprising:

a first lock-in amplifier that detects and converts to a first direct current an output voltage generated as a result of said fifth bending vibration, which is a component of said vibrating direction in said first bending vibration of said fourth bending vibration, being detected by detectors provided on the third and fourth beams, using an output of an oscillator that generates a first bending vibration as a reference signal; and a second lock-in amplifier that detects and converts to a second direct current an output voltage generated as a result of said sixth bending vibration, which is a component of said vibrating direction in said second bending vibration of said fourth bending vibration, using an output signal of an oscillator that generates a first bending vibration as a reference signal.

9. A vibration gyro according to claim 5, wherein, in order to cause the resonant frequencies of a first bending vibration and a second bending vibration to coincide, the depth of the furcated parts of said beams adjusted so that the length thereof seen on an X-Y plane is different from the length seen on a Y-Z plane.

10. A vibration gyro according to claim 5, comprising:

a first lock-in amplifier that detects and converts to a first direct current an output voltage generated as a result of said fifth bending vibration, which is a component of said vibrating detection in said first bending vibration of said fourth bending vibration, being detected by detectors provided on the third and fourth beams, using an output of a first oscillator that generates said first bending vibration as a reference signal; and a second lock-in amplifier that detects and converts to a second direct current an output voltage generated as a result of said sixth bending vibration, which is a component of said vibrating detection in said second bending vibration of said fourth bending vibration, using an output signal of said first oscillator that generates said first bending vibration as a reference signal.

11. A vibration gyro according to claim 5, comprising a differential amplifier to which are input both a voltage generated as a result of said fifth bending vibration and a voltage generated as a result of said sixth bending vibration.

12. A vibration gyro according to claim 5, comprising a lock-in amplifier that detects a voltage output generated at a piezo-electric element of said third beam by the action of said fifth bending vibration, using a voltage output generated at a piezo-electric element of said third beam by the action of a bending vibration, as a reference signal.

13. A vibration gyro according to claim 5, comprising a lock-in amplifier that detects a voltage output generated at a piezo-electric element of said third beam by the action of said sixth bending vibration, using a voltage output generated at a piezo-electric element of said third beam by the action of a bending vibration synthesized from said second bending vibration and said sixth bending vibration, as a reference signal.

14. A vibration gyro according to claim 5, comprising a lock-in amplifier that detects a voltage output generated at a piezo-electric element of said third beam by the action of said fifth bending vibration, using a voltage output generated at a piezo-electric element of said third beam by the action of a bending vibration synthesized from said second bending vibration and said sixth bending vibration, as a reference signal.

15. A vibration gyro according to claim 5, comprising a lock-in amplifier that detects a voltage output generated at a piezo-electric element of said third beam by the action of said sixth bending vibration, using a voltage output generated at a piezo-electric element of said third beam by the action of a bending vibration synthesized from said first bending vibration and said fifth bending vibration, as a reference signal.

16. A vibration gyro according to claim 12, comprising:

a first lock-in amplifier that detects a voltage output generated at a piezo-electric element of said third beam caused by the action of said fifth bending vibration;

a second lock-in amplifier that detects a voltage output generated at a piezo-electric element of said third beam caused by the action of said sixth bending vibration; and a differential amplifier circuit that adds the outputs of said first and second lock-in amplifiers.

17. A vibration gyro according to claim 14, comprising:

a first lock-in amplifier that detects a voltage output generated at a piezo-electric element of said third beam caused by the action of said fifth bending vibration;

a second lock-in amplifier that detects a voltage output generated at a piezo-electric element of said third beam caused by the action of said sixth bending vibration; and a differential amplifier circuit that adds the outputs of said first and second lock-in amplifiers.

18. A vibration gyro according to claim 5, comprising:

an adding circuit that adds an output voltage generated at a piezo-electric element of said third beam caused by the action of vibration synthesized of said first bending vibration and said fifth bending vibration, and an output voltage generated at a piezo-electric element of said third beam caused by the action of vibration synthesized of said second bending vibration and said sixth bending vibration;

a phase-shifting circuit that shifts the phase of the output of said adding circuit by 90 degrees;

a binarizing circuit that binarizes the output from said phase-shifting circuit;

a subtracting circuit that performs a subtraction between a voltage output generated at a piezo-electric element of the third beam and caused by the action of a vibration synthesized from said first bending vibration and said fifth bending vibration and a voltage generated at a piezo-electric element of said third beam and caused by the action of a vibration synthesized from said second bending vibration and said sixth bending vibration; and a lock-in amplifier that detects the output of said subtracting circuit by using the output of said binarizing circuit.

19. A vibration gyro according to claim 5, further comprising a lowpass filter for the purpose of adjusting the output signal of an oscillator so that the amplitudes and the phases of said first bending vibration and said second bending vibration coincide.

20. A vibration gyro according to claim 5, further comprising a phase-shifting circuit that adjusts the output signal of an oscillator circuit so that the phases of said first bending vibration and said second bending vibration substantially coincide.

21. A vibration gyro according to claim 14, further comprising a differential amplifier circuit that adds the output of said first lock-in amplifiers detecting an output voltage generated at a piezo-electric element of said third beam caused by the action of said fifth bending vibration and the output of said second lock-in amplifier detecting an output voltage generated at a piezo-electric element of said third beam caused by the action of said sixth bending vibration.

22. A vibration gyro according to claim 15, further comprising a differential amplifier circuit that adds the output of said first lock-in amplifier detecting an output voltage generated at a piezo-electric element of said third beam caused by the action of said fifth bending vibration and the output of said a second lock-in amplifier detecting an output voltage generated at a piezo-electric element of said third beam caused by the action of said sixth bending vibration.

* * * * *